(12) United States Patent
Fournel et al.

(10) Patent No.: US 11,420,895 B2
(45) Date of Patent: Aug. 23, 2022

(54) APPARATUS AND METHOD FOR PROCESSING A GLASS SUBSTRATE

(71) Applicant: Corning Incorporated, Corning, NY (US)

(72) Inventors: Olivier Fournel, Yerres (FR); Allan Mark Fredholm, Vulaines sur Seine (FR)

(73) Assignee: Corning Incorporated, Corning, NY (US)

( * ) Notice: Subject to any disclaimer, the term of this patent is extended or adjusted under 35 U.S.C. 154(b) by 615 days.

(21) Appl. No.: 16/332,670

(22) PCT Filed: Sep. 11, 2017

(86) PCT No.: PCT/US2017/050909
§ 371 (c)(1),
(2) Date: Mar. 12, 2019

(87) PCT Pub. No.: WO2018/052833
PCT Pub. Date: Mar. 22, 2018

(65) Prior Publication Data
US 2021/0292221 A1    Sep. 23, 2021

Related U.S. Application Data

(60) Provisional application No. 62/524,191, filed on Jun. 23, 2017, provisional application No. 62/425,308,
(Continued)

(51) Int. Cl.
*C03B 35/24* (2006.01)
*C03B 17/06* (2006.01)
(Continued)

(52) U.S. Cl.
CPC .......... *C03B 35/246* (2013.01); *C03B 17/062* (2013.01); *C03B 23/0355* (2013.01); *C03B 25/093* (2013.01); *C03B 35/243* (2013.01)

(58) Field of Classification Search
CPC .................................................. C03B 35/246
See application file for complete search history.

(56) References Cited

U.S. PATENT DOCUMENTS 3,300,291 A * 1/1967 Mission ................ C03B 35/246
65/159
3,342,573 A   9/1967 Fredley et al.
(Continued)

FOREIGN PATENT DOCUMENTS

CN     1171373 A     1/1998
CN   101175701 A     5/2008
(Continued)

OTHER PUBLICATIONS

Japanese Patent Application No. 2019-513847, Office Action dated Mar. 31, 2021, 6 pages (3 pages of English Translation and 3 pages of Original Document); Japanese Patent Office.
(Continued)

*Primary Examiner* — Erin Snelting

(57) ABSTRACT

Disclosed are apparatuses and methods for non-contact processing a substrate, for example a glass substrate, overtop a gas layer. The support apparatus includes a plurality of gas bearings positioned on a pressure box supplied with a pressurized gas. Some embodiments are directed to a method of supporting and transporting softened glass. The method includes placing the glass in proximity to a gas bearing device having a support surface with a plurality of outlet ports disposed therein. Some embodiments are directed to a glass processing apparatus comprising an air table configured to continuously transport and support a stream of glass and a plurality of modular devices supported
(Continued)

by a support structure and disposed above the air table. Some embodiments are directed to a method for flattening viscous glass using a two-sided gas bearing device or a one-sided gas bearing device.

13 Claims, 55 Drawing Sheets

Related U.S. Application Data filed on Nov. 22, 2016, provisional application No. 62/393,918, filed on Sep. 13, 2016.

(51) Int. Cl.
*C03B 25/093* (2006.01)
*C03B 23/035* (2006.01)

(56) References Cited

U.S. PATENT DOCUMENTS

| | | | |
|---|---|---|---|
| 3,355,275 | A | 11/1967 | Sensi et al. |
| 4,171,966 | A | 10/1979 | Baron et al. |
| 6,253,578 | B1 | 7/2001 | Kobayashi et al. |
| 2003/0014997 | A1 | 1/2003 | Dunifon |
| 2007/0010994 | A1 | 1/2007 | Mueller |
| 2007/0130994 | A1 | 6/2007 | Boratav et al. |
| 2009/0019892 | A1 | 1/2009 | Fredholm et al. |
| 2009/0092472 | A1 | 4/2009 | Luo et al. |
| 2009/0100873 | A1 | 4/2009 | Allan et al. |
| 2009/0205373 | A1 | 8/2009 | Kojima et al. |
| 2009/0217705 | A1 | 9/2009 | Filippov et al. |
| 2015/0099618 | A1 | 4/2015 | Bisson et al. |
| 2015/0115495 | A1 | 4/2015 | Sakamoto et al. |

FOREIGN PATENT DOCUMENTS

| | | |
|---|---|---|
| CN | 102173566 A | 9/2011 |
| CN | 104428871 A | 3/2015 |
| JP | 2003-523916 A | 8/2003 |
| JP | 2009051672 A | 3/2009 |
| JP | 2009-149389 A | 7/2009 |
| JP | 2010-530339 A | 9/2010 |
| KR | 10-2010-0129310 A | 12/2010 |
| KR | 10-2016-0006446 A | 1/2016 |
| WO | 2007/067409 A2 | 6/2007 |
| WO | 2015/054329 A1 | 4/2015 |

OTHER PUBLICATIONS

Fredholm et al.; "Apparatus and Method for Supporting a Glass Substrate"; Filed as U.S. Appl. No. 62/425,308, filed Nov. 22, 2016.
International Search Report and Written Opinion of the International Searching Authority; PCT/US2017/050909; dated Feb. 5, 2018; 19 Pages; European Patent Office.
Invitation To Pay Additional Fees From the International Searching Aurthority; PCT/US2017/050909; Mailed Dec. 11, 2017, 17 Pages; European Patent Office.
Taiwanese Patent Application No. 106131379, Office Action dated Feb. 1, 2021, 3 pages (English Translation Only); Taiwanese Patent Office.
English Translation of CN201780069806.8 Office Action dated Jul. 15, 2020; 10 Pages; Chinese Patent Office.

\* cited by examiner

APPARATUS AND METHOD FOR PROCESSING A GLASS SUBSTRATE

CROSS-REFERENCE TO RELATED APPLICATIONS

This application is a national stage entry of International Patent Application Serial No. PCT/US2017/50909, filed on Sep. 11, 2017, which claims the benefit of priority under 35 U.S.C. § 119 of U.S. Provisional Application Ser. No. 62/393,918, filed on Sep. 13, 2016, U.S. Provisional Application Ser. No. 62/425,308, filed on Nov. 22, 2016, and U.S. Provisional Application Ser. No. 62/524,191, filed on Jun. 23, 2017, the contents of each are relied upon and incorporated herein by reference in their entireties.

FIELD

The present disclosure relates generally to apparatus and methods for processing a substrate, and in particular for non-contact processing of a glass substrate.

BACKGROUND

Sheet glass is formed from a ribbon of glass and is sought after for use in user interfaces, controls, displays, architectural devices, appliances, and electronic devices. Being able to process and form glass in a softened state is of interest in numerous applications.

BRIEF SUMMARY

Described herein is an apparatus comprising a non-contact support apparatus suited for supporting a glass substrate as the glass substrate is conveyed over the support apparatus. The non-contact support apparatus is particularly well-suited to supporting glass substrates that have been softened sufficiently, for example by heating during initial forming, or subsequent to initial forming, such that a surface of the glass substrate can be easily marred, distorted or otherwise damaged by conventional non-contact support apparatus. For example, conventional support apparatus may utilize discrete ports (e.g., point sources) for exhausting gas between the support apparatus and the glass substrate. These discrete gas exhaust ports typically create strong pressure against the softened glass substrate directly adjacent the exhaust port, but lesser pressure surrounding the discrete exhaust port. This can result in the formation of artifacts (e.g., dimples) on the surface of the glass substrate than may be seen as optical distortion.

In accordance with non-contact support apparatus described herein, individual gas bearing are coupled to a common pressure box that supplies each gas bearing with a supply of pressurized gas. The gas bearings are arranged in a plurality of rows on the pressure box. The gas bearings include a plurality of slots opening from a surface of the gas bearings and arranged orthogonal to the conveyance direction of the glass substrate. The slots are in fluid communication with a plenum in the gas bearing through one or more metering (impedance) orifices located between the plenum and a slot and positioned relative to the opening of each slot on the surface of the gas bearing such that the gas pressure along the length of a slot is substantially uniform. For example, the shortest path length for the gas between an exit aperture of an impedance orifice and an opening of a slot (at the surface of the gas bearing) in fluid communication with the impedance orifice is at least about 5 millimeters, and in some embodiments, the shortest path length can be equal to or greater than 10 millimeters. This distance ensures that pressure variances along a slot due to the discrete distribution of impedance orifices is eliminated by the time the gas reaches the outlet of the slot.

In some embodiments, the gas bearing may comprise a length-to-width aspect ratio greater than 1 such that a length of the gas bearing is longer than a width of the gas bearing, the gas bearings arranged such that the length direction is orthogonal to the conveyance direction. Accordingly, gas bearings of a given row of gas bearings are arranged end-to-end. Additionally, the ends of a gas bearing may be angled at a non-orthogonal angle relative to the conveyance direction such that gas that may escape from a gap between gas bearing ends is not arrayed in a line parallel to the conveyance direction, but instead spread over a surface area of the glass substrate as the glass substrate is conveyed, determined by the angle of the adjacent ends (e.g., the gap therebetween).

Accordingly, an apparatus for supporting a substrate moving in a conveyance direction is disclosed, comprising a pressure box enclosing a chamber in fluid communication with a source of pressurized gas and a gas bearing positioned on the pressure box, the gas bearing including: a plenum in fluid communication with the chamber and extending in a length direction of the gas bearing, an intermediate passage in fluid communication with the plenum through an impedance orifice sized to restrict a flow of gas between the plenum and the intermediate passage, and a slot in fluid communication with the intermediate passage and extending along the length direction of the gas bearing, the slot opening at a major surface of the gas bearing and configured to exhaust a gas along a length of the slot. A width of the slot may be uniform along the length of the slot. The gas bearing further comprises a plurality of edges defining a major surface of the gas bearing, the plurality of edges including a first pair of opposing parallel edges arranged at an angle α relative to the conveyance direction, wherein α is in a range from about 20 degrees to about 60 degrees. In some embodiments, the apparatus comprises a plurality of gas bearings positioned on the pressure box, the plurality of gas bearings arranged in a plurality of rows extending orthogonal to the conveyance direction.

In some embodiments, a distance between an exit aperture of the impedance orifice and the opening of the slot is equal to or greater than about 5 millimeters, for example in a range from about 5 millimeters to about 10 millimeters, or in a range from about 10 millimeters to about 20 millimeters.

In some embodiments, a central longitudinal axis of the impedance orifice is orthogonal to the major surface.

In some embodiments, a central longitudinal axis of the impedance orifice is parallel to the major surface.

The pressure box can comprise cooling passages in fluid communication with a source of cooling fluid.

In another embodiment, an apparatus for supporting a glass substrate is described, comprising a pressure box enclosing a chamber in fluid communication with a source of pressurized gas and a plurality of gas bearings positioned on the surface of the pressure box, the plurality of gas bearings arranged in a plurality of rows extending orthogonal to a conveyance direction of the glass substrate. Each gas bearing of the plurality of gas bearings can include: a plenum in fluid communication with the chamber and extending in a length direction of the gas bearing, an intermediate passage in fluid communication with the plenum through an impedance orifice sized to restrict a flow of gas between the interior plenum and the intermediate passage, and a slot in fluid communication with the intermediate passage and extending along the length of the gas bearing, the slot opening at a major surface of the gas bearing such that a gas can be exhausted from the slot opening along a length of the slot. A width of the slot can be uniform along the length of the slot.

The major surface of the gas bearing is defined by a plurality of edges comprising at least a first pair of parallel edges arranged at an angle α relative to the conveyance direction, where a is in a range from equal to or greater than 20 degrees to equal to or less than 60 degrees.

In some embodiments, a distance d between an exit aperture of the impedance orifice and the opening of the slot at the major surface is equal to or greater than about 5 millimeters, for example in a range from about 5 millimeters to about 10 millimeters, for example in a range from about 120 millimeters to about 20 millimeters.

In some embodiments, a longitudinal axis of the impedance orifice is orthogonal to the major surface.

In some embodiments, a longitudinal axis of the impedance orifice is parallel to the major surface.

In yet another embodiment, a method for supporting a glass substrate is disclosed, the method comprising conveying a glass substrate over a support apparatus in a conveyance direction, the non-contact support apparatus comprising a pressure box enclosing a chamber in fluid communication with a source of pressurized gas, the pressure box further including a plurality of gas bearings positioned on the pressure box, the plurality of gas bearings arranged in a plurality of rows extending orthogonal to the conveyance direction, each gas bearing of the plurality of gas bearings comprising: a plenum in fluid communication extending in a length direction of the gas bearing, an intermediate passage in fluid communication with the plenum through an impedance orifice sized to restrict a flow of gas between the plenum and the intermediate passage, and a slot in fluid communication with the intermediate passage and extending along the length of the gas bearing, the slot opening at a major surface of the gas bearing. A width of the slot can be uniform along the length of the slot.

The method further comprises exhausting a gas from the slot along a length of the slot, thereby supporting the glass substrate in a position spaced apart from the major surface of the gas bearing, and wherein the major surface of the gas bearing is defined by a plurality of edges comprising at least a first pair of parallel edges arranged at an angle α relative to the conveyance direction, where a is in a range from equal to or greater than 20 degrees to equal to or less than 60 degrees.

In some embodiments, a pressure drop through the impedance orifice is equal to or greater than 50 times a gas pressure between the gas bearing and the glass substrate, for example in a range from about 50 to about 100 times the gas pressure between the gas bearing and the glass substrate.

The method may further comprise heating the glass substrate to a temperature greater than an anneal temperature of the glass substrate as the glass substrate is conveyed over the support apparatus. A width of the glass substrate can be at least 1 meter, and a maximum variation of a major surface of the glass substrate does not exceed 100 micrometers relative to a reference plane after conveying the glass substrate over the support apparatus. The reference plane can be, for example a plane of the glass substrate.

In some embodiments, the glass substrate is a glass ribbon, the method further comprising drawing the glass ribbon from a forming body prior to supporting the glass ribbon with the support apparatus. In some embodiments, the method may further comprise re-directing the glass ribbon from a first direction to a second direction different than the first direction prior to supporting the glass substrate with the support apparatus.

In some embodiments, a gas pressure exhausted from gas bearings positioned adjacent edge portions of the glass substrate can be greater than a gas pressure exhausted from gas bearings positioned beneath a central portion of the glass substrate.

Some embodiments are directed to a method of supporting softened glass. The method includes placing the glass in proximity to a gas bearing device. The gas bearing device has a support surface with a plurality of outlet ports disposed therein. The outlet ports have a density of at least 8,000 outlets per $m^2$. The method also includes ejecting a stream of gas through the outlet ports such that the glass does not touch the support surface.

In some embodiments, the embodiments of any of the preceding paragraphs may further include: the placing the glass step also includes providing a continuous stream of glass form the glass feed unit and placing the glass in proximity to the gas bearing device.

In some embodiments, the embodiments of any of the preceding paragraphs may further include the placing the glass step comprises providing a sheet of glass and maintaining the sheet of glass in proximity to the gas bearing device for a period of time while maintaining the viscosity of the glass within the range of about 500 to about $10^{13}$ poises.

In some embodiments, the embodiments of any of the preceding paragraphs may further include releasing a portion of the gas supporting the glass through a plurality of vent ports disposed in the support surface.

In some embodiments, the embodiments of any of the preceding paragraphs may further include the vent ports forming an array having a density less than the density of the outlet ports.

In some embodiments, the embodiments of any of the preceding paragraphs may further include the gas bearing device is an air turn bearing and the method further comprises, after the glass is fed into proximity with the air turn bearing, redirecting the stream of glass from a first direction to a second direction without the air turn bearing contacting the glass.

In some embodiments, the embodiments of any of the preceding paragraphs may further include the gas bearing is an air table, and the method comprises feeding the continuous stream of glass into proximity with the air table and supporting the continuous stream of glass, without the air table contacting the glass, as the continuous stream of glass traverses as horizontal plane.

In some embodiments, the embodiments of any of the preceding paragraphs may further include the method comprises maintaining tension across the stream of glass as the continuous stream of glass traverses a horizontal plane.

In some embodiments, the embodiments of any of the preceding paragraphs may further include the gas bearing device is an accumulator, and the method comprises, as the continuous stream of glass is fed into proximity with the accumulator, accumulating a desired volume of glass and shaping a surface of the volume of glass with the accumulator without contacting at least a portion of the shaped glass surface.

In some embodiments, the embodiments of any of the preceding paragraphs may further include the method comprises shaping the surface of the volume of glass with the accumulator without contact between the accumulator and the shaped glass surface.

In some embodiments, the embodiments of any of the preceding paragraphs may further include the gas bearing device is an air mold the glass comprises a sheet of glass, the method includes placing the glass in proximity to a gas bearing device, which includes placing the sheet of glass on the air mold. In some embodiments, the embodiments of any of the preceding paragraphs may further include the method further includes sagging the glass to shape a surface of the glass into the shape of the air mold without contact between the air mold and at least a portion of the shaped glass surface.

In some embodiments, the embodiments of any of the preceding paragraphs may further include the method comprises sagging the glass to shape a surface of the glass into the shape of the air mold without contact between the air mold and the shaped glass surface.

In some embodiments, the embodiments of any of the preceding paragraphs may further include the gas bearing has a minimum area of 1 cm$^2$.

In some embodiments, the embodiments of any of the preceding paragraphs may further include the outlet ports have uniform size and spacing.

In some embodiments, the embodiments of any of the preceding paragraphs may further include the outlet ports have a density of at least 10,000 outlet ports per m$^2$.

In some embodiments, the outlet ports form an array having a pitch of at most 3 millimeters.

In some embodiments, the embodiments of any of the preceding paragraphs may further include the gas bearing device comprises a plurality of metering pipes, and each metering pipe supplies gas to at least two outlet ports.

In some embodiments, the embodiments of any of the preceding paragraphs may further include the method comprises thermally forming the glass while the glass is in proximity to the gas bearing device.

In some embodiments, the embodiments of any of the preceding paragraphs may further include the temperature of the gas bearing device is controlled by circulating a temperature-controlled thermal fluid through temperature control channels in the gas bearing.

In some embodiments, the embodiments of any of the preceding paragraphs may further include the thermal fluid is controlled by a cooling circuit configured to cool the temperature controlled fluid.

In some embodiments, the embodiments of any of the preceding paragraphs may further include a heating circuit is configured to heat the temperature controlled fluid.

In some embodiments, the embodiments of any of the preceding paragraphs may further include the method comprises transmitting the gas from a gas source to the gas bearing device prior to ejecting the through the outlet ports and pre-heating the gas before the gas reaches the gas bearing device.

Some embodiments are directed to a glass processing apparatus comprising a gas bearing device having a support surface with a plurality of outlet ports disposed therein. The outlet ports have a density of at least 8,000 outlet ports per m$^2$. The gas bearing device is configured to support viscous glass.

In some embodiments, the embodiments of any of the preceding paragraphs may further include the apparatus comprises a glass feed unit configured to supply a continuous stream of glass to the gas bearing device, wherein the glass is molten when supplied by the glass feed unit.

In some embodiments, the embodiments of any of the preceding paragraphs may further include the apparatus comprises a driven conveyor configured to receive a continuous steam of glass from the gas bearing device, and the driven conveyor is configured to apply tension to the stream of glass supported by the gas bearing device.

In some embodiments, the embodiments of any of the preceding paragraphs may further include the gas bearing device is an air turn bearing configured to turn the stream of glass from a first direction to a second direction different from the first direction without contacting the glass.

In some embodiments, the embodiments of any of the preceding paragraphs may further include the gas bearing device is an air table configured to support the stream of glass without contacting the glass.

In some embodiments, the embodiments of any of the preceding paragraphs may further include the gas bearing device is an accumulator configured to receive and accumulate a volume of glass and shape a surface of the volume of glass without contact between the accumulator and at least a portion of the shaped glass surface.

In some embodiments, the embodiments of any of the preceding paragraphs may further include the accumulator is configured to receive and accumulate a volume of glass, and shape a surface of the volume of glass without contact between the accumulator and the shaped glass surface.

In some embodiments, the embodiments of any of the preceding paragraphs may further include the gas bearing device is an air mold configured to slump a sheet of glass without contacting at least a portion of the glass.

In some embodiments, the embodiments of any of the preceding paragraphs may further include the gas bearing device is an air mold configured to slump a sheet of glass without contacting the glass.

In some embodiments, the embodiments of any of the preceding paragraphs may further include the outlet ports have a density of at least 10,000 per m$^2$.

In some embodiments, the embodiments of any of the preceding paragraphs may further include the gas bearing device comprises a gas manifold in fluid communication with the plurality of outlet ports.

In some embodiments, the embodiments of any of the preceding paragraphs may further include the apparatus comprises a plurality of metering pipes, and each metering pipe is in fluid communication with the manifold and at least four outlet ports.

In some embodiments, the embodiments of any of the preceding paragraphs may further include the outlet ports form an array having pitch of at most 3 millimeters.

In some embodiments, the embodiments of any of the preceding paragraphs may further include the gas bearing has a minimum area of 1 cm$^2$.

In some embodiments, the embodiments of any of the preceding paragraphs may further include the outlet ports have uniform size and spacing.

In some embodiments, the embodiments of any of the preceding paragraphs may further include the apparatus comprises a thermal control system connected to the gas bearing device, and the thermal control system is configured to control the temperature of the gas bearing by circulating a temperature-controlled fluid through temperature control channels in the gas bearing.

In some embodiments, the embodiments of any of the preceding paragraphs may further include the thermal control system is configured to maintain the viscosity of the glass within the range of about 500 to about $10^{13}$ poises.

In some embodiments, the embodiments of any of the preceding paragraphs may further include the thermal control system comprises a heat exchanger.

In some embodiments, the embodiments of any of the preceding paragraphs may further include the temperature-controlled fluid is a cooling fluid.

In some embodiments, the embodiments of any of the preceding paragraphs may further include the temperature-controlled fluid is a preheated gas.

In some embodiments, the embodiments of any of the preceding paragraphs may further include the thermal control system comprises at least one electrical heating element.

Some embodiments are directed to a glass processing apparatus comprising an air table configured to continuously transport and support a stream of glass and a plurality of modular devices supported by a support structure. The plurality of modular devices are disposed above the air table. At least one of the modular devices is a modular thermal management device.

In some embodiments, the embodiments of any of the preceding paragraphs may further include the plurality of modular devices are movably attached to the support structure, and each modular device is independently movable.

In some embodiments, the embodiments of any of the preceding paragraphs may further include the support structure comprises an arm member movably attached to the support structure, and the plurality of modular devices are attached to the arm member.

In some embodiments, the embodiments of any of the preceding paragraphs may further include the at least one modular thermal management device is removably attached to the support structure.

In some embodiments, the embodiments of any of the preceding paragraphs may further include the at least one modular thermal management device is independently selected from a flat panel heater, a passive reflector panel, and edge heater, an air knife assembly, a roller, and any combination thereof.

In some embodiments, the embodiments of any of the preceding paragraphs may further include the plurality of modular devices includes at least one of a roll positioning assembly, a flattening roll assembly, and a driven roller.

In some embodiments, the embodiments of any of the preceding paragraphs may further include the arm is movable in a vertical direction.

In some embodiments, the embodiments of any of the preceding paragraphs may further include the support structure comprises a powered lift configured to move the arm in a vertical direction relative to an upright member.

In some embodiments, the embodiments of any of the preceding paragraphs may further include the arm is movable between a lower position and an upper position.

In some embodiments, the embodiments of any of the preceding paragraphs may further include the plurality of modular devices are movable along a horizontal axis.

In some embodiments, the embodiments of any of the preceding paragraphs may further include the plurality of modular devices are movable along a vertical axis.

In some embodiments, the embodiments of any of the preceding paragraphs may further include the air table is configured to support the stream of glass in a plane within 5 degrees of horizontal.

In some embodiments, the embodiments of any of the preceding paragraphs may further include the air table comprises a gas bearing mold.

In some embodiments, the embodiments of any of the preceding paragraphs may further include the gas bearing mold is a slumping mold.

In some embodiments, the embodiments of any of the preceding paragraphs may further include the air table further comprises a first portion configured to continuously transport and support the stream of glass without contacting the stream of glass.

In some embodiments, the embodiments of any of the preceding paragraphs may further include the air table further comprises a second portion comprising a roller configured to support the stream of glass by contacting the stream of glass.

In some embodiments, the embodiments of any of the preceding paragraphs may further include the second portion of the air table is disposed after the first portion of the air table roller in the direction in which the stream of glass travels.

In some embodiments, the embodiments of any of the preceding paragraphs may further include the air table comprises a plurality of table modules.

Some embodiments are directed to a method for a continuous glass forming process that controls the thermal profile of a stream of glass. The method comprises supplying a stream of molten glass in a first direction from a glass feed unit. The method comprises passing the stream of glass through a gas bearing to redirect the stream of glass from the first direction to a second direction without contacting the stream of glass. The method comprises transporting the stream of glass across a first portion of an air table without contacted the glass. The method also comprises, while transporting the glass, controlling the thermal profile of the stream of glass with at least one thermal management device supported by a support structure such that the modular thermal management device is disposed above the stream of glass.

Some embodiments are directed to a glass processing apparatus comprising a first gas bearing assembly having a first major surface, a second gas bearing assembly having a second major surface, wherein the first major surface is separated from the second major surface by a gap. The glass processing apparatus has a first plurality of outlet ports, pores or combination thereof disposed in the first major surface, and in fluid communication with a first gas source. The glass processing apparatus also has a second plurality of outlet ports, pores or combination thereof disposed in the second assembly support surface, and in fluid communication with a second gas source. The glass processing apparatus also has a source of viscous glass positioned to feed a continuous stream of viscous glass into the gap.

In some embodiments, the embodiments of any of the preceding paragraphs may further include wherein the source of viscous glass is configured to provide a stream of glass having a viscosity in the range of $10^7$ to $10^{10}$ poises when the glass enters the gap between the first gas bearing assembly and the second gas bearing assembly.

In some embodiments, the embodiments of any of the preceding paragraphs may further include wherein the first gas bearing assembly further comprises a plurality of first gas bearings, each first gas bearing having a first bearing support surface, such that the first bearing support surfaces of the plurality of first gas bearings collectively form the first major surface; and the second gas bearing assembly further comprises a plurality of second gas bearings, each second gas bearing having a second bearing support surface, such that the second bearing support surfaces of the plurality of second gas bearings collectively form the second major surface.

In some embodiments, the embodiments of any of the preceding paragraphs may further include a first plurality of vent channels separating the plurality of first gas bearings from each other, and a second plurality of vent channels separating the plurality of second gas bearings from each other.

In some embodiments, the embodiments of any of the preceding paragraphs may further include wherein each of the first bearing support surfaces comprises a first porous material, and each of the second bearing support surfaces comprises a second porous material.

In some embodiments, the embodiments of any of the preceding paragraphs may further include wherein the first porous material and the second porous material are both graphite.

In some embodiments, the embodiments of any of the preceding paragraphs may further include wherein the second gas bearing assembly is disposed above the first gas bearing assembly, and wherein each of the plurality of second gas bearings is supported by one or more gas films between the first and second gas bearings.

In some embodiments, the embodiments of any of the preceding paragraphs may further include a first support frame connected to each of the plurality of first gas bearings, wherein the first support frame comprises a cooling passage in fluid communication with a source of cooling fluid.

In some embodiments, the embodiments of any of the preceding paragraphs may further include wherein the first gas bearing and the second gas bearing are configured to apply a pressure of 150 Pa to 1000 Pa to the stream of viscous glass.

In some embodiments, the embodiments of any of the preceding paragraphs may further include wherein the second gas bearing is movable relative to the lower gas bearing.

In some embodiments, the embodiments of any of the preceding paragraphs may further include wherein the apparatus is configured to flatten the continuous stream of viscous glass.

In some embodiments, the embodiments of any of the preceding paragraphs may further include a gas channel disposed in each of the plurality of first gas bearings.

Some embodiments are directed to a method of flattening viscous glass, comprising feeding a continuous stream of glass having a viscosity in the range of $10^7$ to $10^{10}$ poises to a gas bearing device. The gas bearing device comprises a first gas bearing assembly having a first major surface; a second gas bearing assembly having a second major surface. The first major surface is separated from the second assembly surface by a gap. The gas bearing device also comprises a first plurality of outlet port, pores or combination thereof disposed in the first major surface, and in fluid communication with a first gas source; and a second plurality of outlet ports, pores or combination thereof disposed in the second major surface, and in fluid communication with a second gas source. The method also includes applying pressure to a first side of the glass by ejecting gas through the outlet ports or pores of the first major surface to create a first gas film; applying pressure to a second side of the glass that opposes the first side by ejecting gas through the outlet ports or pores of the second major surface to create a second gas film; and flattening the glass without contacting the glass by creating a pressure equilibrium between the pressure applied to the first side and the second side of the glass.

In some embodiments, the embodiments of any of the preceding paragraphs may further include wherein the first gas bearing assembly further comprises a plurality of first gas bearings, each first gas bearing having a first bearing support surface, such that the first bearing support surfaces of the plurality of first gas bearings collectively form the first major surface; and the second gas bearing assembly further comprises a plurality of second gas bearings, each second gas bearing having a second bearing support surface, such that the second bearing support surfaces of the plurality of second gas bearings collectively form the second major surface.

In some embodiments, the embodiments of any of the preceding paragraphs may further include wherein the first gas bearing assembly further comprises a first plurality of vent channels separating the plurality of first gas bearings from each other, and the second gas bearing assembly further comprises a second plurality of vent channels separating the plurality of second gas bearings from each other.

In some embodiments, the embodiments of any of the preceding paragraphs may further include maintaining a thickness of the first gas film at 50 to 500 μm and maintaining a thickness of the second gas film at 50 to 500 μm.

In some embodiments, the embodiments of any of the preceding paragraphs may further include applying a pressure equal to 5 to 50 times the weight of the glass.

In some embodiments, the embodiments of any of the preceding paragraphs may further include adjusting the thickness of the first gas film and the thickness of the second glass film by adjusting a position of second gas bearing assembly relative to the first gas bearing assembly.

In some embodiments, the embodiments of any of the preceding paragraphs may further include wherein the second gas bearing assembly is supported by the second gas film.

In some embodiments, the embodiments of any of the preceding paragraphs may further include feeding a gas through holes perpendicular to a direction of flow of glass.

In some embodiments, the embodiments of any of the preceding paragraphs may further include cooling the gas bearing assembly by flowing cooling fluid through cooling passages.

In some embodiments, the embodiments of any of the preceding paragraphs may further include maintaining the glass in proximity to the first gas bearing assembly and the second gas bearing assembly for a period of time while maintaining the viscosity of the glass within the range of $10^7$ to $10^{13}$ poises.

Some embodiments are directed to a glass processing apparatus comprising a gas bearing assembly having a major surface; a plurality of outlet ports, pores or combination thereof disposed in the major surface; and a plurality of vents disposed in the major surface; and a source of viscous glass positioned to feed a continuous stream of viscous glass to the gas bearing device. The gas bearing assembly is configured to apply a positive pressure to the glass sheet through the outlet ports or pores and to apply a negative pressure to the glass sheet through the vents. The outlet ports or pores are in fluid communication with a gas source, and the viscosity of the glass is in the range of $10^7$ to $10^{13}$ poises when the glass fed to the gas bearing device.

In some embodiments, the embodiments of any of the preceding paragraphs may further include wherein the gas bearing assembly further comprises a plurality of gas bearings, each gas bearing having a bearing support surface, such that the bearing support surfaces of the first gas bearings collectively form the major surface.

In some embodiments, the embodiments of any of the preceding paragraphs may further include wherein the gas bearing assembly further comprises a plurality of vent channels separating the plurality of gas bearings from each other.

In some embodiments, the embodiments of any of the preceding paragraphs may further include wherein the major surface comprises a plurality of outlet ports therein, wherein the outlet ports have a density of at least 8,000 outlet ports per $m^2$.

In some embodiments, the embodiments of any of the preceding paragraphs may further include a plurality of vent ports disposed on the major surface, wherein the vent ports have a density less than the density of the outlet ports.

In some embodiments, the embodiments of any of the preceding paragraphs may further include wherein the bearing support surfaces comprises a porous material.

In some embodiments, the embodiments of any of the preceding paragraphs may further include wherein the porous material is graphite.

In some embodiments, the embodiments of any of the preceding paragraphs may further include a support frame connected to each of the plurality of gas bearings, wherein the support frame comprises a cooling passage in fluid communication with a source of cooling fluid.

In some embodiments, the embodiments of any of the preceding paragraphs may further include a thermal management device disposed above the glass.

In some embodiments, the embodiments of any of the preceding paragraphs may further include wherein the gas bearing is configured to apply a positive pressure equal to 2 to 25 times the weight of the glass.

In some embodiments, the embodiments of any of the preceding paragraphs may further include wherein the gas bearing is configured to apply a negative pressure equal to 2 to 25 times the weight of the glass, wherein the negative pressure is less than the positive pressure.

In some embodiments, the embodiments of any of the preceding paragraphs may further include wherein the apparatus is configured to flatten the continuous stream of viscous glass.

In some embodiments, the embodiments of any of the preceding paragraphs may further include a gas channel disposed in each of the plurality of gas bearings.

Some embodiments are directed to method of flattening viscous glass, comprising feeding a continuous stream of glass from a source, the glass having a viscosity in the range of $10^7$ to $10^{13}$ poises when the glass is fed from the source, placing the glass in proximity to a gas bearing assembly, applying a positive pressure to the glass by ejecting gas through the outlet ports or pores; applying a negative pressure to the glass by pulling a vacuum through the vents; and flattening the glass without contacting the glass by creating a pressure equilibrium. In some embodiments, the gas bearing assembly comprises an major surface; a plurality of outlet ports, pores or combination thereof disposed in the major surface; a plurality of vents disposed in the major surface; and In some embodiments, the embodiments of any of the preceding paragraphs may further include wherein the gas bearing assembly further comprises a plurality of gas bearings, each gas bearing having a bearing support surface, such that the bearing support surfaces of the gas bearings collectively form the major surface.

In some embodiments, the embodiments of any of the preceding paragraphs may further include maintaining a thickness of the first gas film at 50 to 500 μm and maintaining a thickness of the second gas film at 50 to 500 μm.

In some embodiments, the embodiments of any of the preceding paragraphs may further include applying a positive pressure equal to 2 to 25 times the weight of the glass.

In some embodiments, the embodiments of any of the preceding paragraphs may further include applying a negative pressure equal to 2 to 25 times the weight of the glass.

In some embodiments, the embodiments of any of the preceding paragraphs may further include feeding a gas through holes perpendicular to a direction of flow of glass.

In some embodiments, the embodiments of any of the preceding paragraphs may further include cooling the gas bearing device by flowing cooling fluid through cooling passages in fluid communication with a source of cooling fluid.

In some embodiments, the embodiments of any of the preceding paragraphs may further include further comprising maintaining the glass in proximity to the gas bearing assembly for a period of time while maintaining the viscosity of the glass within the range of $10^7$ to $10^{13}$ poises.

In some embodiments, the embodiments of any of the preceding paragraphs may further include wherein the gas bearing device further comprises a thermal management device disposed above the glass and opposing the support surface.

Some embodiments are directed to a glass forming apparatus comprising a glass feed unit configured to supply a stream of molten glass in a first direction. In some embodiments, a gas bearing is positioned below the glass feed unit, and the gas bearing is configured to redirect the stream of molten glass to a second direction different from the first direction without contacting the stream of molten glass. In some embodiments, the glass forming apparatus comprises at least one thermal management device. In some embodiments, the thermal management device is one of a fluid coolant channel in the gas bearing, a convective cooling system comprising a nozzle configured to eject gas that forces the stream of molten glass towards the gas bearing, and a thermal shield positioned between the glass feed unit and the gas bearing.

In some embodiments, the embodiments of any of the preceding paragraphs may further include wherein the glass forming apparatus comprises the fluid coolant channel, the convective cooling system, and the thermal shield.

In some embodiments, the embodiments of any of the preceding paragraphs may further include wherein the glass forming apparatus comprises the thermal shield.

In some embodiments, the embodiments of any of the preceding paragraphs may further include wherein the glass forming apparatus comprises the fluid coolant channel and the convective cooling system.

In some embodiments, the embodiments of any of the preceding paragraphs may further include wherein the convective cooling system comprises a gas chamber and a plurality of nozzles in fluid communication with the gas chamber, and each nozzle of the plurality of nozzles configured to eject gas from the gas chamber.

In some embodiments, the embodiments of any of the preceding paragraphs may further include wherein each nozzle of the plurality of nozzles comprises a tip and a regulator configured to control a flow rate of gas exiting the tip.

In some embodiments, the embodiments of any of the preceding paragraphs may further include wherein each nozzle of the plurality of nozzles supplies the gas in a continuous manner.

In some embodiments, the embodiments of any of the preceding paragraphs may further include wherein the first direction is a vertical direction and the second direction is a horizontal direction.

In some embodiments, the embodiments of any of the preceding paragraphs may further include wherein the gas bearing has a radius not greater than 8 cm.

In some embodiments, the embodiments of any of the preceding paragraphs may further include wherein the glass feed unit further comprises a heater and the glass feed unit is a forming vessel.

In some embodiments, the embodiments of any of the preceding paragraphs may further include a support unit configured to support the stream of molten glass moving in the second direction without contacting the stream of molten glass and a glass ribbon draw unit connected to the support unit and configured to draw a glass ribbon from the stream of molten glass in the second direction.

In some embodiments, the embodiments of any of the preceding paragraphs may further include a glass feed unit including an output path, a gas bearing positioned below the glass feed unit near the output path, the gas bearing further comprising a fluid coolant channel, a convective cooling system comprising a nozzle directed toward the gas bearing, and a thermal shield positioned between the glass feed unit and the gas bearing.

In some embodiments, the embodiments of any of the preceding paragraphs may further include supplying a stream of molten glass in a first direction, redirecting the stream of molten glass to a second direction different from the first direction without contacting the stream of molten glass, and while redirecting the stream of molten glass, cooling the glass with a cooling apparatus having a heat transfer coefficient of at least 150 $W/m^2$-K over a distance of at least 50 mm on at least one side of the stream of molten glass.

In some embodiments, the embodiments of any of the preceding paragraphs may further include wherein a viscosity of at least a portion of the stream of molten glass is less than 25,000 poises.

In some embodiments, the embodiments of any of the preceding paragraphs may further include wherein the viscosity of the at least a portion is less than 10,000 poises.

In some embodiments, the embodiments of any of the preceding paragraphs may further include wherein the viscosity of at least a portion increases by a factor of at least 50 between a delivery point of the stream of molten glass and a distance of 10 cm from the delivery point the stream of molten glass.

In some embodiments, the embodiments of any of the preceding paragraphs may further include forming a gas film on a first major surface of the stream of molten glass and applying forced convection to a second major surface of the stream of molten glass opposite the first major surface.

In some embodiments, the embodiments of any of the preceding paragraphs may further include reducing a temperature of the stream of molten glass using a thermal shield.

In some embodiments, the embodiments of any of the preceding paragraphs may further include supporting the stream of molten glass moving in the second direction without contacting the stream of molten glass and drawing a glass ribbon from the stream of molten glass in the second direction.

In some embodiments, the embodiments of any of the preceding paragraphs may further include wherein a thickness of the glass ribbon is at least 0.1 mm.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
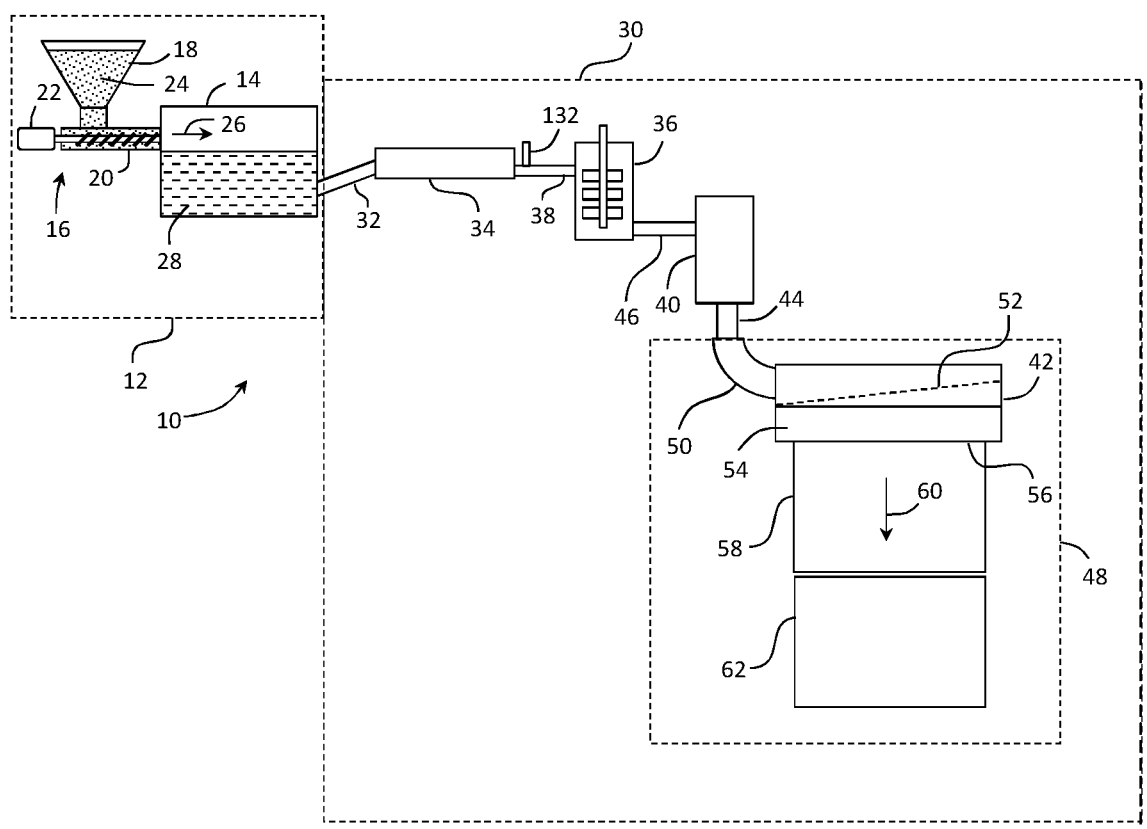
FIG. 1 is a schematic drawing of an exemplary glass making apparatus for making a glass ribbon.

Reference will now be made in detail to the embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Large scale manufacture of glass substrates, for example glass sheets used in the manufacture of display devices, begins with the melting of raw materials to produce a heated viscous mass (hereinafter "molten glass" or "melt") that can be formed into the glass article in a downstream forming process. In many applications the glass article is a glass ribbon, from which individual glass sheets may be cut. Cutting of the glass sheet from the glass ribbon is typically performed when the glass ribbon, or at least a portion of the glass ribbon from which the glass sheet is to be removed, is in an elastic state. Accordingly, the glass sheet after cutting is dimensionally stable. That is, a viscosity of the glass sheet is sufficiently great that plastic deformation of the glass sheet will not occur on a macroscopic scale. More simply put, the glass sheet will no longer permanently take on a new shape, if, for example the glass sheet is bent under force, and then freed from the force.

In some applications it may be necessary to process a glass substrate while the glass substrate is a viscous or visco-elastic state, for example directly downstream of a ribbon making process wherein the glass substrate is still in ribbon form, or after reheating an elastic glass ribbon, or a glass sheet, for subsequent reshaping. In some embodiments, reheating of a glass sheet to a temperature greater than the annealing point of the glass sheet may be necessary for thermal tempering of the glass sheet. In each of the foregoing exemplary instances, it may be necessary to handle the glass ribbon and/or glass sheet while the substrate is in a sufficiently viscous state that the handling may mar or otherwise create physical defects in the glass article.

To provide stable support of large size glass substrates (e.g., comprising a width of 1 meter or greater) conventional gas bearings incorporate distributed gas escape openings. These openings prevent the formation of unstable shapes of soft glass wherein a central part of the glass substrate can form large bulges as a result of an accumulation of gas pressure. Such conventional designs have tended toward two principal configurations: full width designs in which the gas feed device extends continuously across the complete width of the glass substrate without interruption, and wherein gas exit ports are interposed between the gas outlet ports, or; designs comprising discrete gas feed passages that supply gas directly to the exhaust ports.

The first design type configured for supporting large size glass substrates can be complex to manufacture and tend to distort due to the thermal load when supporting substrates at high temperature, which can impact substrate flatness. Furthermore, aligning the different feed elements can be a challenge. The second design type can comprise individual gas bearings secured to an air feeding box, which ensures precise positioning and alignment. However, distortion of the feed box can occur, which can result in optical distortion in the glass, aligned in the direction of the glass substrate conveyance direction and can be related to the pitch of the air inlets on the gas bearings, and also to the pitch of gas bearing assemblies themselves.

Accordingly, an apparatus and method of manipulating a glass substrate, for example transporting a glass substrate without marring a surface of the glass substrate or incurring optical distortion in the glass substrate, is desirable.

Glass Manufacturing Apparatus

Shown in FIG. 1 is an example glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting furnace 12 may be an electrically boosted melting vessel, wherein energy is added to the raw material through both combustion burners and by direct heating, wherein an electric current is passed through the raw material, thereby adding energy via Joule heating of the raw material. As used herein, an electrically boosted melting vessel is a melting vessel wherein during operation the amount of energy imparted to the raw material via direct electrical conduction heating (Joule heating) is equal to or greater than about 20%.

In further examples, glass melting furnace 12 may include thermal management devices (e.g., insulation components) that reduce heat loss from the melting vessel. In still further examples, glass melting furnace 12 may include electronic devices and/or electromechanical devices that facilitate melting of the raw material into a glass melt. Still further, glass melting furnace 12 may include support structures (e.g., support chassis, support member, etc.) or other components.

Glass melting vessel 14 is typically formed from a refractory material, such as a refractory ceramic material, for example a refractory ceramic material comprising alumina or zirconia, although other refractory materials may be used. In some examples, glass melting vessel 14 may be constructed from refractory ceramic bricks.

In some examples, melting furnace 12 may be incorporated as a component of a glass manufacturing apparatus configured to fabricate a glass article, for example a glass ribbon of an indeterminate length, although in further embodiments, the glass manufacturing apparatus may be configured to form other glass articles without limitation, such as glass rods, glass tubes, glass envelopes (for example, glass envelopes for lighting devices, e.g., light bulbs) and glass lenses. In some examples, the melting furnace may be incorporated as a component of a glass manufacturing apparatus comprising a slot draw apparatus, a float bath apparatus, a down draw apparatus (e.g., a fusion down draw apparatus), an up-draw apparatus, a pressing apparatus, a rolling apparatus, a tube drawing apparatus or any other glass manufacturing apparatus that would benefit from aspects disclosed herein. By way of example, FIG. 1 schematically illustrates glass melting furnace 12 as a component of a fusion down draw glass manufacturing apparatus 10 for fusion drawing a glass ribbon for subsequent processing into individual glass sheets or rolling onto a spool.

Glass manufacturing apparatus 10 (e.g., fusion down draw apparatus 10) can optionally include an upstream glass manufacturing apparatus 16 positioned upstream relative to glass melting vessel 14. In some examples, a portion of, or the entire upstream glass manufacturing apparatus 16, may be incorporated as part of the glass melting furnace 12.

As shown in the illustrated embodiment, the upstream glass manufacturing apparatus 16 can include a raw material storage bin 18, a raw material delivery device 20 and a motor 22 connected to the raw material delivery device. Storage bin 18 may be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 such that raw material delivery device 20 delivers a predetermined amount of raw material 24 from the storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as comprising various "sands." Raw material may also include scrap glass from previous operations (i.e., cullet). Combustion burners are used to begin the melting process. In an electrically boosted melting process, once the electrical resistance of the raw material is sufficiently reduced (e.g., when the raw materials begin liquifying), electric boost is begun by developing an electric potential between electrodes positioned in contact with the raw materials, thereby establishing an electric current through the raw material, typically entering or in a molten state at this time.

Glass manufacturing apparatus 10 can also optionally include a downstream glass manufacturing apparatus 30 positioned downstream relative to glass melting furnace 12. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium (e.g., the platinum group metals), or alloys thereof. For example, downstream components of the glass manufacturing apparatus may be formed from a platinum-rhodium alloy including from about 70% to about 90% by weight platinum and about 10% to about 30% by weight rhodium. However, other suitable metals can include molybdenum, rhenium, tantalum, titanium, tungsten and alloys thereof.

Downstream glass manufacturing apparatus 30 can include a first conditioning (i.e. processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated in a secondary vessel to continue the melting process, or cooled to a temperature lower than the temperature of the molten glass in the primary melting vessel before entering the fining vessel.

Within fining vessel 34, bubbles may be removed from molten glass 28 by various techniques. For example, raw material 24 may include multivalent compounds (i.e., fining agents) such as tin oxide that, when heated, undergo a chemical reduction reaction and release oxygen. Other suitable fining agents include without limitation arsenic, antimony, iron and cerium, although as noted previously, the use of arsenic and antimony may be discouraged for environmental reasons in some applications. Fining vessel 34 is heated to a temperature greater than the melting vessel temperature, thereby heating the fining agent. Oxygen bubbles produced by the temperature-induced chemical reduction of the one or more fining agents rise through the molten glass within the fining vessel, wherein gases in the melt produced in the melting furnace can coalesce or diffuse into the oxygen bubbles produced by the fining agent. The enlarged gas bubbles with increased buoyancy can then rise to a free surface of the molten glass within the fining vessel and thereafter be vented out of the fining vessel. The oxygen bubbles can further induce mechanical mixing of the molten glass in the fining vessel as they rise through the melt.

The downstream glass manufacturing apparatus 30 can further include another conditioning vessel, such as a mixing apparatus 36 for mixing the molten glass that flows downstream from fining vessel 34. Mixing apparatus 36 can be used to provide a homogenous glass melt composition, thereby reducing chemical or thermal inhomogeneities that may otherwise exist within the fined molten glass exiting the fining vessel. As shown, fining vessel 34 may be coupled to mixing apparatus 36 by way of a second connecting conduit 38. In some examples, molten glass 28 may be gravity fed from the fining vessel 34 to mixing apparatus 36 by way of second connecting conduit 38. For instance, gravity may drive molten glass 28 through an interior pathway of second connecting conduit 38 from fining vessel 34 to mixing apparatus 36. It should be noted that while mixing apparatus 36 is shown downstream of fining vessel 34 relative to a flow direction of the molten glass, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These multiple mixing apparatus may be of the same design, or they may be of a different design from one another. In some embodiments, one or more of the vessels and/or conduits may include static mixing vanes positioned therein to promote mixing and subsequent homogenization of the molten material.

Downstream glass manufacturing apparatus 30 can further include another conditioning vessel such as delivery vessel 40 that may be located downstream from mixing apparatus 36. Delivery vessel 40 may condition molten glass 28 to be fed into a downstream forming device. For instance, delivery vessel 40 can act as an accumulator and/or flow controller to adjust and provide a consistent flow of molten glass 28 to forming body 42 by way of exit conduit 44. As shown, mixing apparatus 36 may be coupled to delivery vessel 40 by way of third connecting conduit 46. In some examples, molten glass 28 may be gravity fed from mixing apparatus 36 to delivery vessel 40 by way of third connecting conduit 46. For instance, gravity may drive molten glass 28 through an interior pathway of third connecting conduit 46 from mixing apparatus 36 to delivery vessel 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. As best seen with the aid of FIG. 2, forming body 42 in a fusion down draw glass making apparatus can comprise a trough 52 positioned in an upper surface of the forming body and converging forming surfaces 54 that converge in a draw direction along a bottom edge (root) 56 of the forming body. Molten glass delivered to the forming body trough via delivery vessel 40, exit conduit 44 and inlet conduit 50 overflows the walls of the trough and descends along the converging forming surfaces 54 as separate flows of molten glass. The separate flows of molten glass join below and along the root to produce a single ribbon of glass 58 that is drawn in a draw direction 60 from root 56 by applying tension to the glass ribbon, such as by gravity, edge rolls and pulling rolls (not shown), to control the dimensions of the glass ribbon as the glass cools and a viscosity of the glass increases. Accordingly, glass ribbon 58 goes through a visco-elastic transition and acquires mechanical properties that give glass ribbon 58 stable dimensional characteristics. Glass ribbon 58 may in some embodiments be separated into individual glass sheets 62 by a glass separation apparatus (not shown) in an elastic region of the glass ribbon, although in further embodiments, the glass ribbon may be wound onto spools and stored for further processing, or processed directly from the drawing operation as a viscous or visco-elastic ribbon.

Figure 2:
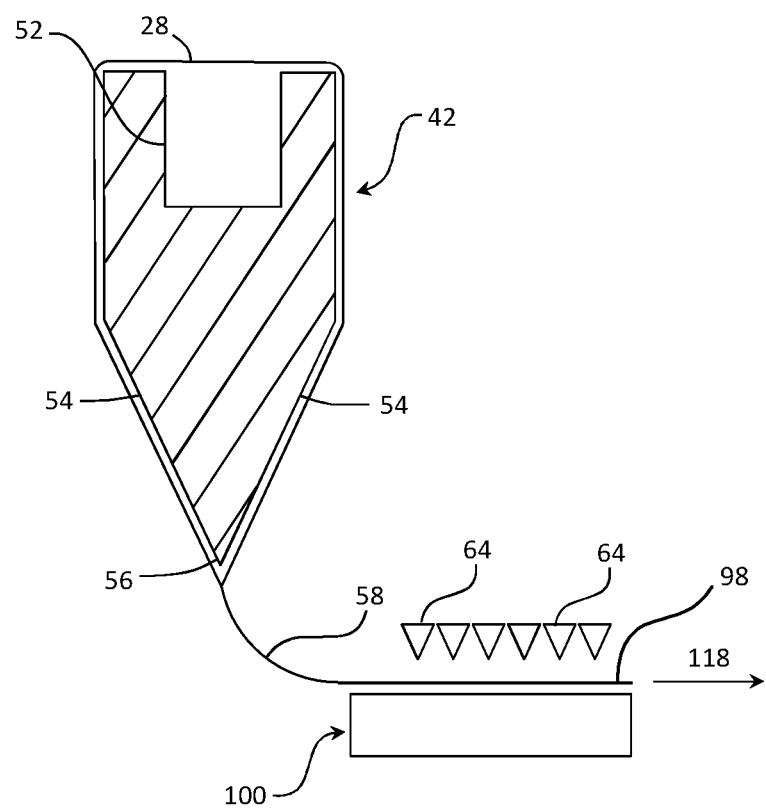
FIG. 2 is a cross sectional view of a forming body for forming a glass ribbon from molten glass in accordance with the embodiment of FIG. 1, wherein the glass ribbon is supported by a non-contact support apparatus according to embodiments of the present disclosure.
Figure 3:
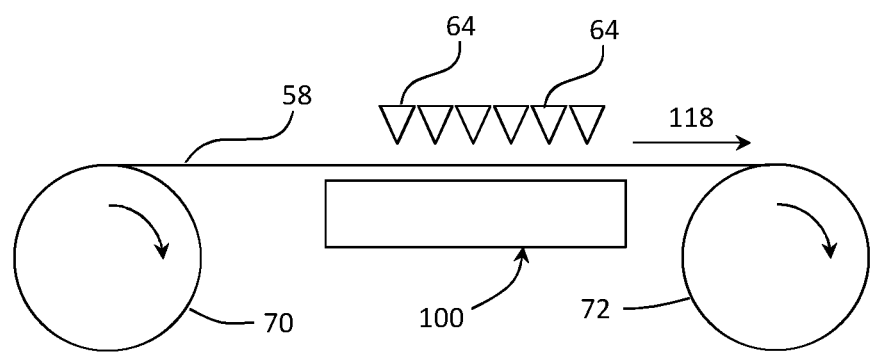
FIG. 3 is a cross sectional view of a glass ribbon being unspooled from a first spool of glass ribbon and supported by a non-contact support apparatus according to embodiments of the present disclosure.

FIG. 2 is a cross sectional view of forming body 42, wherein molten glass 28 is flowed into and overflows trough 52, thereafter flowing over converging forming surfaces 54 and then drawn in a downward direction from a bottom edge 56 of the forming body as glass ribbon 58. Glass ribbon 58 can then be re-oriented, for example from the draw direction to a second direction different from the draw direction, for example a horizontal direction, and then supported by a non-contact support apparatus 100 as the glass ribbon is conveyed in the second direction, as described herein below. It should be apparent from the foregoing, and in view of the following description, that glass ribbons drawn by other apparatus and by other methods, for example other down draw methods, up draw methods and float methods, could be similarly supported, with or without re-orientation, depending on the nature of the particular manufacturing method. In some embodiments, glass ribbon 58 may be provided from a spool of glass ribbon rather than directly from the forming process. That is, a glass ribbon previously drawn by any of the foregoing exemplary glass manufacturing methods and rolled onto a spool, for example supply spool 70 as shown in FIG. 3, may be subsequently unspooled and supported by non-contact support apparatus 100. In some embodiments, the unspooled glass ribbon may be heated, for example re-heated, to reduce a viscosity of the glass ribbon for further processing, such as re-forming (e.g., pressing, embossing, mold forming, etc.). In some embodiments, the glass ribbon may be re-wound onto a take-up spool 72 subsequent to the further processing. However, in further embodiments, the glass ribbon may be severed to produce a glass sheet 62, either before or after the further processing.

Accordingly, in some embodiments, the glass substrate may be thermally conditioned while supported and/or conveyed over non-contact support apparatus 100. For example, as shown in FIG. 2, a glass substrate 98 (e.g., glass ribbon 58 or glass sheet 62) is positioned between non-contact support apparatus 100 and one or more thermal elements 64. Thermal elements 64 may be electrical resistance heating elements, wherein an electric current is established in the one or more resistance heating elements, thereby heating the resistance heating elements and the glass substrate adjacent the resistance heating elements, although in further embodiments the thermal elements may comprise, for example, inductive heating elements or any other elements that produce heat sufficient to thermally condition the glass substrate, for example to a temperature greater than the anneal temperature of the glass ribbon. In some embodiments, glass substrate 98 may be heated to a temperature suitable for molding the glass substrate into a desired shape, e.g., by pressing the glass substrate in a mold (not shown) downstream of non-contact support apparatus 100.

In some embodiments, thermal elements 64 may include cooling elements, for example hollow cooling elements, wherein a cooling fluid is flowed through passages within the cooling elements. In some embodiments, thermal elements 64 may include both heating and cooling elements. In some embodiments, cooling may occur by direct impingement of a cooling fluid on glass substrate 98, for example by way of a jet of gas from one or more nozzles in fluid communication with a fluid source. For example, in some embodiments the glass substrate may be heated by a first set of thermal elements, after which further processing as described above may occur. Then, cooling of the glass substrate may be performed with a second set of thermal elements.

The apparatus and methods described herein may be used for non-contact support and/or conveyance of glass substrates existing through a range of viscosities from equal to or greater than about $10^6$ poise to about $10^{10}$ poise, for example in a range from about $10^6$ poise to about $10^9$ poise, in a range from about $10^6$ poise to about $10^8$ poise, in a range from about $10^6$ poise to about $10^7$ poise, in a range from about $10^7$ poise to about $10^{10}$ poise, in a range from about $10^7$ poise to about $10^9$ poise, in a range from about $10^7$ poise to about $10^8$ pose, in a range from about $10^8$ poise to about $10^{10}$ poise, in a range from about $10^8$ poise to about $10^9$ poise or in a range from about $10^9$ poise to about $10^{10}$ poise. A temperature of glass substrate 98 while supported by non-contact support apparatus 100 may be in a range from about 600° C. to about 1100° C., for example in a range from about 600° C. to about 700° C., such as in a range from about 600° C. to about 800° C., for example in a range from about 600° C. to about 850° C., for example at a temperature equal to or greater than about 700° C., for example in a range from about 700° C. to about 1100° C., in a range from about 800° C. to about 1100° C., in a range from about 900° C. to about 1100° C. or in a range from about 1000° C. to about 1100° C. In some embodiments, a temperature of the glass substrate can be equal to or greater than an anneal temperature of the glass comprising the glass substrate as the glass substrate is supported by the support apparatus. However, it should also be understood that while the following description relates to the support and/or conveyance of glass substrates exhibiting other than elastic properties (e.g., exhibiting viscous or visco-elastic properties) the apparatus and methods described herein may be used with glass substrates comprising a viscosity greater than $10^{10}$ poise, for example in a range from about $10^{10}$ poise to about $10^{11}$ poise, in a range from about $10^{10}$ poise to about $10^{12}$ poise, in a range from $10^{10}$ poise to about $10^{13}$ poise, in a range from about $10^{10}$ poise to about $10^{14}$ poise, or even greater. In some embodiments, a temperature of glass substrate 98 may be in a range from about 23° C. to about 600° C., for example in a range from about 23° C. to about 100° C., in a range from about 23° C. to about 200° C., in a range from about 23° C. to about 300° C., in a range from about 23° C. to about 400° C., or in a range from about 23° C. to about 500° C. Glass substrate 98 may include a thickness in a range from about 0.1 millimeters to about 10 millimeters, for example in a range from about 0.2 millimeters to about 8 millimeters, in a range from about 0.3 millimeters to about 6 millimeters, in a range from about 0.3 millimeters to about 1 millimeter, in a range from about 0.3 millimeters to about 0.7 millimeter, in a range from about 0.3 millimeters to about 0.7 millimeters or in a range from about 0.3 millimeters to about 0.6 millimeters. The apparatus and methods described herein are particularly useful for supporting and conveying large glass substrates, for example glass sheets or glass ribbon with a width Wg (see FIG. 5A) in a direction orthogonal to a conveyance direction equal to or greater than 1 meter, for example in a range from about 1 meter to about 2 meters, such as in a range from about 1 meter to about 1.1 meters, in a range from about 1 meter to about 1.2 meters, in a range from about 1 meter to about 1.3 meters, in a range from about 1 meter to about 1.4 meters, in a range from about 1 meter to about 1.5 meters, in a range from about 1 meter to about 1.6 meters, in a range from about 1 meter to about 1.7 meters, in a range from about 1 meter to about 1.8 meters, or in a range from about 1 meter to about 1.9 meters, although in further embodiments, glass substrate 98 may comprise a width less than 1 meter, for example in a range from about 0.25 meters to less than 1 meter, in a range from about 0.25 meters to about 0.75 meters, or in a range from about 0.25 meters to about 0.5 meters.

Figure 4:
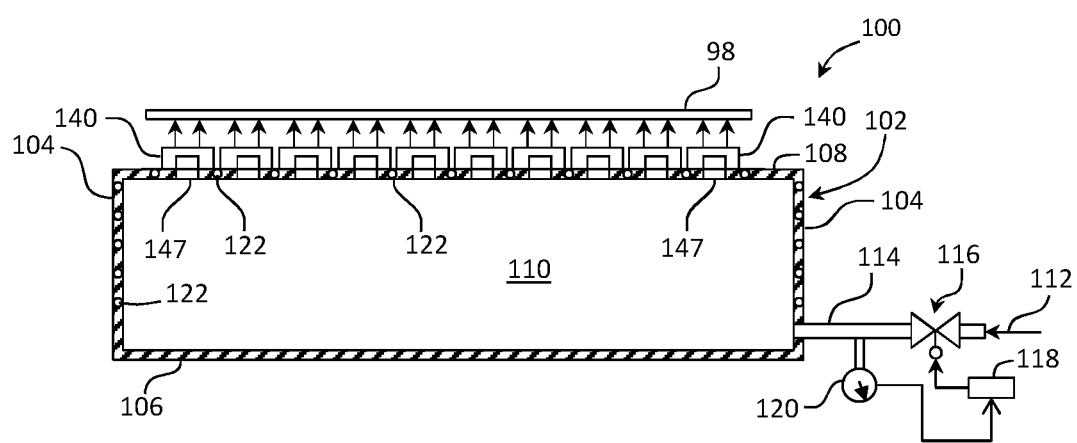
FIG. 4 is a cross sectional view of an exemplary non-contact support apparatus according to embodiments of the present disclosure.

FIG. 4 illustrates an exemplary non-contact support apparatus 100 for use in supporting and/or conveying a glass substrate 98 (for example glass sheet 62, or glass ribbon 58). Non-contact support apparatus 100 comprises a pressure box 102 including a plurality of connected side walls 104, a bottom wall 106 and a top wall 108, the plurality of side walls, bottom wall and top wall defining an interior chamber 110 configured to receive pressurized gas 112 from a source thereof (not shown), such as a compressor or storage flask. The plurality of connected side walls 104 may be arranged in any shape suitable for supporting and/or conveying glass substrate 98, although a typical arrangement is rectangular, wherein the pressure box comprises four side walls 104. Pressurized gas 112 may be provided to pressure box 102, for example, through supply pipe 114 providing fluid communication between the source of pressurized gas and pressure box 102. Pressurized gas 112 may be air, although in further embodiments, the pressurized gas may be predominately other gases, or mixtures of gases, including without limitation nitrogen, helium and/or argon or mixtures thereof.

Valves, gauges or other control components may be provided where needed, as generically represented by control valve 116. Control valve 116, and other control components may, where desired, be remotely controlled, for example by a controller 118 that provides a control signal, e.g., to control valve 116, in response to an input. The input may be provided, for example, by pressure gauge 120 that senses gas pressure within supply pipe 114 or within pressure box 102. Controller 118 can then compare the actual gas pressure within pressure box 102 to a set (predetermined) gas pressure, whereupon a pressure difference is determined and a suitable control signal provided to the appropriate component, e.g., control valve 116, to increase or decrease gas pressure to maintain the set pressure by opening or closing the control valve as necessary.

Side walls 104 and/or top wall 108 may comprise cooling passages 122 configured to carry a cooling fluid therethrough. For example, cooling passages 122 may be embedded within the respective wall or walls (e.g., walls 104, 106, 108), although in further embodiments, the cooling passages may be in contact with a surface of the respective wall. Cooling of the pressure box walls may be particularly beneficial in preventing distortion of the pressure box due to its proximity to the heat from glass substrates being conveyed at high temperature and/or the heating effect of thermal elements 64 when such thermal elements are heating elements. The cooling fluid may comprise water, and may further comprise additives, for example additives selected to prevent thermal corrosion of walls 104 106 and 108 or to enhance thermal conduction and heat removal, such as ethylene glycol, diethylene glycol, propylene glycol and mixtures thereof, although in further embodiments water may not be present in the cooling fluid. For example, the cooling fluid may be entirely ethylene glycol, diethylene glycol, propylene glycol and mixtures thereof, or other fluids capable of cooling the pressure box walls. In some embodiments, the cooling fluid may be a gas, for example air, although in further embodiments, the pressurized gas may be predominately other gases, or mixtures of gases, including without limitation nitrogen, helium and/or argon, or mixtures thereof. The walls (e.g., walls 104, 106 and 108) may be metallic, comprising a cobalt-chrome alloy or a nickel alloy such as Inconel 718 or Inconel 625. In some embodiments, the walls may comprise a ceramic material, such as alumina or zirconia, or in still other embodiments, graphite. The material comprising the walls may be selected, for example, on the basis of the thermal conductivity of the material, and may include a mix of different materials. For example, while one wall, such a top wall 108, may be formed from one material, side walls 104 may be formed from a different material.

Figure 5A:
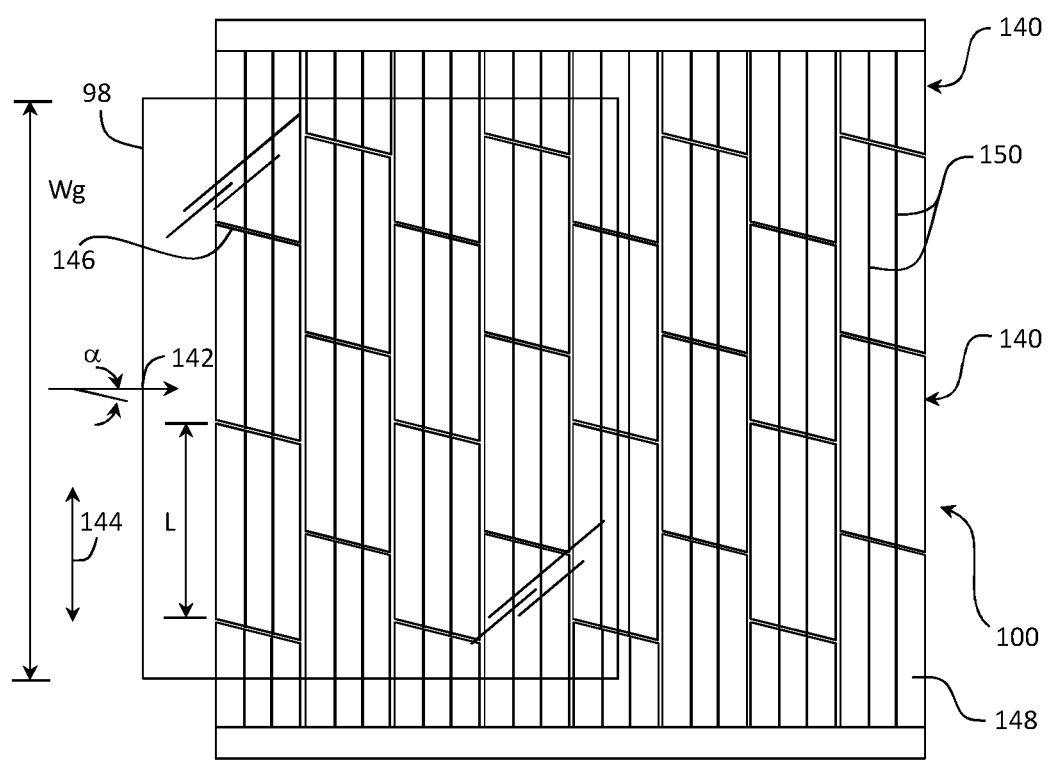
FIG. 5A is a top view of the non-contact support apparatus of FIG. 4
Figure 5B:
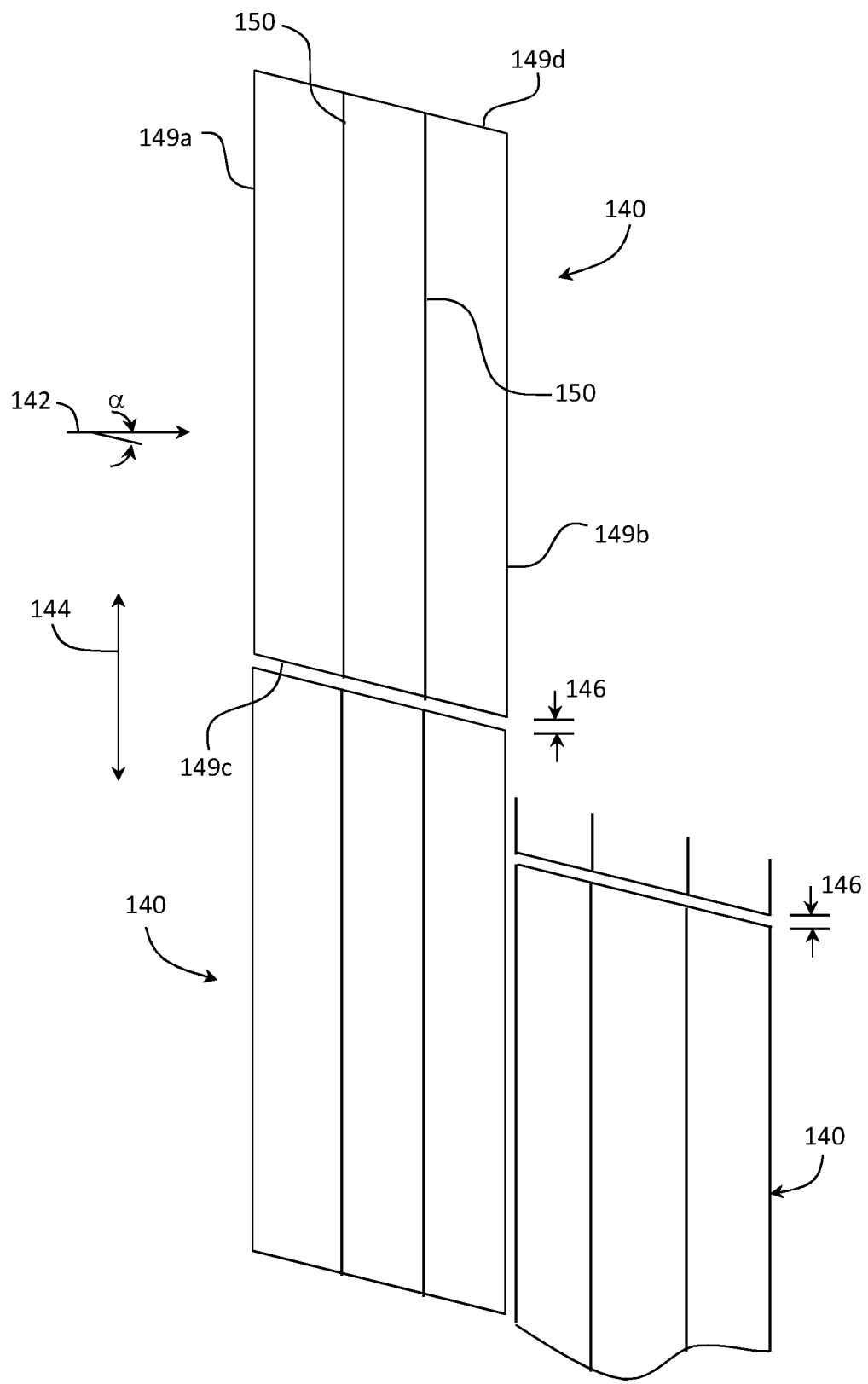
FIG. 5B is a close up view of a portion of the top view of FIG. 5A illustrating the angled relationship of end edge of gas bearings comprising the non-contact support apparatus of FIG. 5A.

Non-contact support apparatus 100 further comprises a plurality of gas bearings 140 coupled to a wall of pressure box 102, for example top wall 108 as shown in FIG. 4. Each gas bearing 140 is in fluid communication with pressure box 102 through one or more ports 147 extending through the adjacent wall, e.g., top wall 108, of pressure box 102. As illustrated in FIGS. 5A and 5B, the plurality of gas bearings 140 may be arranged in linear arrays, i.e., a plurality of rows of individual gas bearings extending parallel to an axis 144 orthogonal to a conveyance direction 142 of glass substrate 98, although in other embodiments, the gas bearings may be arranged in other patterns. Gas bearings 140 may be arranged so that gap 146 between adjacent gas bearings of one row are offset in a direction parallel to axis 144 from the gaps 146 in an adjacent row in the conveyance direction. That is, no gap 146 in one row is a linear continuation of any gap 146 in an adjacent row. Thus, the gas bearings may be staggered from one row to the next.

Each gas bearing 140 of the plurality of gas bearings comprises a major surface 148 oriented to be adjacent glass substrate 98 as glass substrate 98 is conveyed over the support apparatus along conveyance direction 142. Major surface 148 may be a substantially planar (flat) surface, although in other embodiments, major surface 148 may be a curved surface. Major surface 148 is defined by a plurality of peripheral edges including a first pair of parallel edges 149a, 149b orthogonal to conveyance direction 142, and a second pair of edges 149c, 149d connecting the first pair of edges, the second pair of edges arranged at an angle α relative to conveyance direction 142 and complementary to each other. The first and second pairs of edges represent the intersection between edge surfaces of the gas bearing and major surface 148. The edge surfaces may be orthogonal to major surface 148. Angled edges 149c, 149d, and in particular the associated angled edge surfaces, can minimize, such as eliminate, indents, ripples or other physical marring of a surface of glass substrate 98 during conveyance of the glass substrate, for example when glass substrate 98 is viscous or visco-elastic within the range of viscosities described herein. It will be appreciated based on the foregoing description that the interface or gap between adjacent gas bearing in the length direction (parallel to axis 144) is angled at the angle α relative to conveyance direction 142, for example in a range from about 20 degrees to about 60 degrees, such as in a range from about 30 degrees to about 50 degrees. Gas bearing 140 may be manufactured by conventional machining methods, although in further embodiments, gas bearing 140 may be produced as a monolithic body by 3D printing.

Figure 6:
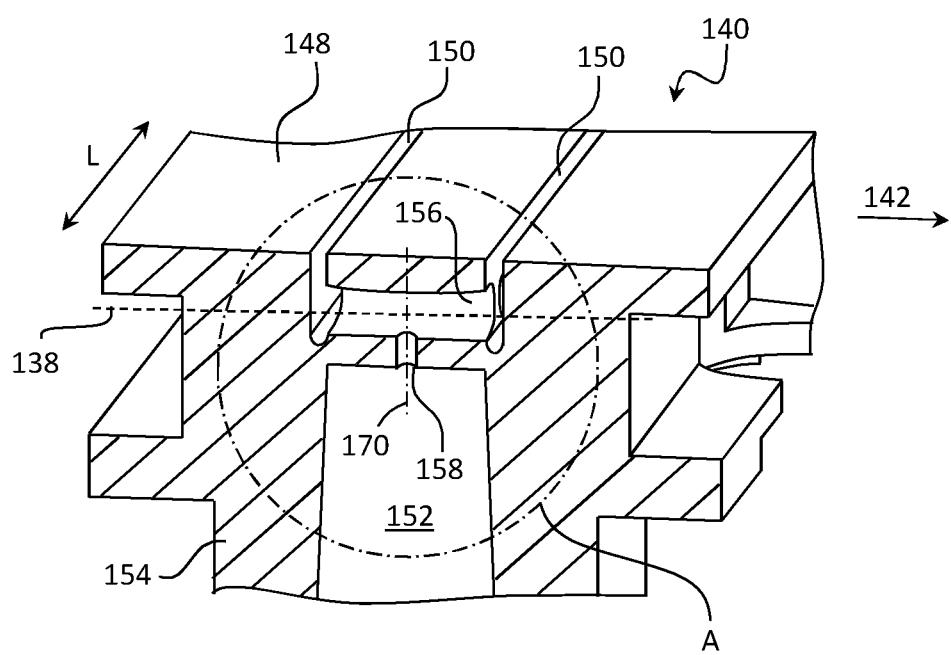
FIG. 6 is a cross sectional perspective view of an embodiment of a gas bearing according to the present disclosure.
Figure 7:
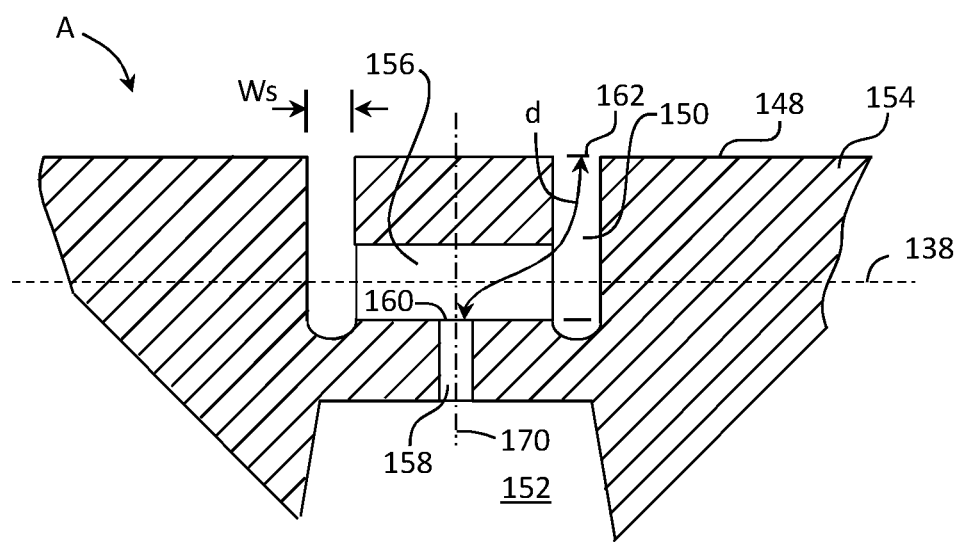
FIG. 7 is a cross sectional view of a portion of the gas bearing shown in FIG. 6.

Turning now to FIGS. 6 and 7, an exemplary gas bearing 140 is described comprising a plenum 152 positioned within an interior of body 154 of the gas bearing, plenum 152 comprising an elongate cavity extending in a direction parallel with the length direction of the gas bearing. In some embodiments, plenum 152 of one gas bearing is not connected directly with a plenum of an adjacent gas bearing, and is not in fluid communication with any adjacent plenum except through chamber 110. In some embodiments, gas bearing 140 may comprise a plurality of plenums 152, wherein each plenum of the plurality of plenums is not in direct fluid communication with an adjacent plenum 152 within the same gas bearing body.

Plenum 152 is in fluid communication with one or more slots 150 through an intermediate passage 156 that distributes pressurized gas 112 to the one or more slots 150, and further in fluid communication with chamber 110 through passage 147 extending through top wall 108. In the embodiment of FIGS. 6 and 7, intermediate passage 156 is sized such that intermediate passage 156 does not substantially restrict the flow of gas between plenum 152 and slots 150. In the present embodiment, intermediate passage 156 is shown extending between and in fluid communication with two adjacent, parallel slots 150. As shown, intermediate passage 156 may comprises a cylindrical shape, although in other embodiments, intermediate passage 156 may comprise other hollow tubular shapes. A central longitudinal axis 138 of intermediate passage 156 may be parallel with major surface 148, although in further embodiments, longitudinal axis 138 may be at other angles relative to major surface 148.

Impedance orifice 158 is positioned between and in fluid communication with both plenum 152 and intermediate passage 156, and restricts the flow of pressurized gas between plenum 152 and intermediate passage 156. Accordingly, impedance orifice 158 may in some embodiments directly connect plenum 152 with intermediate passage 156. In some embodiments, impedance orifice 158 may be a generally cylindrical bore extending between plenum 152 and intermediate passage 156, although in further embodiments, impedance orifice 158 may have other shapes. A longitudinal axis 170 of impedance orifice 158 may be aligned perpendicular to major surface 148, although in other embodiments, longitudinal axis 170 may be aligned at other angles relative to major surface 148. Impedance orifice 158 is sized such that a pressure drop across the impedance orifice is in a range from about 50 to 100 times the pressure in the space between major surface 148 and glass substrate 98 when glass substrate 98 is supported by non-contact support apparatus 100. In an example embodiment, the impedance orifice may be dimensioned to generate a pressure drop of about 15 mbar (0.218 psi) for a 10 liter/minute (0.35 cubic feet per minute) gas flow rate. While only a single impedance orifice 158 is shown, gas bearing 140 may comprises a plurality of impedance orifices extending between a plurality of intermediate passages 156 and plenum 152.

Gas bearing 140 further comprises one or more slots 150 extending along a length L of the gas bearing, for example the entire length L of the gas bearing. In some embodiments, a width Ws of the one or more slots 150 may be substantially uniform along the length of the slots. The one or more slots 150 may extend in a direction parallel with axis 144 and orthogonal to conveyance direction 142. While FIGS. 6 and 7 illustrate gas bearing 140 comprising two slots 150, gas bearing 140 may include more than two slots.

Slots 150 open at the major surface 148 of gas bearing 140, opening 162 being a continuous slot-shaped opening extending along the length of the gas bearing and from which gas is exhausted from the gas bearing during operation of the gas bearing. In accordance with embodiments of the present disclosure, exit aperture 160 of impedance orifice 158 can be spaced at least about 5 millimeters distant from opening 162 of slot 150. For example, referring to FIG. 7, which is a close up view of section A of FIG. 6 denoted by the dashed-and-dotted circle, the exit aperture 160 of impedance orifice 158 is separated from the opening 162 of slot 150 (i.e., at the plane of major surface 148) by at least a distance d, wherein distance d is the shortest flow path between the opening at major surface 148 and the exit aperture 160 of an impedance orifice. In some embodiments, distance d is equal to or greater than about 10 millimeters, for example in a range from about 10 millimeters to about 20 millimeters, although in further embodiments, distance d can be greater than 20 millimeters. Spacing of the exit aperture 160 of impedance orifice 158 from opening 162 of slot 150 helps maintain a substantially uniform gas flow along the length of slot 150.

In some embodiments, gap 146 between adjacent gas bearings arranged end-to-end within a given row of gas bearings may be minimized to the extent that substantially no gas flowing through a slot 150 escapes from a gap between slot 150 and a slot of an adjacent gas bearing. That is, gas may flow from a slot of one gas bearing to an adjacent slot of another gas bearing, the gas bearings arranged such that a slot of the first gas bearing is aligned with a slot of the end-to-end adjacent gas bearing, without a substantial volume of gas escaping from either slot, except through the major surface opening of the slot. Thus, in effect, the two or more aligned slots perform substantially as one continuous slot. In some embodiments, a gasket may be used within gap 146 to prevent gas leakage from between adjacent gas bearings.

Figure 8:
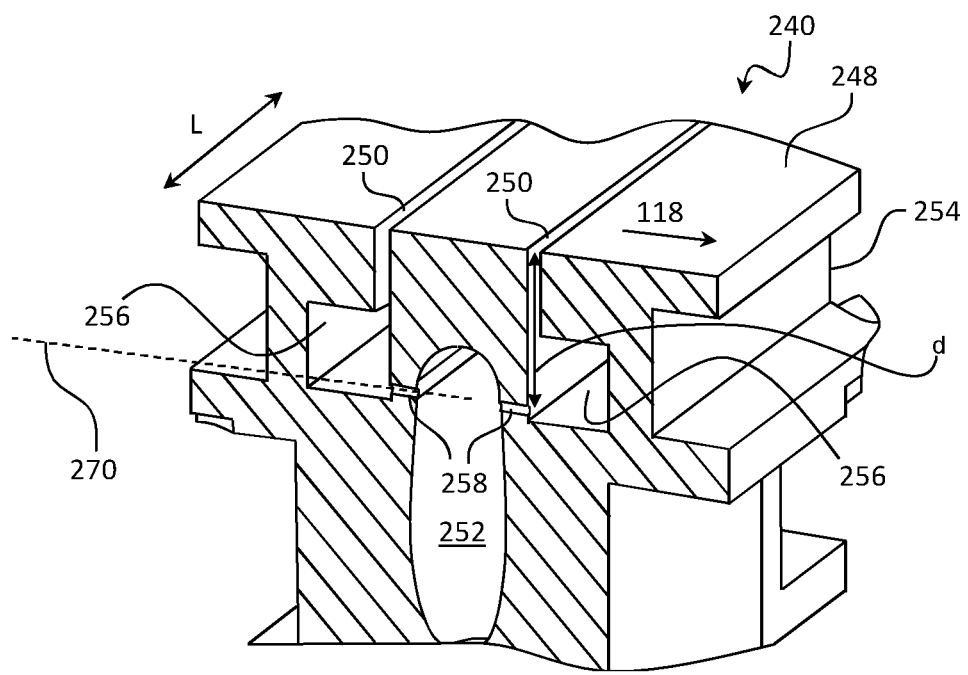
FIG. 8 is a cross sectional view of another embodiment of a gas bearing according to the present disclosure.

FIG. 8 is a cross sectional view of another embodiment of a gas bearing 240 similar to the gas bearing 140 depicted in FIGS. 6 and 7, gas bearing 240 comprising a body 254 including a plenum 252 in fluid communication with chamber 110 through passage 157, and an intermediate passage 256 in fluid communication with a slot 250. As shown in FIG. 8, slot 250 may connect directly with intermediate passage 256, without intervening passages. As also shown by FIG. 8, the volume of intermediate passage 256 may be greater than the volume of slot 250. Two adjacent slots 250 are shown in FIG. 8, each slot 250 in fluid communication with a separate intermediate passage 256 extending in the length direction of the gas bearing in a parallel orientation. Accordingly, two intermediate passages 256 are shown, one intermediate passage per slot 250. However, it should be understood that multiple slots 250 could be connected to an individual intermediate passage 256. As also shown, intermediate passage 256 is in fluid communication with plenum 252 via an impedance orifice 258 extending between and connecting intermediate passage 256 with plenum 252. Gas bearing 240 may comprise a plurality of impedance orifices 258 extending between plenum 152 and intermediate passage 256, or a plurality of intermediate passages 256 along a length of gas bearing 140. In the embodiment of FIG. 8, impedance orifice 258 is illustrated as a generally cylindrical bore including a central longitudinal axis 270 that in some examples may be parallel with major surface 248, although in other embodiments, impedance orifices may have other shapes, and central longitudinal axis 270 need not be parallel with major surface 248.

Impedance orifice 258 restricts the flow of pressurized gas between plenum 252 and intermediate passage 256. In some embodiments, plenum 252 is not in connected directly with a plenum of an adjacent gas bearing, and may not be in fluid communication with an adjacent plenum except through chamber 110. For example, in some embodiments, each gas bearing may comprise a plurality of plenums 252, wherein each plenum of the plurality of plenums is not in direct fluid communication with an adjacent plenum 252 except through chamber 110. Impedance orifice 258 is sized such that a pressure drop across impedance orifice 258 is in a range from about 50 to 100 times the pressure in the space between major surface 248 and glass substrate 98 when glass substrate 98 is supported by non-contact support apparatus 100.

Slot 250 opens at major surface 248 of gas bearing 240, the opening being a continuous slot-shaped opening extending along the length of the gas bearing. In accordance with embodiments of the present disclosure, the exit aperture of impedance orifice 258 can be spaced at least about 5 millimeters distant from the major surface opening of slot 250. For example, the exit aperture of impedance orifice 258 is separated from the exit opening of slot 250 (i.e., at the plane of major surface 248) by at least a distance d, wherein distance d is the shortest flow path between the opening at surface 248 and the exit aperture of impedance orifice 258. In some embodiments, distance d is at equal to or greater than about 10 millimeters, for example in a range from about 10 millimeters to about 20 millimeters, although in further embodiments, distance d can be greater than 20 millimeters.

It should be noted that non-contact support apparatus described herein, while beneficial for the support and/or conveyance of glass substrates, and in particular glass substrates at a temperature above an anneal temperature of the glass substrate, the non-contact support apparatus may be useful for supporting and/or conveying other substrates comprising other materials, for example and without limitation, polymer materials, metallic material glass-ceramic materials and ceramic materials.

In accordance with the present disclosure, a method for supporting a glass substrate 98 is disclosed. The method can comprise conveying glass substrate 98 over a non-contact support apparatus 100 as disclosed herein above in a conveyance direction. The non-contact support apparatus 100 comprises a pressure box 102 enclosing a chamber 110 in fluid communication with a source of pressurized gas, for example a compressor or a pressurized gas flask or cylinder. Pressure box 102 further includes a plurality of gas bearings 140 positioned on the pressure box, and arranged in a plurality of rows extending orthogonal to conveyance direction 118 of glass substrate 98. Each gas bearing 140 of the plurality of gas bearings comprises a plenum 152 in fluid communication with chamber 110 and extends in a length direction of the gas bearing. Gas bearing further comprises an intermediate passage 156 in fluid communication with plenum 152 through an impedance orifice 158 sized to restrict a flow of gas between plenum 152 and intermediate passage 156, and a slot 150 in fluid communication with intermediate passage 156 and extending along the length of the gas bearing, the slot opening at major surface 148 of the gas bearing and configured to exhaust a gas therefrom in order to support glass substrate 98 on a layer of pressurized gas. A width Ws of the slot can be uniform along the length of the slot.

The method further comprises exhausting a gas from slot 150 along a length of the slot, thereby supporting glass substrate 98 in a position spaced apart from major surface 148 of gas bearing 140. In some embodiments, a pressure drop through the impedance orifice 158 is equal to or greater than 50 times a gas pressure between gas bearing 140 and glass substrate 98, for example in a range from about 50 to about 100 times the gas pressure between the gas bearing and the glass substrate.

The method may further comprise heating glass substrate 98 to a temperature greater than an anneal temperature of the glass substrate as the glass substrate is conveyed over the support apparatus. A width Wg of the glass substrate is at least 1 meter, and a maximum variation of a major surface of the glass substrate does not exceed 100 micrometers relative to a reference plane after conveying the glass substrate over the non-contact support apparatus 100. The reference plane may be, for example a plane of the glass substrate.

In some embodiments, the glass substrate is a glass ribbon, the method further comprising drawing the glass ribbon from a forming body prior to supporting the glass ribbon with the support apparatus. In some embodiments, the method may further comprise re-directing the glass ribbon from a first direction to a second direction different than the first direction prior to supporting the glass substrate with the support apparatus.

In some embodiments, a gas pressure exhausted from gas bearings positioned adjacent edge portions of the glass substrate can be greater than a gas pressure exhausted from gas bearings positioned beneath a central portion of the glass substrate, although in other embodiments, the reference plane can be major surface 148.

In some embodiments, the gas pressure exhausted from gas bearings positioned adjacent edge portions of the glass substrate can be greater than a gas pressure exhausted from gas bearings positioned beneath a central portion of the glass substrate. For example a second and/or a third plurality of gas bearing may be arrayed along portions of pressure box 102 over which edge portions of glass substrate 98 is conveyed. Gas bearings of the second/an/or third plurality of gas bearing can have their impedance orifices sized differently that the impedance orifices arranged along the conveyance path of the central portion of the glass substrate to compensate for any decrease in gas pressure that might occur near the edges of the support device.

Glass sheets are commonly fabricated by flowing molten glass to a forming body whereby a glass ribbon may be formed by a variety of ribbon forming processes including, float, down-draw (e.g., slot draw and fusion draw), up-draw, or any other forming processes. This can for example be from a rolling process as described in US20150099618.

Discretized Gas Bearing

Being able to process a ribbon of hot glass in its softened state without touching the glass is of interest in numerous situations, such as, for example, when turning a glass ribbon from an essentially vertical orientation to an essentially horizontal orientation, when moving or conveying glass horizontally while still in viscous conditions, when slumping glass by gravity while avoiding contact, or when accumulating a mass of molten glass from a glass stream.

The glass ribbon from any of these processes may then be subsequently divided to provide one or more glass sheets suitable for further processing into a desired application, including but not limited to, a display application. For example, the one or more glass sheets can be used in a variety of display applications, including liquid crystal displays (LCDs), electrophoretic displays (EPD), organic light emitting diode displays (OLEDs), plasma display panels (PDPs), or the like. Strengthened glass sheets, for example glass sheets subjected to an ion exchange process or thermally tempered glass sheets, can be used as cover glass in certain display applications. Glass sheets may be transported from one location to another. The glass sheets may be transported with a conventional support frame designed to secure a stack of glass sheets in place. Moreover, interleaf material can be placed between each adjacent glass sheet to help prevent contact between, and therefore preserve, the pristine surfaces of the glass sheets.

Gas bearing technology is known. However, known technology lacks one or more features described herein, including but not limited to integrated thermal control, fine gas feed pitch, and high operating temperature capability.

In some embodiments, the gas bearing comprises discretized outlet ports, is capable of operating at high temperatures (e.g., up to 800-1000° C.), and comprises an integrated thermal control system (e.g., passage for cooling fluid). The discretized outlet ports comprise a pattern of small pitch (e.g., at least 8,000 outlet ports per m$^2$). The internal gas circuits provide small channels creating back pressures significantly higher than the pressure created by the glass to be supported, moved, or turned.

The internal gas circuits provide the ability to control the temperature range of the device through, for example, internal channels for passage of a cooling fluid, integrated fin systems for increase of heat exchange with the environment, and passages of inserting electrical heaters.

In some embodiments, the gas bearing device can be manufactured by 3D printing methods or investment casting methods (e.g., using lost wax technology).

One advantage of some embodiments is that a finely discretized gas bearing supply can support softened material, such as hot glass. Coarsely discretized gas bearings do not provide adequate support for softened material. The gas bearing also provides a desirable ratio of pressure to the bearing to pressure in the gas film.

Compared to gas bearings that contact the softened glass, some embodiments described herein provide advantages, such as no damage or surface imperfections linked to the contact, significant reduction of heat transfer between glass and tooling, which can extend the formability of glass, and no friction between support and molten glass.

Figure 17:
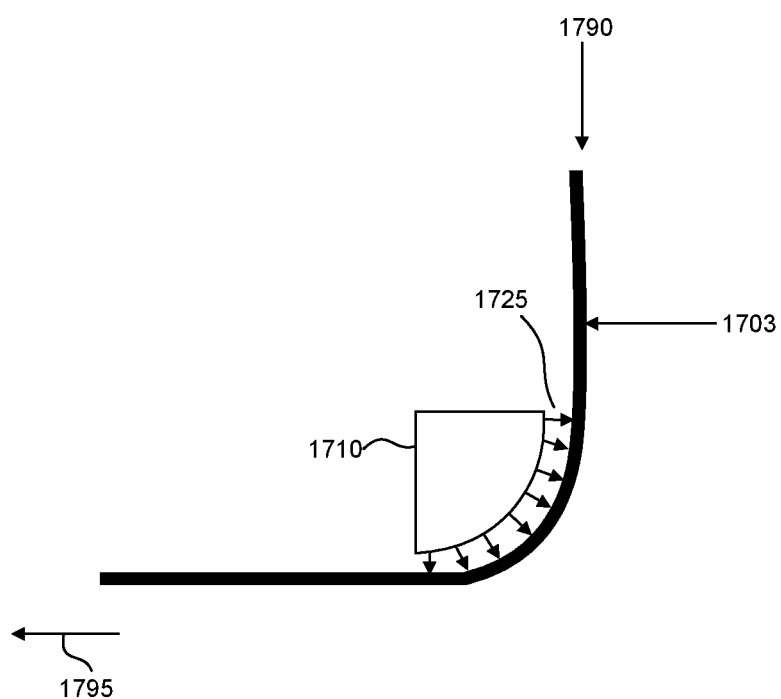
FIG. 17 is a schematic view of an exemplary gas bearing device.

The gas bearing can be used, as illustrated in FIG. 17, to turn a glass ribbon from vertical to horizontal. The gas bearing device defines the shape of the ribbon during the turning while avoiding any contact with the glass. This ensures no friction or damage to the glass surface.

Figure 18:
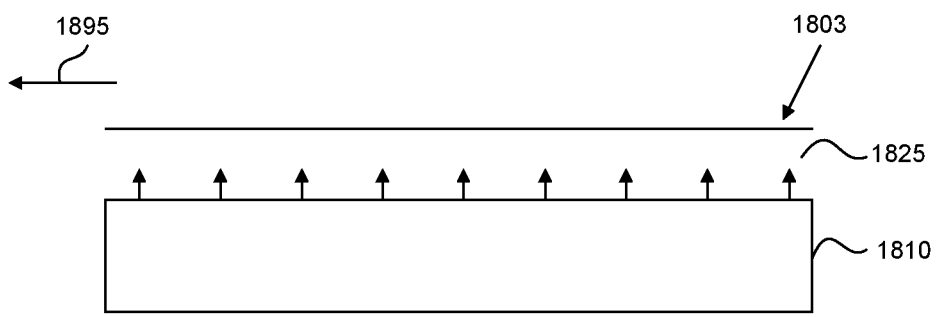
FIG. 18 is a schematic view of an exemplary gas bearing device.

As shown in FIG. 18, the gas bearing device may also convey or support glass on a substantially horizontal plane without contact between the gas bearing and the glass. In some embodiments, the soft glass ribbon is supported on a substantially horizontal plane while being conveyed from the forming area to the roll conveying area.

Figure 19A:
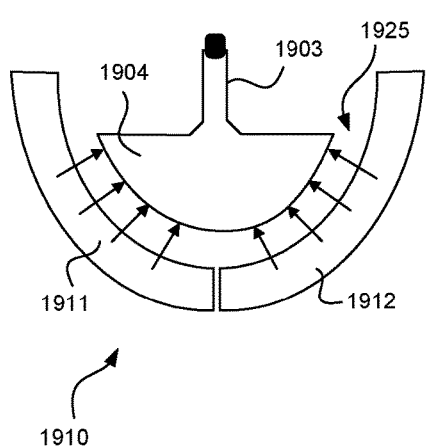
FIG. 19A is a schematic view of an exemplary gas bearing device.
Figure 19B:
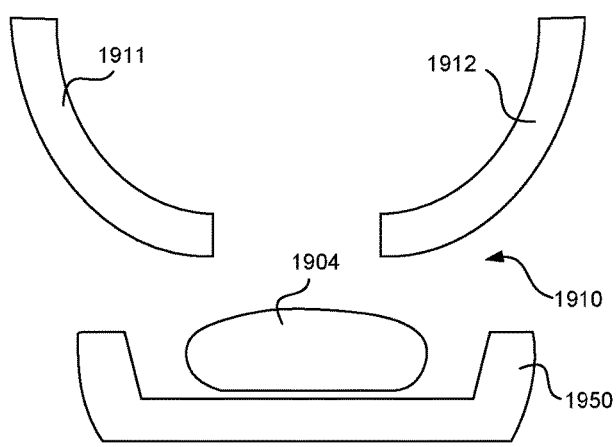
FIG. 19B is another view the gas bearing device shown in FIG. 19A.

As shown in FIGS. 19A and 19B, the gas bearing device may also be an accumulator. The accumulator may be made in two or more portions, in which glass accumulates without contact between the accumulator and the glass. The two or more portions may separate when a desired volume of glass accumulates, and the volume of glass falls directly on a mold, where it can be further formed or processed. The gas bearing may be used to receive and accumulate a stream of molten glass in order to pre-shape it in thermally controlled conditions. This can avoid very significant cooling of the glass during this operation.

Figure 20A:
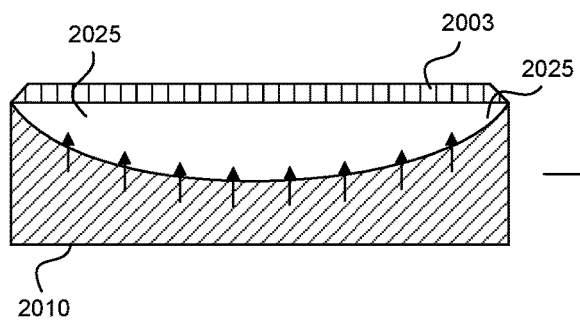
FIG. 20A is a schematic view of an exemplary gas bearing device.
Figure 20B:
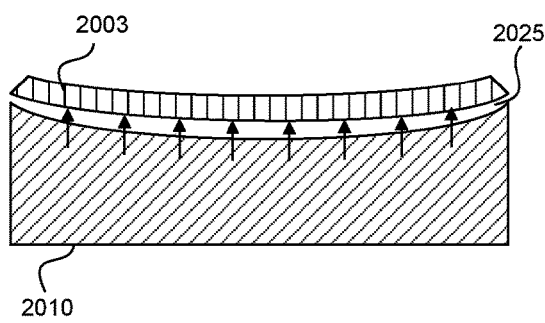
FIG. 20B is a schematic view of the gas bearing device shown in FIG. 20A.

As shown in FIGS. 20a and 20b, the gas bearing device may also be capable of supporting the glass as it sags under gravity. This allows deformation of glass sheets without contacting the mold. In this configuration, the glass is first loaded over the gas bearing device, and then the gas bearing device supports the glass as it sags without contact between the glass and the gas bearing device.

While FIG. 20 illustrates non-contact deformation of a sheet into a curved sheet, other shapes may be similarly deformed, such as tubes and more complex shapes.

Figure 23:
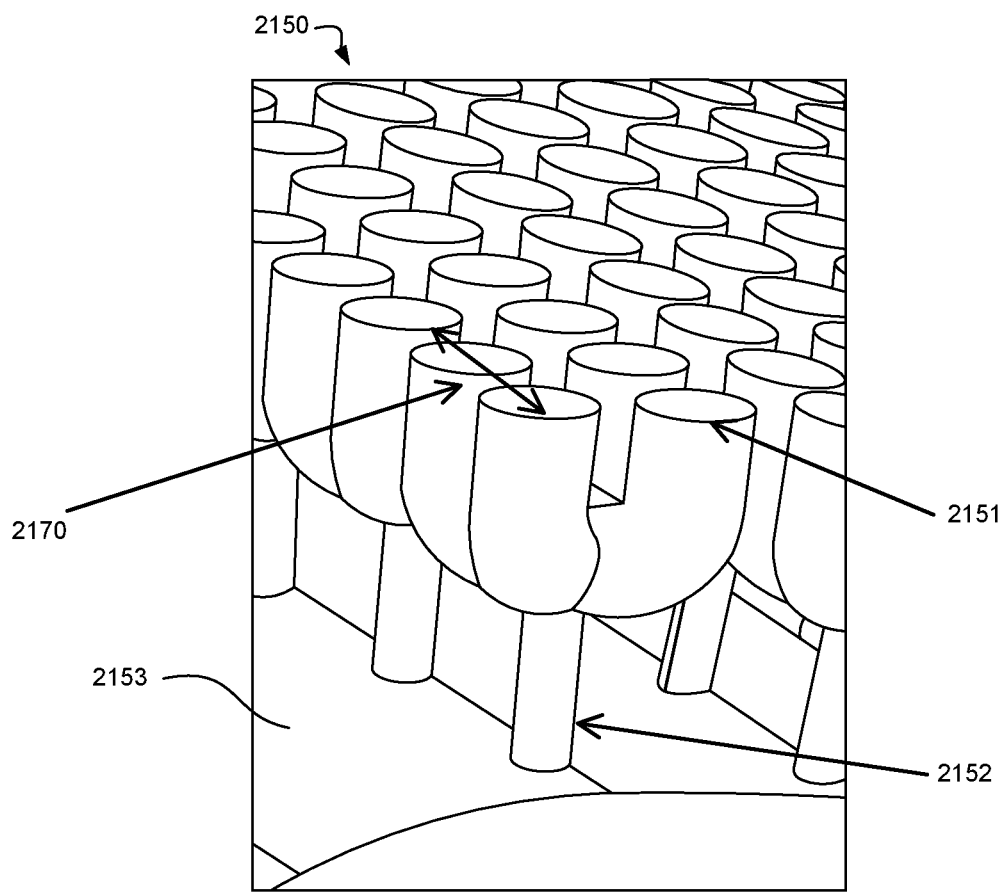
FIG. 23 shows another view of the gas bearing device shown in FIG. 21.

The gas bearing device may also have gas passages. The gas bearing device may also have an integrated water cooling circuit. The gas bearing device comprises outlet ports distributed over a pitch, as shown in FIG. 23. The outlet ports are fed with gas. The feed gas passes through metering pipes. Each metering pipe in turn feeds at least one outlet port. In a particular embodiment, each metering pipe feeds 4 outlet ports and the pitch between outlet ports is 3 mm. For example, in as shown in FIG. 23, each metering pipe 2152 feeds 4 outlet ports 2151, and the pitch 2170 between each outlet port is 3 mm.

In addition to the outlet ports, the gas bearing device may have vent ports disposed on the support surface, as shown in FIGS. 31-34. The vent ports provide an array of ports that allow gas to escape from the gas film. This can be of interest when supporting articles of significant size, which can lead to a "bubble effect" if only outlet ports supplying gas are present and no vent ports are present.

Figure 24:
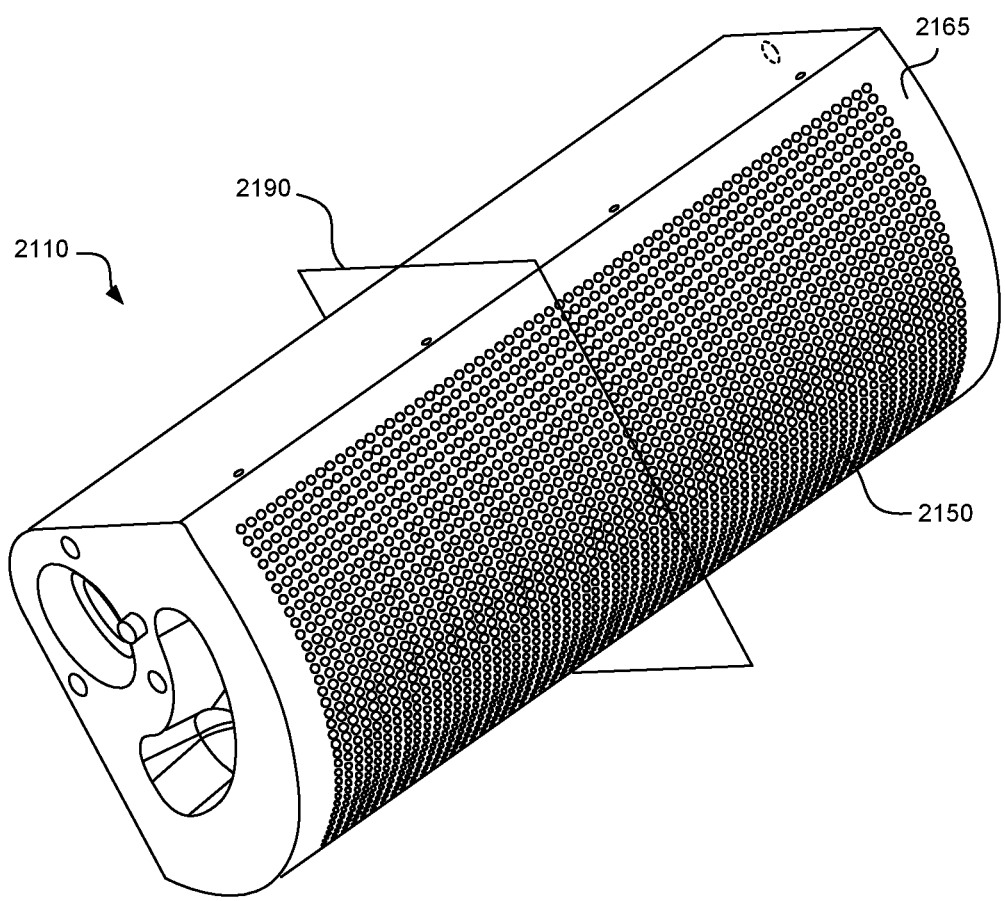
FIG. 24 shows the gas bearing device of FIG. 21 with a cover surrounding the gas bearing device.

Embodiments disclosed herein include devices able to support soft or molten glass without contact with any surface which are characterized by the following:

The gas bearing may have a finely discretized array of outlet ports through which the gas is supplied, as shown in, for example, FIG. 24. These outlet ports can be circular channels, but significant departure from circular channels is also possible. A particular aspect is that metering pipes of smaller cross sections are provided for the gas before it reaches the outlet ports. The metering pipe can be a circular pipe, but significant departure from circular is also possible. In some embodiments, the metering pipe may be a slot. A metering pipe may feed one single outlet port, but it is generally preferred to distribute the gas flow from one metering pipe to several outlet ports.

In some embodiments, a gas bearing provides a gas flow to the gas film independent of the pressure that the material being supported (e.g. glass ribbon, glass sheet) applies. This requires that the pressure fed in to the gas bearing gas inlet is significantly larger than the pressure applied by the material being supported. The metering pipe creates the corresponding pressure drop.

An index for the performance of a bearing is defined as: Index=$zx^2/a$ in units of $m^{-1}$ where X is the mean spacing between the metering pipes, or $X^2$ is the area corresponding to metering pipe for a non-square distribution, expressed in meters, Z is the impedance of the gas circuit of one metering pipe, expressed in Pa·s/m$^3$, and μ is the dynamic viscosity of the bearing gas expressed in Pa·s. The index value is directly proportional to both the mean spacing between the metering pipes (X) and impedance of the gas circuit of one metering pipe (Z). The index value is inversely proportional to the dynamic viscosity (μ). Thus, the index value increases as X increases, Z increases, or μ decreases. An Index having a larger numerical value is considered "greater" than an index having a smaller numerical value, even though the units are $m^{-1}$. In some embodiments, index values greater than $2.5 \times 10^6$ $m^{-1}$ are acceptable. In a preferred embodiment, index values are greater than $5 \times 10^6$ $m^{-1}$. In some embodiments, the impedance of the vent ports is less than the impedance of the metering pipes.

In some embodiments, independent channels, or cooling circuits, to be used for circulation of a thermal fluid. The thermal fluid can be a gas or a liquid for obtaining a cooling effect, or a pre-heated fluid providing thermal energy to the part. Passages for insertion of electrical heating elements may also be used.

It can also be useful to move, reposition, or support a stream of molten glass without contacting the glass. Gas bearing devices that are not finely discretized, or coarsely discretized, may provide adequate support for rigid bodies, but coarsely discretized gas bearings do not provide adequate support for softened bodies, such as softened glass. This gas bearing device comprises finely discretized outlet ports that supply gas to create a thin gas film. The gas bearing device may be configured to move, reposition, or support the glass without contact between the device and the glass while also providing adequate support for a softened body. The gas bearing device also comprises an integrated thermal control system. The gas film allows for processing glass at high temperatures without causing any damage or imperfections to the surface of the glass from contact. The gas film also reduces heat transfer from the glass, which can extend the time that the glass may be formed. Further, there is no friction between the gas film support and the glass.

Figure 9:
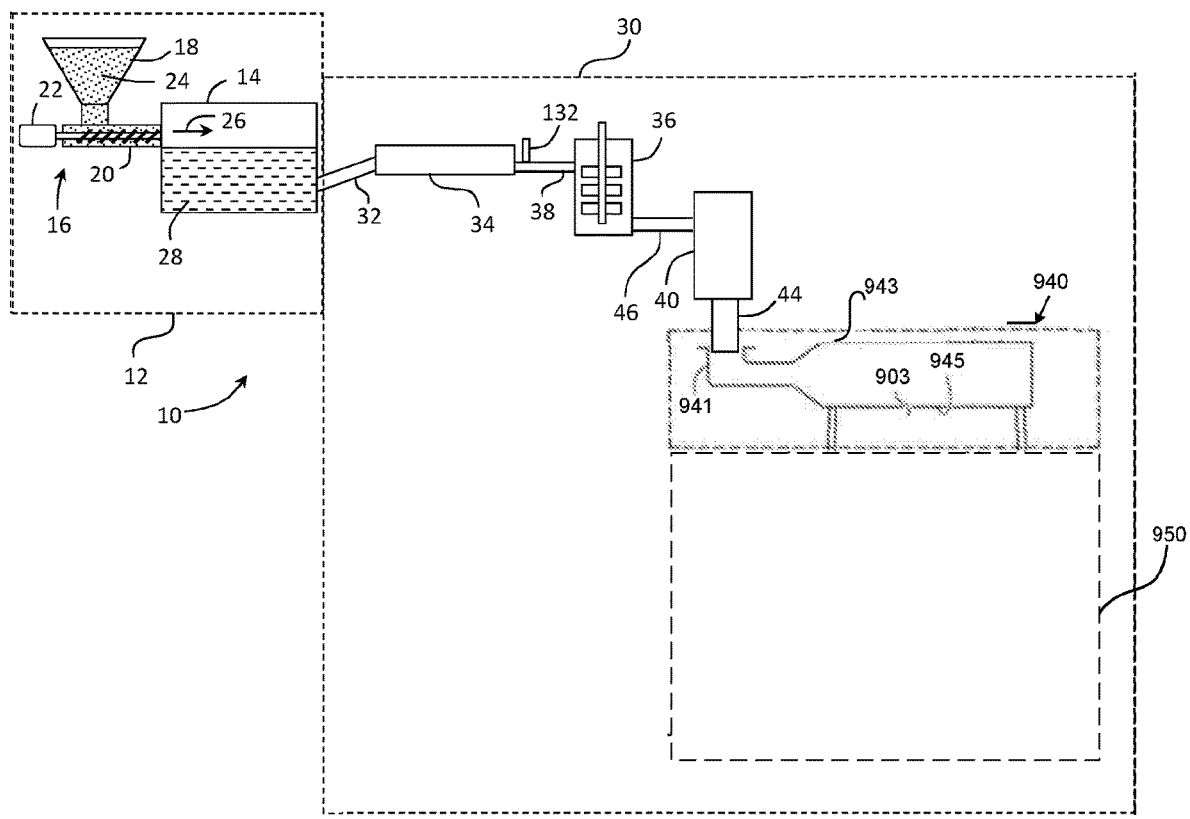
FIG. 9 is a schematic view of an exemplary glass processing system including a glass manufacturing apparatus to draw a glass ribbon.

As shown in FIG. 9, in some embodiments, glass manufacturing apparatus 10 provides a glass ribbon 903 with downstream glass manufacturing apparatus 30 such as a slot draw apparatus, float bath apparatus, down-draw apparatus, up-draw apparatus, press rolling apparatus, or other glass ribbon manufacturing apparatus (as described in further detail below). FIG. 9 schematically illustrates an exemplary downstream glass manufacturing apparatus for drawing glass ribbon 903 for subsequent processing into glass ribbons through the use of a glass feed unit 940.

Downstream glass manufacturing apparatus 30 can further include a delivery vessel 40 and exit conduit 44. Delivery vessel 40 may condition molten material to be fed into glass feed unit 940.

As further illustrated, an exit conduit 44 can be positioned to deliver molten glass 28 to glass feed unit 940 of downstream glass manufacturing apparatus 30. As discussed more fully below, glass feed unit 940 may draw molten glass 28 into glass ribbon 903 off of a root 945 of a forming vessel 943. In the illustrated embodiment, forming vessel 943 can be provided with an inlet 941 oriented to receive molten glass 28 from exit conduit 44 of delivery vessel 40.

Glass feed unit 940 can be scalable to deliver glass ribbon 903 of a desired size. In some embodiments, glass ribbon 903 can have a width from 50 mm to 1.5 meters (m). In some embodiments, glass ribbon 903 can have a width from 50 mm to 500 mm. Glass ribbon 903 can have a width from 150 mm to 300 mm. In some embodiments, the width of glass ribbon 903 can be from 20 mm to 4,000 mm, such as from 50 mm to 4,000 mm, such as from 100 mm to 4,000 mm, such as from 500 mm to 4,000 mm, such as from 1,000 mm to 4,000 mm, such as from 2,000 mm to 4,000 mm, such as from 3,000 mm to 4,000 mm, such as from 20 mm to 3,000 mm, such as from 50 mm to 3,000 mm, such as from 100 mm to 3,000 mm, such as from 500 mm to 3,000 mm, such as from 1,000 mm to 3,000 mm, such as from 2,000 mm to 3,000 mm, such as from 2,000 mm to 2,500 mm, and all ranges and subranges therebetween.

Downstream glass manufacturing apparatus 30 can further include a post-feed glass forming device 950. Post-feed glass forming device 950 can receive molten glass stream fed by glass feed unit 940 and produce glass ribbons and/or glass sheets from the molten glass stream. In some embodiments, exemplarily post-feed glass forming devices 950 are described below in FIGS. 10-14 in detail.

Forming pristine glass sheets from glass compositions that devitrify at rather low viscosities is difficult. In either traditional fusion draw processes or slot draw processes, the limitation is related to the fact that in these vertical processes, lowering the viscosity at the delivery point leads to a decrease in the viscous force that develops when drawing the sheet. In some embodiments, the delivery point is the last place where molten glass stream touches a solid surface before moving in to free fall, e.g., root of the forming body for the fusion process, or tip of the slot in the slot draw process. This drawing force can become smaller than the weight of the sheet. The sheet is then no longer in tension and will have out of plane movements, known as "baggy warp."

In some embodiments, glass forming apparatus and methods described herein allow thin glass sheets to be made from glass compositions that devitrify at rather low viscosities, for example, glasses having liquidus viscosities lower than 25,000 poises, such as lower than 10,000 poises or from 500 poises to 5,000 poises, which is very difficult to be achieved by traditional fusion draw processes or slot draw processes. Moreover, the process can be set up at a moderate scale without needing the huge capital expenditure of a large scale float line.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

Figure 10:
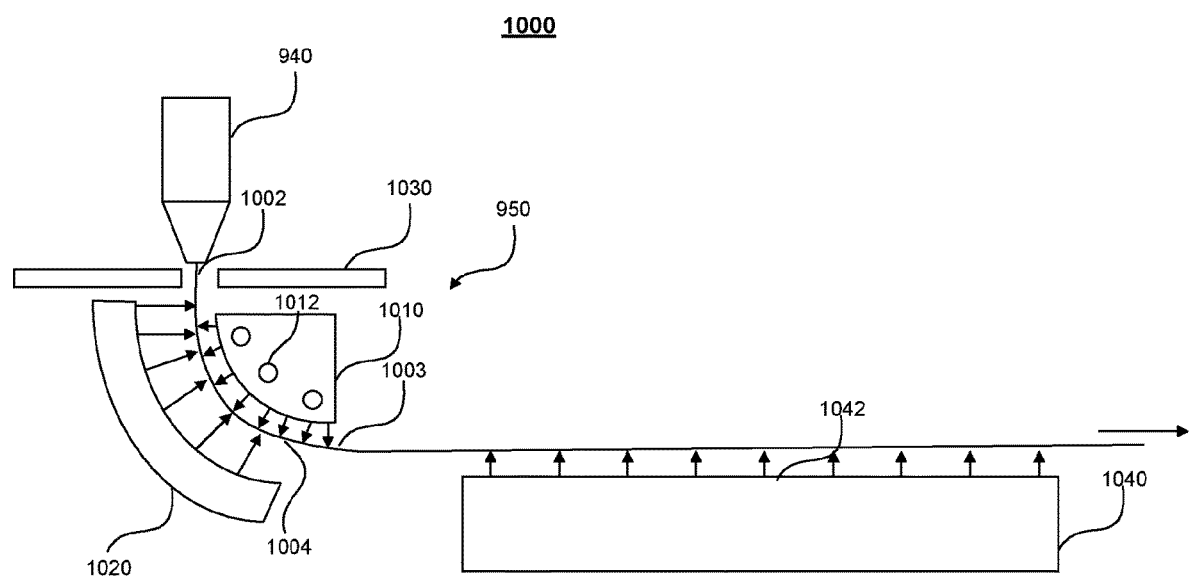
FIG. 10 is a schematic view of an exemplary glass forming apparatus.

FIG. 10 is a schematic view of an exemplary glass forming apparatus 1000. Glass forming apparatus 1000 may include glass feed unit 940 and post-feed glass forming device 950 illustrated in FIG. 9. Glass feed unit 940 can supply a stream of molten glass 1002 in a first direction, such as vertical. Post-feed glass forming device 950 can receive stream of molten glass 1002 in the first direction and direct it to a second direction, such as a horizontal direction. In some embodiments, post-feed glass forming device 950 can rapidly reduce the temperature of stream of molten glass 1002 while redirecting it and draw glass ribbons from stream of molten glass 1002 in the second direction. In this embodiment, post-feed glass forming device 950 includes a gas bearing unit 1010, a convective cooling system 1020, a thermal shield 1030, and a support unit 1040.

Glass feed unit 940 may be a forming vessel. In certain exemplary embodiments, glass feed unit 940 may be a forming body in a fusion down-draw apparatus. In certain exemplary embodiments, glass feed unit 940 may be a slot orifice unit in a slot-draw apparatus. As used herein, the term "orifice" refers to an opening in a portion of glass feed unit 940 that is configured to transmit fluid flow. An orifice can include one aperture or a plurality of apertures separated by supports. It is understood that glass feed unit 940 may be any other types of glass forming vessel that can supply stream of molten glass 1002, such as a fishtail unit. In some embodiments, a fishtail is a device that allows deliverly of a stream of molten glass from a slot exit. It may connect to an inlet tube and then distributes the stream of molten glass from this initial tube shape to a linear stream exiting at a slot.

Glass feed unit 940 can comprise a material that is resistant to material deformation, i.e., creep, at high temperatures and pressures. For example, glass feed unit 940 can comprise a material to deliver a molten glass at a temperature of 1,400 degree Celsius (° C.) to 1,700° C. In some embodiments, glass feed unit 940 can comprise platinum, for example a platinum-rhodium (PtRh) alloy, to allow glass feed unit 940 to be compatible with high temperature and pressure for delivering high temperature molten glass. For example, in some embodiments, glass feed unit 940 can comprise at least 80% platinum and up to 20% rhodium by weight, such as an 80/20 PtRh alloy. In some embodiments, glass feed unit 940 can comprise at least 90% platinum and up to 10% rhodium by weight, such as a 90/10 PtRh alloy. In some embodiments, glass feed unit 940 can be made of essentially pure platinum. In some embodiments, glass feed unit 940 can be a zircon doped material. Glass feed unit 940 may have an output path in which stream of molten glass 1002 is supplied at a glass flow density. The glass flow density may vary depending on the width of the exit of glass feed unit 940. In some embodiments, the glass feed unit 940 is configured to supply a continuous stream of glass to the gas bearing device. In some embodiments, the glass is molten when supplied by the glass feed unit.

In some embodiments, the viscosity of the molten glass flowing through glass feed unit 940 is less than 25,000 poises, such as from 50 poises to 10,000 poises. In some embodiments, the viscosity of the molten glass flowing through glass feed unit 940 is from 500 poises to 5,000 poises. In some embodiments, the viscosity of molten glass flowing through glass feed unit 940 can be controlled by adjusting one or more of the following: flow distance and pressure of the molten glass supply, temperature of the molten glass supply, width of an orifice, and opening distance of an orifice.

The viscosity of the stream of molten glass 1002 at a position in glass feed unit 940 can be determined based on the temperature of glass feed unit 940 at that position. In some embodiments, glass feed unit 940 can include temperature sensors (not shown) to determine the temperature at one or more positions along glass feed unit 940 in order to determine the viscosity of the molten glass at those positions. In some embodiments, glass feed unit 940 may include a heater (not shown) that can provide active heating to the lower part of glass feed unit 940 to prevent cold spots in stream of molten glass 1002 where glass may devitrify. For example, the root of a forming body or the bottom of a slot orifice may tend by the geometry of glass feed unit 940 and an inability to incorporate a good thermal insulation mechanism to cool down significantly below the temperature desired for stream of molten glass 1002 delivery. The heater may reduce, such as prevent, local cooling of stream of molten glass 1002 before it is delivered to post-feed glass forming devices 950. The heater may perform, for example, direct electrical heating through the precious metal body of glass feed unit 940, or induction heating. In some embodiments, the heater may prevent the temperature of stream of molten glass 202 from dropping below 500° C., such as below 600° C., below 700° C., below 800° C., below 900° C., below 1000° C., below 1100° C., below 1200° C., below 1300° C., below 1400° C., below 1500° C., or below 1600° C., 1700° C., 1800° C., 1900° C., 2000° C., in any range bounded on the lower end by any of these values, or defined by any two of these values, prior to passing through thermal shield 1030. For example, the heater may increase the temperature of stream of molten glass 1002 to 600° C. to 850° C. for soda lime glasses, or 800° C. to 1100° C. for hard glasses or glass ceramic precursor glasses. In some embodiments, the heater can also control the temperature of stream of molten glass 1002 exiting glass feed unit 940 so as to control the viscosity of stream of molten glass 1002. The heater thus can contribute to keep the viscosity of stream of molten glass 1002 sufficiently low to avoid devitrification on glass feed unit 940. Gas bearing unit 1010 may be positioned below glass feed unit 940 and near the output path of glass feed unit 940. Gas bearing unit 1010 may be any bearing that uses a thin film of gas to provide a low friction interface between surfaces. Gas bearing unit 1010 redirects stream of molten glass 1002 without physical contact between gas bearing unit 1010 and stream of molten glass 1002. Gas bearing unit 1010 accomplishes this redirection without contact by generating a gas film in a "bearing zone" between gas bearing unit 1010 and stream of molten glass 1002.

Figure 11:
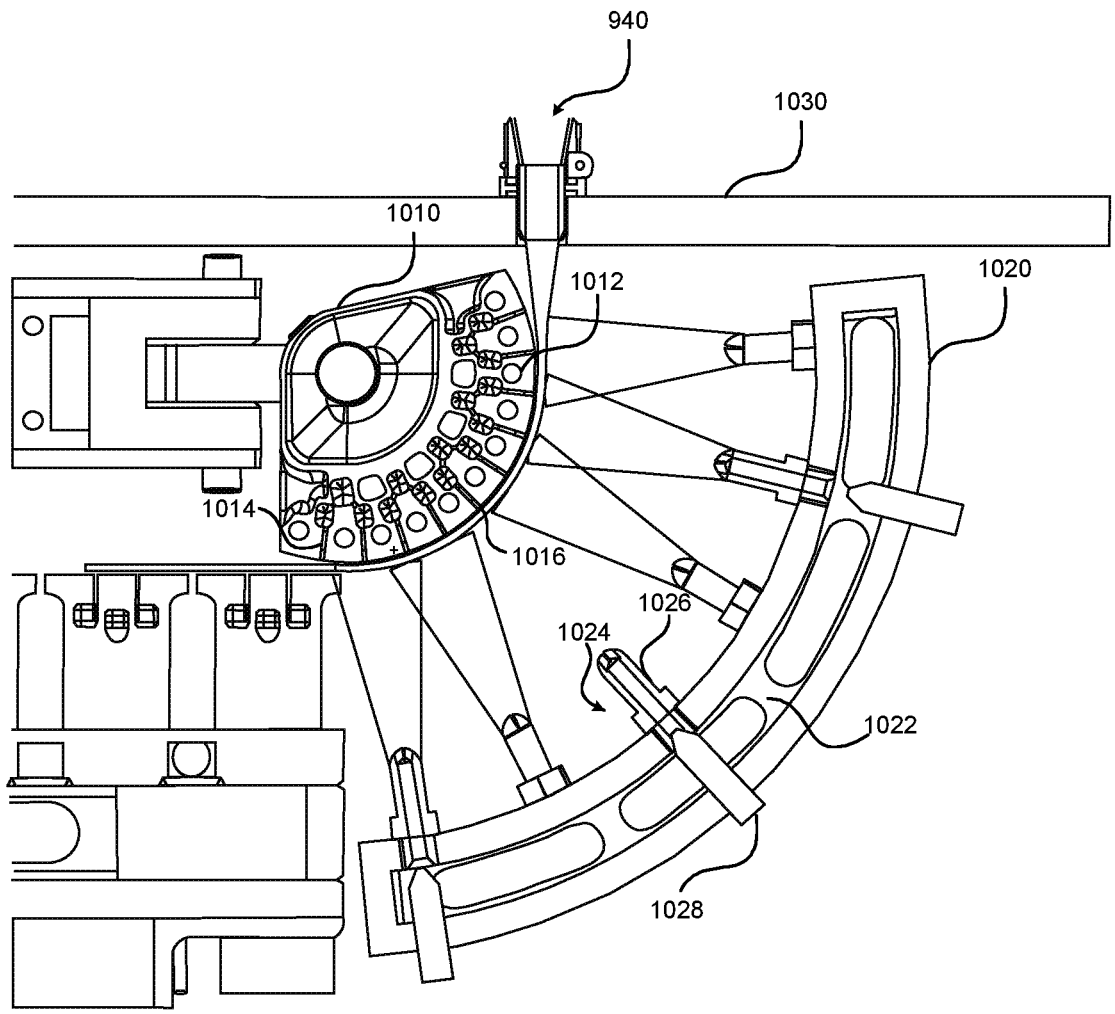
FIG. 11 is a side view of a portion of the glass forming apparatus of FIG. 2.
Figure 12:
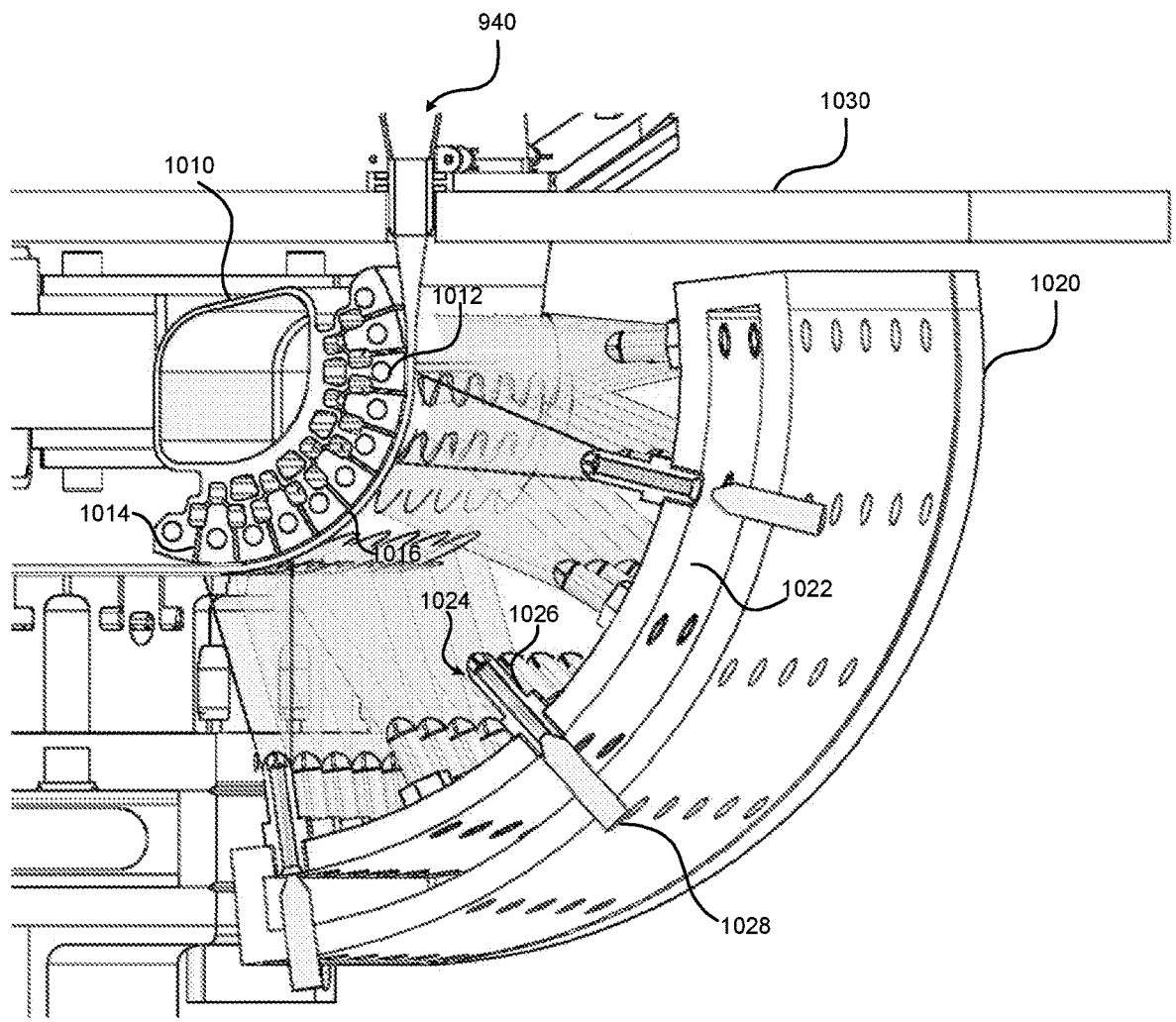
FIG. 12 is a perspective view of a portion of the glass forming apparatus of FIG. 2.

Gas bearing unit 1010 may include a plurality of exit slots from which gas is supplied to generate the gas film. Gas supplied by gas bearing unit 1010 may form a gas film (bearing zone) on a first major surface 1003 of stream of molten glass 1002. In some embodiments, gases that can be supplied by gas bearing unit 1010 include air and inert gases, such as nitrogen, argon, helium, etc. As shown in FIGS. 11 and 12, exit slots 1016 are positioned on the glass-facing convex side of gas bearing unit 1010 so that the resulting bearing zone matches the concave shape of the first major surface 1003 of stream of molten glass 1002. The bearing zone forces stream of molten glass 1002 to turn from vertical to horizontal. In some embodiments, gas bearing unit 1010 may comprise porous material such as graphite, stainless steel, or ceramic. In some embodiments, gas bearing unit 1010 may be made with discrete gas feeds. For example, the gas supplied by gas bearing unit 1010 to the bearing zone includes a plurality of restricted passages 1014 that introduce an impedance against gas passage. These restrictions may be placed sufficiently far from exit slots 1016 from which gas escapes such that this gas escape is virtually uniform along the escape route.

Gas bearing unit 1010 may be configured to redirect stream of molten glass 1002 from the first direction to a second direction without contacting stream of molten glass 1002. In some embodiments, the second direction may be a horizontal direction. In some embodiments, gas bearing unit 1010 is sufficiently close to the output path of glass feed unit 940 to redirect stream of molten glass 1002 from the output path. In some embodiments, gas bearing unit 1010 may have a radius not greater than 8 centimeters (cm), such as 1 cm, 2 cm, 3 cm, 5 cm, 6 cm, 7 cm, 8 cm, in any range bounded on the upper end by any of these values, or defined by any two of these values, so that gas bearing unit 1010 can turn stream of molten glass 1002 to a horizontal direction over a short distance. For example, gas bearing unit 1010 may have a radius of 5 cm so that stream of molten glass 1002 can be turned from vertical to horizontal over an approximately 5 cm height.

In some embodiments, gas bearing unit 1010 may include one or more fluid coolant channels 1012. Fluid coolant channels 1012 can cool the gas supplied by gas bearing unit 1010. As a result, the temperature of the bearing zone formed by gas bearing unit 1010 may be lower than the ambient temperature and significantly lower than the temperature of stream of molten glass 1002 so as to cool stream of molten glass 1002. Any suitable fluid coolants, such as water, ethylene glycol, diethylene glycol, propylene glycol, or Betaine, may be used in fluid coolant channels 1012.

In some embodiments, convective cooling system 1020 may be positioned below glass feed unit 940 and on the other side of stream of molten glass 1002 opposite gas bearing unit 1010. As described below in detail, convective cooling system 1020 may include one or more nozzles 1024 directed toward gas bearing unit 1010. In some embodiments, nozzles 1024 may be configured to eject gas that forces stream of molten glass 1002 toward gas bearing unit 1010. In this embodiment, nozzles 1024 may be positioned on the concave side of convective cooling system 1020 to match the convex shape of the second major surface 1004 of stream of molten glass 1002 opposite first major surface 1003 having a concave shape. The gas ejected by nozzles 1024 applies forced convection to second major surface 1004 to reduce the temperature of stream of molten glass 1002. On the other hand, the gas also pushes stream of molten glass 1002 to get close to gas bearing unit 1010 so that the bearing zone between the first major surface 1003 of stream of molten glass 1002 and gas bearing unit 1010 is reduced, thereby further increasing cooling on first major surface 1003 of stream of molten glass 1002. In some embodiments, the width of convective cooling system 1020 is adjustable according to the width of stream of molten glass 1002.

In some embodiments, as shown in FIGS. 11 and 12, convective cooling system 1020 includes a gas chamber 1022 and a plurality of nozzles 1024 in fluid communication with gas chamber 1022. Gas chamber 1022 stores gas under a common pressure, and each nozzle 1024 is configured to eject gas from gas chamber 1022. In some embodiments, each nozzle 1024 includes a tip 1026 connected to gas chamber 1022 and a regulator 1028 movable in respect of tip 1026 to control the flow rate of gas exiting tip 1026. The flow rate may be from 1 normal meter cubed per hour (Nm$^3$/hr) to 20 Nm$^3$/hr of gas, such as from 2 Nm$^3$/hr to 10 Nm$^3$/hr of gas. Each regulator 1028 may move in a direction toward or away from respective tip 1026 so as to control the volume of gas entering tip 1026 from gas chamber 1022. For example, as regulator 1028 moves closer to corresponding tip 1026, the flow rate of gas exiting tip 1026 decreases until regulator 1028 completely shuts down gas entering from gas chamber 1022 to tip 1026. In some embodiments, each regulator 1028 may be individually controlled so that the flow rate of each nozzle 1024 may vary. In some embodiments, each nozzle 1024 supplies gas in a continuous manner. Multiple nozzles 1024 may be arranged in a pattern, such as an array shown in FIG. 12. It is understood that in other embodiments, the pattern of multiple nozzles 1024 may vary. By setting up the particular pattern of multiple nozzles 1024 and/or adjusting the flow rate of each individual nozzle 1024, various gas ejection patterns may be achieved, which can affect the shape and/or size of stream of molten glass 1002.

In some embodiments, thermal shield 1030 may be positioned between glass feed unit 940 and gas bearing unit 1010. As described above, the region above thermal shield 1030 and in proximity to glass feed unit 940 is heated, while the region below thermal shield 1030 and in proximity to gas bearing unit 1010 and convective cooling system 1020 is cooled. Thus, thermal shield 1030 can reduce heat exchange between the heated upper region and the cooled lower region so that the temperature of stream of molten glass 1002 in the cooled lower region is further reduced.

In this embodiment, glass forming apparatus 1000 may include three thermal management devices—fluid coolant channel 1012 in gas bearing unit 1010, convective cooling system 1020, and thermal shield 1030. In some embodiments, a glass forming apparatus may include only one or only two of the three thermal management devices described above. In some embodiments, a glass forming apparatus may include fluid coolant channel 1012 in gas bearing 210 and convective cooling system 1020.

In any event, the thermal management device(s) can provide rapid cooling to stream of molten glass 1002 exiting glass feed unit 940 while the direction of stream of molten glass 1002 is being turned. For example, one or more thermal management devices described above may be applied on at least one side of stream of molten glass 1002 to achieve heat extraction with a heat transfer coefficient of at least 150 W/m²-K over a distance of at least 50 mm, at the same time when stream of molten glass 1002 being redirected to the second direction. As a result, stream of molten glass 1002 can quickly reach a sufficient high viscosity after it is turned to horizontal so that glass ribbons can be drawn from stream of molten glass 1002. The heat transfer coefficient (HTC) is indicative of the magnitude of heat extraction and is defined as follows:

$$Q = \text{HTC} \times (T - T_{amb}),$$

where Q is the heat flux extracted on one side of stream of molten glass 1002, T is the local temperature at the major surface of stream of molten glass 1002 on the side considered. The two sides of may have stream of molten glass 1002 different surface temperatures, and $T_{amb}$ is the ambient temperature in proximity to (e.g., 1 or 2 inches away from) stream of molten glass 1002. In some embodiments, the heat transfer coefficient may be 150 W/m²-K, 200 W/m²-K, 250 W/m²-K, 300 W/m²-K, 350 W/m²-K, 400 W/m²-K, 450 W/m²-K, 500 W/m²-K, 600 W/m²-K, 700 W/m²-K, 800 W/m²-K, 900 W/m²-K, 1,000 W/m²-K over a distance of 50 mm, in any range bounded on the upper end by any of these values, or defined by any two of these values. In some embodiments, the heat transfer coefficient may be 150 W/m²-K, 200 W/m²-K, 250 W/m²-K, 300 W/m²-K, 350 W/m²-K, 400 W/m²-K, 450 W/m²-K, 500 W/m²-K, 600 W/m²-K, 700 W/m²-K, 800 W/m²-K, 900 W/m²-K, 1,000 W/m²-K over a distance of 100 mm, in any range bounded on the upper end by any of these values, or defined by any two of these values.

The strong cooling effect provided by the thermal management device(s) to stream of molten glass 1002 can be described in terms of by viscosity of stream of molten glass 1002. In some embodiments, the viscosity of stream of molten glass 1002 increases by a factor of at least 50 between a delivery point of the stream of molten glass 1002 and a distance of 10 cm from the delivery point along a glass ribbon drawn from the stream of molten glass 1002. The delivery point may be the exit of glass feed unit 940, such as the root of a forming body or the bottom of a slot orifice. In some embodiments, the viscosity of stream of molten glass 1002 may increase by a factor of 50, 60, 70, 80, 90, 100, 150, 200, in any range bounded on the upper end by any of these values, or defined by any two of these values.

In some embodiments, support unit 1040 is configured to support stream of molten glass 1002 moving in the second direction without contacting stream of molten glass 1002. In this embodiment, stream of molten glass 1002 moves in a second direction different from the first direction, and support unit 1040 includes a gas bearing table similar to gas bearing unit 1010 but with a flat upper surface 1042 adjacent stream of molten glass 1002. A bearing zone can thus be formed to support stream of molten glass 1002 moving in the second direction to ensure that the first major surface 1003 and second major surface 1004 of stream of molten glass 1002 are pristine. In some embodiments, a glass ribbon draw unit (not shown) connected to support unit 1040 may be provided to draw a glass ribbon from stream of molten glass 1002 in the second direction. The glass ribbon draw unit may draw glass ribbons at any desired speed and separate them into discrete glass sheets. In some embodiments, the thickness of the glass ribbon is at least 0.5 mm, such as 0.5 mm, 1 mm, 1.5 mm, 2 mm, 2.5 mm, 3 mm, 3.5 mm, 4 mm any range bounded on the lower end by any of these values, or in any range defined by any two of these values.

The properties of the glass ribbon after all processing is complete may be affected by the temperature profile of stream of molten glass 1002 after stream of molten glass 1002 turns to the second direction. For example, the temperature profile of stream of molten glass 1002 as it transverses the gas bearing table of support unit 1040 may affect glass properties. In some embodiments, this temperature profile may be influenced by heaters in various configurations.

Figure 13:
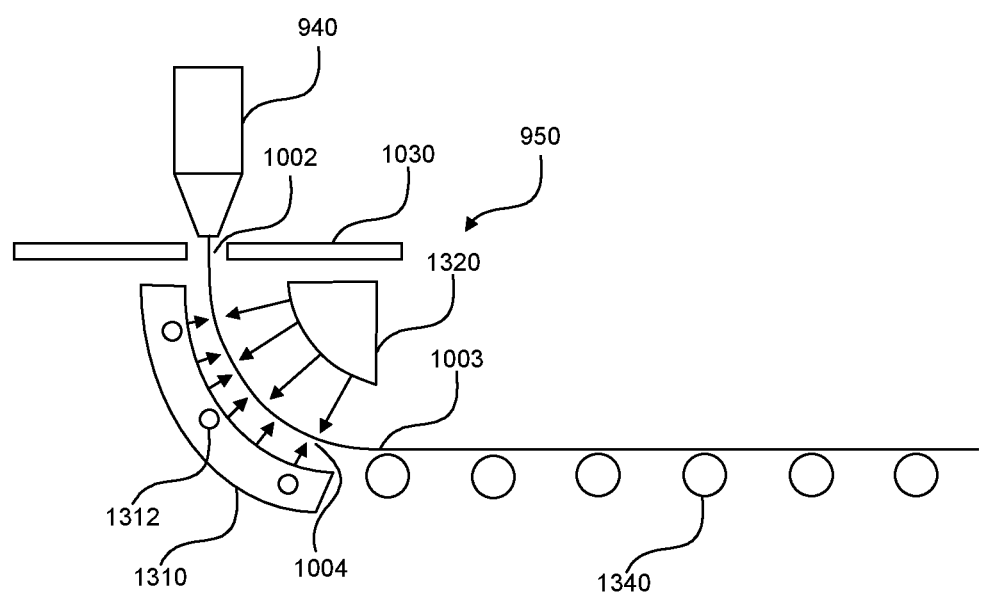
FIG. 13 is a schematic view of another exemplary glass forming apparatus.

FIG. 13 is a schematic view of another exemplary glass forming apparatus 1300. In this embodiment, post-feed glass forming device 950 includes a gas bearing unit 1310, a convective cooling system 1320, thermal shield 1030, and a support unit 1340. In this embodiment, gas bearing unit 1310 comprises fluid coolant channels 1312 and convective cooling system 1320 arranged on different sides of stream of molten glass 1002 compared with gas bearing unit 1010 and convection cooling system 1020 illustrated in FIGS. 10-12. That is, gas bearing unit 1310 comprises a concave side on which exit slots are positioned, and wherein a bearing zone is formed between the concave side of gas bearing unit 1310 and second major surface 1004 of stream of molten glass 1002 having a convex shape. Convective cooling system 1320 comprises a convex side on which nozzles are positioned to match the first major surface 1003 of stream of molten glass 1002 having a concave shape. In some embodiments, two gas bearings may be arranged on both sides of stream of molten glass 1002, and two bearing zones may be formed on each of the first major surface 1003 and second major surface 1004 of stream of molten glass 1002. One of the gas bearings may have discretized gas bearing pads with position adjustment. In this embodiment, a support unit 1340 comprising a plurality of horizontal roll conveyors are provided to receive stream of molten glass 1002 in the second direction.

Figure 14:
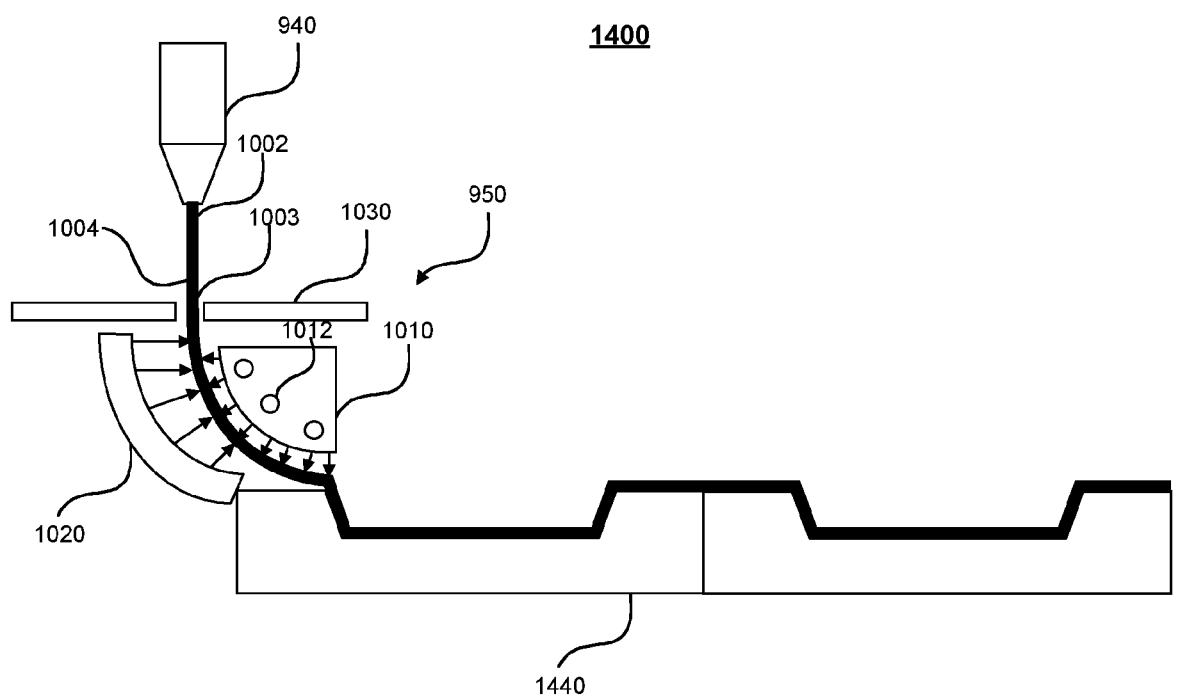
FIG. 14 is a schematic view of still another exemplary glass forming apparatus.

FIG. 14 is a schematic view of still another exemplary glass forming apparatus 1400. In this embodiment, post-feed glass forming device 950 includes gas bearing unit 1010, convective cooling system 1020, thermal shield 1030, and a shaped support unit 1440. In this embodiment, shaped support unit 1440 may be used to receive stream of molten glass 1002 in the second direction and to form shaped glass articles having at least one pristine major surface. For example, at least part of the receiving plane of support unit 1040 may be replaced by one or more conveyor carrying molds, so that shaped glass articles can be formed by vacuum sagging into those molds.

Figure 15:
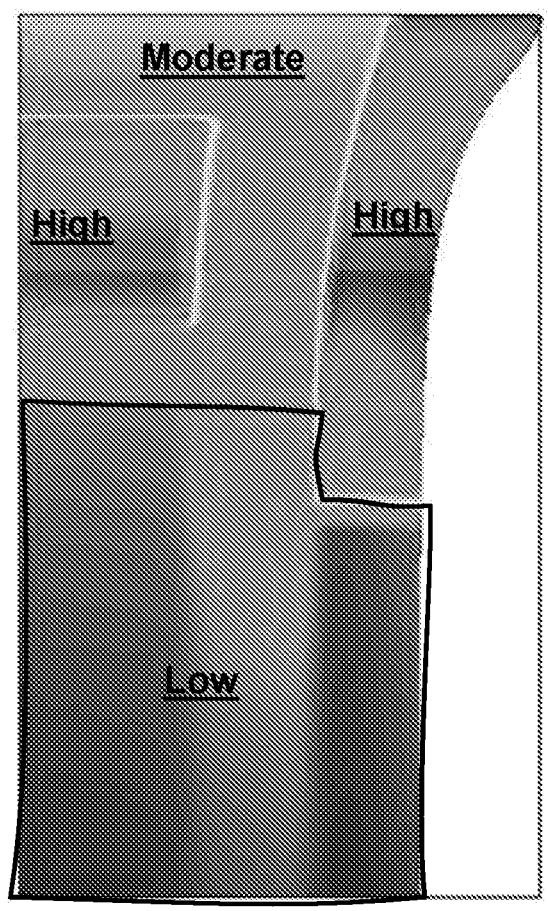
FIG. 15 illustrates a plot of a numerical model predicting the formation of a glass ribbon.

FIG. 15 illustrates a plot of a numerical model predicting the formation of a glass ribbon from glass feed unit 940. The plot represents the intensity of the heat flux extracted form a molten grass stream. The higher the value is, the more heat is extracted. In the plot, three areas of cooling intensity are described, including high the cooling intensity area, moderate cooling intensity area, and low cooling intensity area. The plot shows significant cooling intensity tuning provided by the thermal management devices described above.

Figure 16:
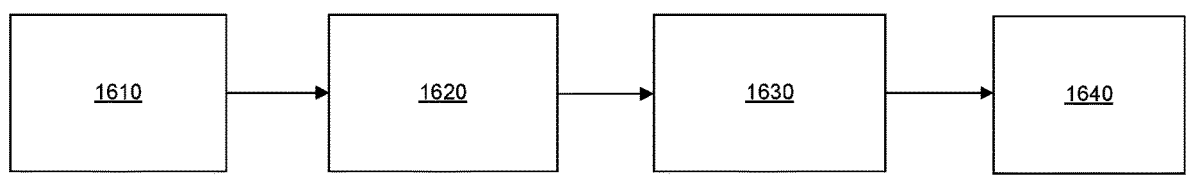
FIG. 16 shows a process flowchart corresponding to the process performed by the glass forming apparatus of FIGS. 10-14.

FIG. 16 shows a process flowchart corresponding to the process performed by glass forming apparatus 1000, 1300, and 1400 in FIGS. 10-14. The process can include further steps or may include less than all of the steps illustrated in further examples. As shown, the process starts from step 1610 of supplying molten glass stream. The stream of molten glass may be supplied in a first direction. In some embodiments, the first direction is vertical. In some embodiments, the stream of molten glass may be heated to keep the viscosity of the stream of molten glass sufficiently low to avoid devitrification. As used herein, "devitrification" is understood to mean the nucleation of crystals in an amorphous or molten glass. At least a portion of molten glass stream may have a viscosity less than 25,000 poises, such as from 50 posies to 10,000 poises. As described above, the stream of molten glass may be supplied by a glass feed unit 940.

After the supplying, at step 1620, the molten glass stream is redirected. The stream of molten glass may be redirected to a second direction different from the first direction without contacting the stream of molten glass. In some embodiments, the second direction may be horizontal. As described above, the stream of molten glass may be redirected by a gas bearing unit 1010, 1310.

While being redirected to the second direction, at step 1630, molten glass stream temperature is reduced. In some embodiments, a cooling apparatus having a heat transfer coefficient of at least 150 W/m$^2$-K over a distance of at least 50 mm is applied on at least one side of the stream of molten glass. For example, the cooling apparatus may include one or more thermal management devices selected from the group consisting of fluid coolant channel 1012, 1312 in gas bearing unit 1010, 1310, and convective cooling system 1020, 1320. Thermal shield 1030, while a thermal management device, prevents heating of the molten glass downstream of the thermal shield as opposed to actively cooling the stream of molten glass, and is not considered a cooling apparatus. In some embodiments, cooling of the stream of molten glass may be achieved, at least in part, by forming a gas film (bearing zone) on a first major surface of the stream of molten glass. As described above, this may be achieved by gas bearing unit 1010, 1310 as well. Additionally or alternatively, the cooling of the stream of molten glass may be achieved, at least in part, by applying forced convection to a second major surface of the stream of molten glass opposing the first major surface. As described above, this may be achieved by convective cooling system 1020, 1320. Additionally or alternatively, cooling of the stream of molten glass may be achieved, at least in part, by using a thermal shield (such as thermal shield 1030) to reduce the temperature of the stream of molten glass.

At step 1640, a glass ribbon is drawn from the stream of molten glass in the second direction. In some embodiments, prior to drawing the glass ribbon, the stream of molten glass moving in the second direction may be supported without being contacted so as to form a glass ribbon with two pristine major surfaces. As described above, this may be achieved by support unit 1040. In some embodiments, the stream of molten glass moving in the second direction may be supported by a shaped support unit (such as shaped support unit 640) so as to form a shaped glass ribbon having at least one pristine major surface. In some embodiments, the thickness of the glass ribbon is at least 0.1 mm, such as 0.5 mm, 1 mm, 1.5 mm, 2 mm, 2.5 mm, 3 mm, 3.5 mm, 4 mm, any range bounded on the lower end by any of these values, or in any range defined by any two of these values.

FIG. 17 is a schematic view of exemplary gas bearing device 1710. Gas bearing device 1710 may be an air turn bearing and may include a plurality of outlet ports. The outlet ports may have a density of at least 8,000 ports per m$^2$. In some embodiments, the outlet ports have a density of at least 10,000 ports per m$^2$. In some embodiments, gas film 1725 supports glass ribbon 1703 without contact between gas bearing device 1710 and glass ribbon 1703. As shown in FIG. 17, glass ribbon 1703 may be fed in a glass feed direction 1790 and the glass may be drawn in glass draw direction 1795. Glass feed direction 1790 may be different from glass draw direction 1795. In some embodiments, glass feed direction 1790 may be substantially the same direction as glass draw direction 1795.

As shown in FIG. 17, air turn bearing device 1710 allows glass ribbon 1703 to be redirected from first direction to a second direction without contact between the air turn bearing device 1710 and glass ribbon 1703. In some embodiments, the glass ribbon may be redirected from a substantially vertical direction to a substantially horizontal direction. In some embodiments, air turn bearing device 1710 may be made of an alloy. In some embodiments the alloy is a nickel alloy.

FIG. 18 is a schematic view of exemplary gas bearing device 1810. Gas bearing device 1810 may be an air table. Gas bearing device 1810 may comprise a plurality of outlet ports. The outlet ports may have a density of at least 8,000 ports per m$^2$. In some embodiments, the outlet ports have a density of at least 10,000 ports per m$^2$. In some embodiments, gas film 1825 supports glass ribbon 1803 without contact between gas bearing device 1810 and glass ribbon 1803.

In some embodiments, gas bearing device 1810 may be a horizontal plane. It is to be understood that horizontal plane includes a substantially horizontal plane. In some embodiments, gas bearing device 1810 may be angled or sloped. In some embodiments, gas bearing device 1810 supports glass ribbon 1803 while the glass ribbon is being conveyed from one location to another in conveying direction 1895. For example, gas bearing device 1810 may support the glass ribbon while it is being conveyed from a forming area to a roll conveying area.

FIGS. 19A and 19B show schematics of exemplary gas bearing device 1910. Gas bearing device 1910 may be an accumulator. Gas bearing device 1910 may comprise a plurality of outlet ports. The outlet ports may have a density of at least 8,000 ports per m$^2$. In some embodiments, the outlet ports have a density of at least 10,000 ports per m². In some embodiments, stream of glass 1903 accumulates to form a volume of glass 1904. In some embodiments, gas film 1925 supports volume of glass 1904 without contact between gas bearing device 1910 and volume of glass 1904. The accumulator may comprise a first portion 1911 of gas bearing device 1910 and a second portion 1912 of gas bearing device 1910. In some embodiments, first portion 1911 and second portion 1912 of gas bearing device 1910 separate to allow volume of glass 1904 to drop into a mold 1950 to mold the volume of glass 1904.

FIGS. 20a and 20b show schematics of exemplary gas bearing device 2010. Gas bearing device 2010 may be a gas bearing mold. Gas bearing device 2010 may be a slumping mold. In some embodiments, glass sheet 2003 is positioned above gas bearing device 2010. Gas bearing device 2010 may comprise a plurality of outlet ports. The outlet ports may have a density of at least 8,000 ports per m². In some embodiments, the outlet ports have a density of at least 10,000 ports per m². In some embodiments, gas film 2025 supports glass sheet 2003 without contact between gas bearing device 2010 and glass sheet 2003. In some embodiments, gravity slumps glass sheet 2003 when glass sheet 2003 is positioned above gas bearing device 2010. In some embodiments, gas film 2025 supports glass sheet 2003 without touching gas bearing device 2010. FIG. 20a shows glass sheet 2003 before slumping. FIG. 20b shows glass sheet 2003 after slumping.

In some embodiments, the glass forming apparatus can comprise one or more gas bearing devices, including any combination of the gas bearing devices 1710, 1810, 1910, or 2010.

Figure 21:
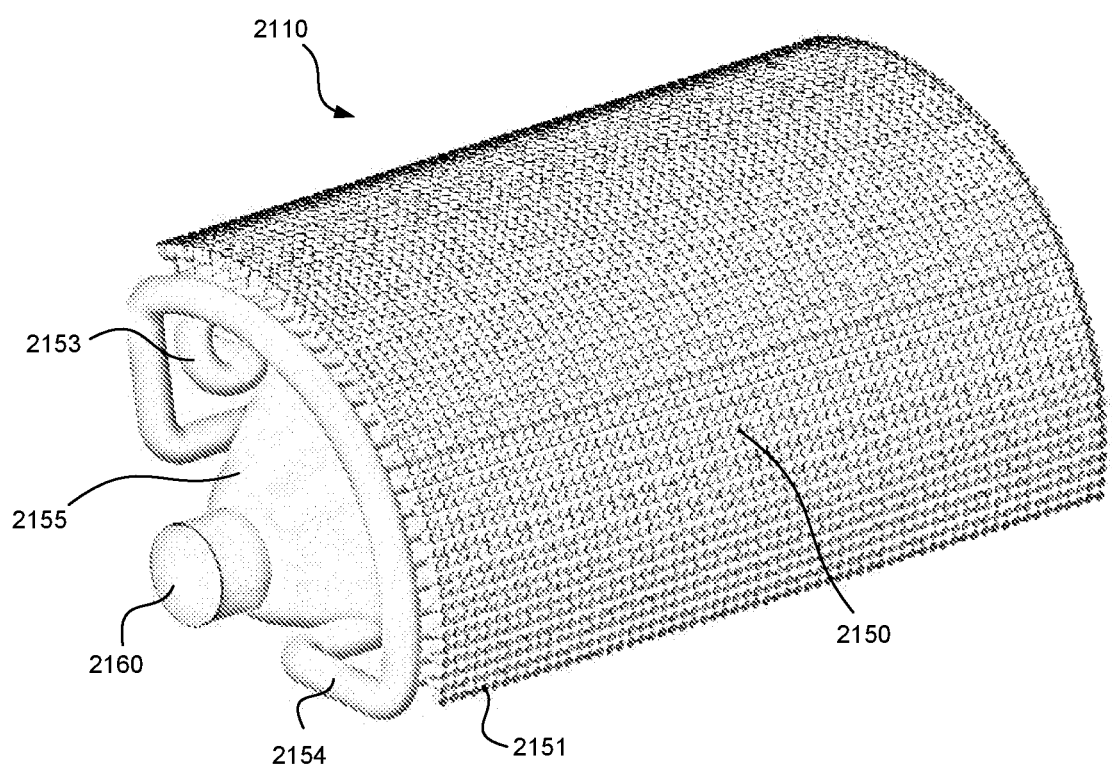
FIG. 21 shows an exemplary gas bearing device.
Figure 22:
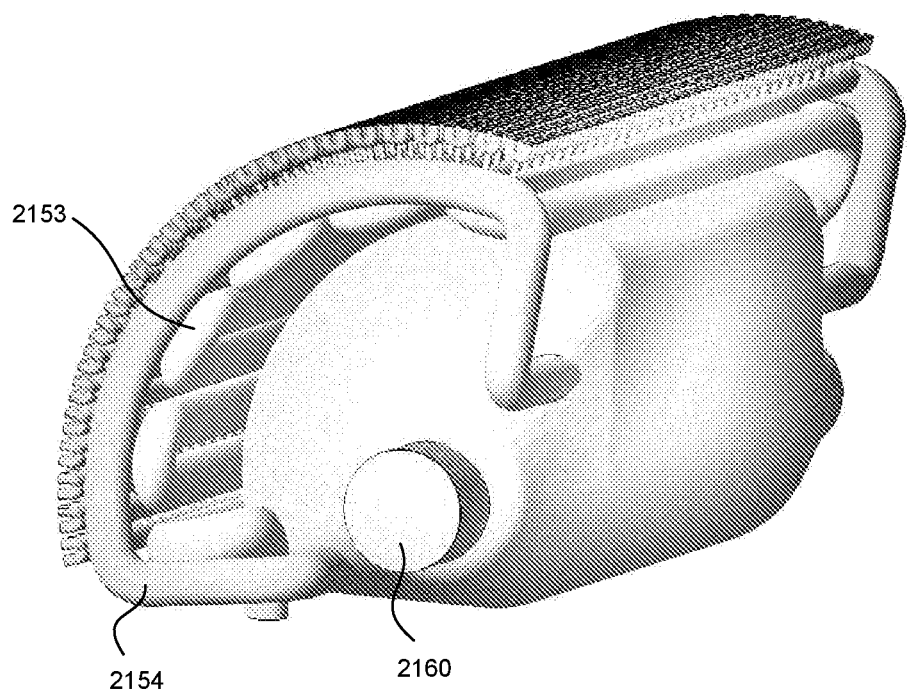
FIG. 22 shows another view of the gas bearing device shown in FIG. 21.

FIGS. 21 and 22 show a schematic of exemplary gas bearing device 2110 comprising a support surface 2150. The support surface may have a plurality of outlet ports 2151 disposed in support surface 2150. Gas bearing device 2110 may comprise one or more cooling circuits 2153 and one or more gas passages 2154. Gas bearing device 2110 may comprise a manifold 2155. Gas bearing device 2110 may comprise a gas inlet 2160. FIGS. 21 and 22 shows an exemplary gas bearing device similar to gas bearing device 1710. It is to be understood that the configuration shown in FIGS. 21 and 22 can be adapted to any of the gas bearing devices 1710, 1810, 1910, and 2010. The support surface 2150 can have flat, concave, or convex shape. For example, as shown in FIG. 18, the gas bearing 1810 has a flat shape. As another example, as shown in FIGS. 19A-20B gas bearings 1910 and 2010 have a concave shape. As another example, as shown in FIGS. 21 and 22, the surface 2150 has a convex shape.

FIG. 23 shows another view of exemplary gas bearing device 2110. Gas bearing device 2110 may comprise a plurality of metering pipes 2152. In some embodiments, the outlet ports 2151 are fed with gas that passes through metering pipes 2152. Each metering pipe 2152 feeds gas to at least one outlet port 2151. In some embodiments, each metering pipe is connected to at least two outlet ports. In some embodiments, each metering pipe is connected to four outlet ports.

The outlet ports may be distributed over a pitch, which is understood to be the center-to-center distance of adjacent outlet ports 2151. In some embodiments, the pitch is at most 3 millimeters. The outlet ports may have uniform size and spacing. As used herein, "uniform" size and spacing is understood to include variances related to manufacturing, for example ±5%.

Figure 25:
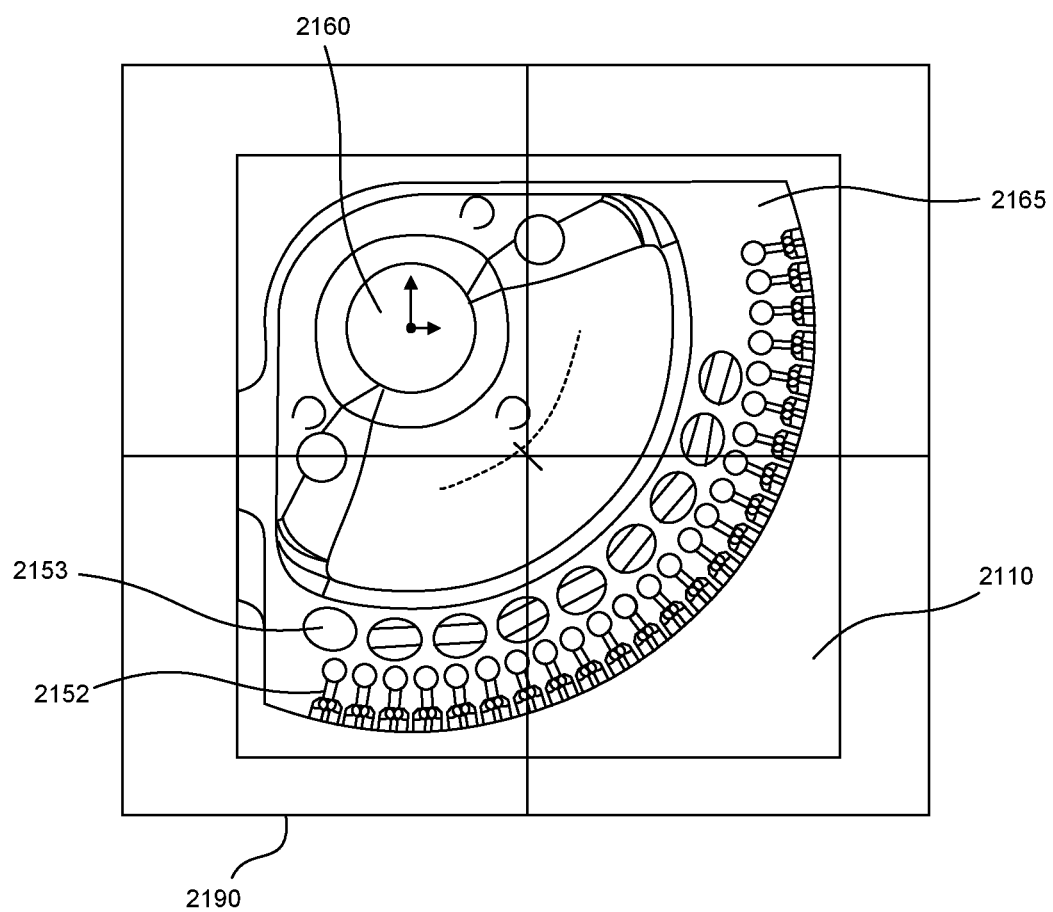
FIG. 25 shows a cross-section of the gas bearing device shown in FIG. 21.

FIG. 24 shows another view of exemplary gas bearing device 2110. As shown in FIG. 24, the gas bearing device 2110 comprises outer cover 2165. FIG. 25 shows a cross-section of gas bearing device 2110 in plane 2190.

Figure 26:
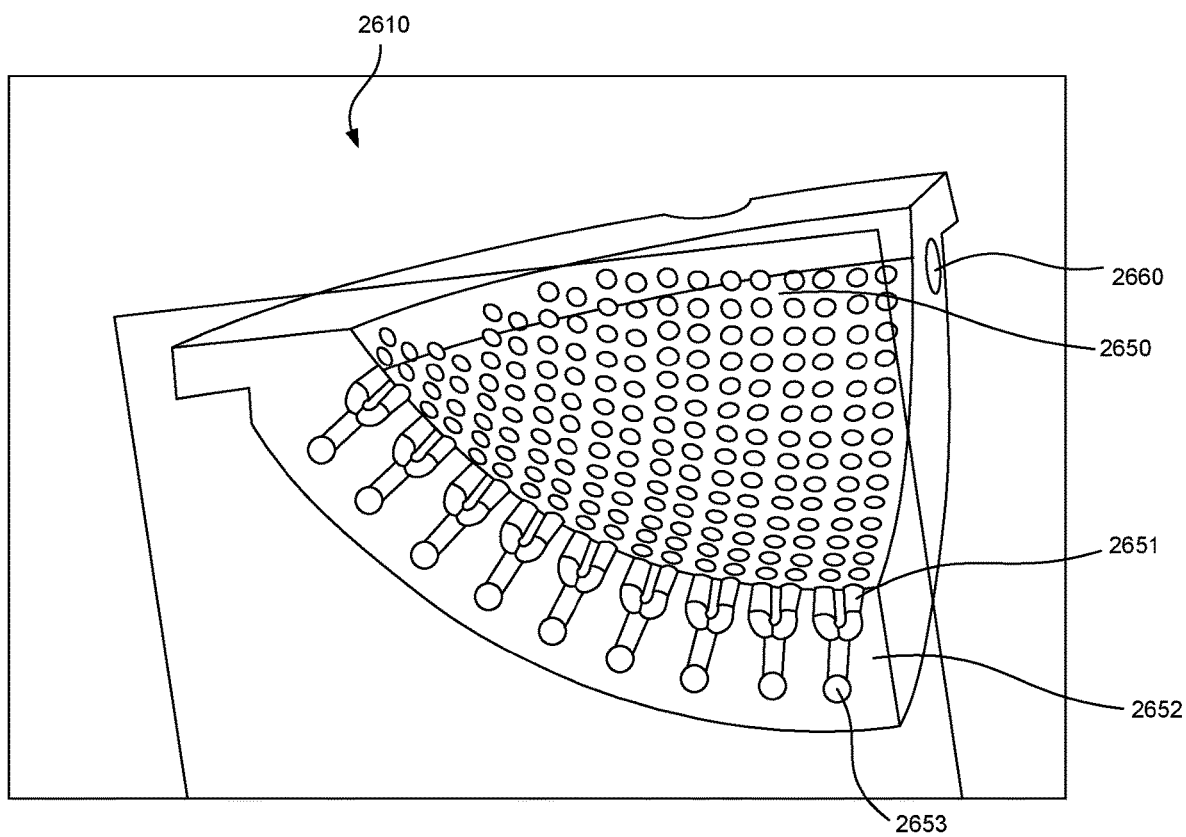
FIG. 26 shows schematic of a quarter cut of an exemplary accumulator gas bearing device.
Figure 27:
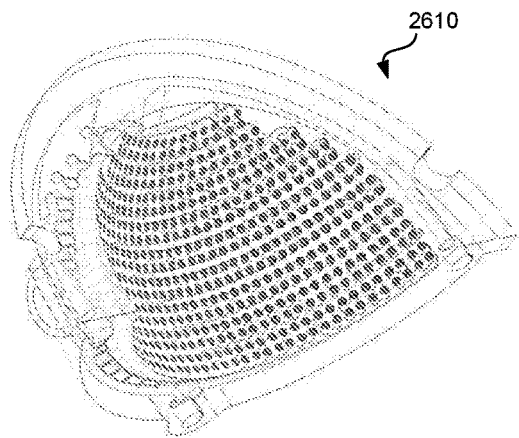
FIG. 27 shows one half of an exemplary accumulator gas bearing device.
Figure 28:
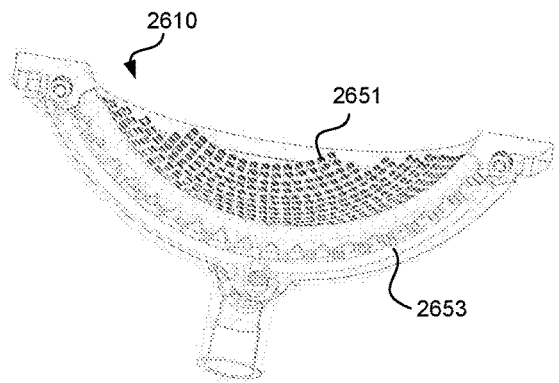
FIG. 28 shows another half of the accumulator gas bearing device shown in FIG. 27.
Figure 29:
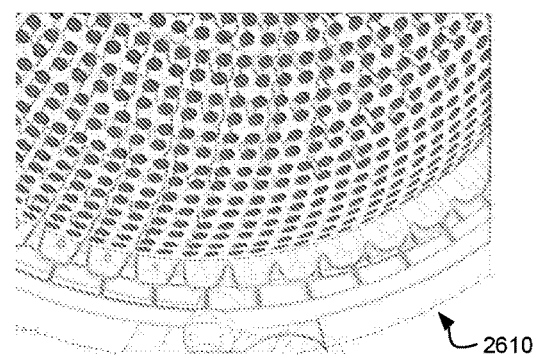
FIG. 29 shows another view of the accumulator gas bearing device shown in FIG. 27.

FIGS. 26-29 show various angles of an exemplary accumulator 2610. Accumulator 2610 may comprise a support surface 2650, outlet ports 2651, metering pipes 2652, a cooling circuit 2653, and a gas inlet 2660. FIG. 26 shows a quarter cut of accumulator 2610.

Figure 30:
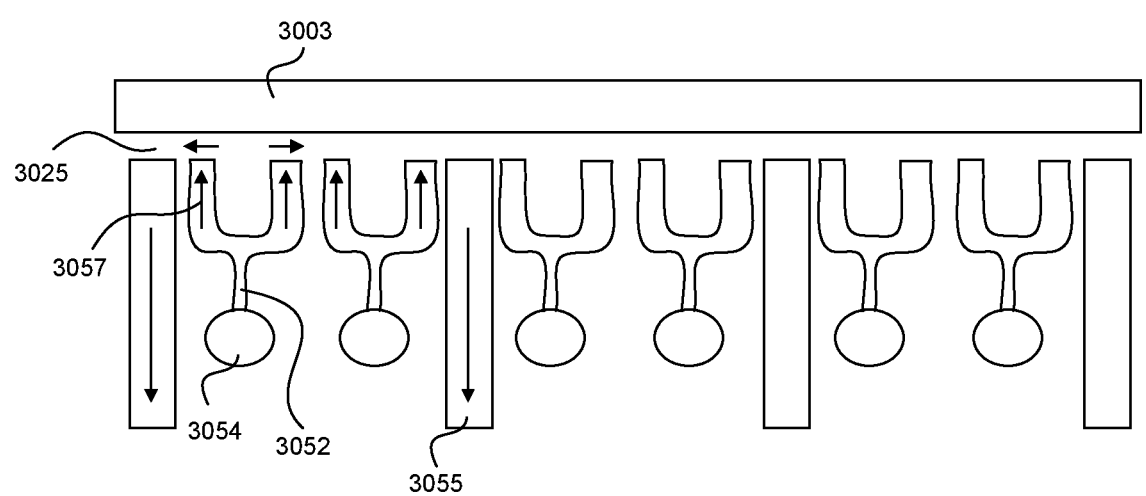
FIG. 30 shows a schematic of gas flow through an exemplary gas bearing device.

FIG. 30 shows a schematic of gas flow through an exemplary gas bearing device. Glass 3003 may be supported by gas film 3025. As shown, to form gas film 3025, gas flows from the gas passage 3054 to metering pipes 3052 to outlet ports 3057. Optionally, and as shown in FIG. 30, gas may flow away from the gas film through vent ports 3055.

Figure 31:
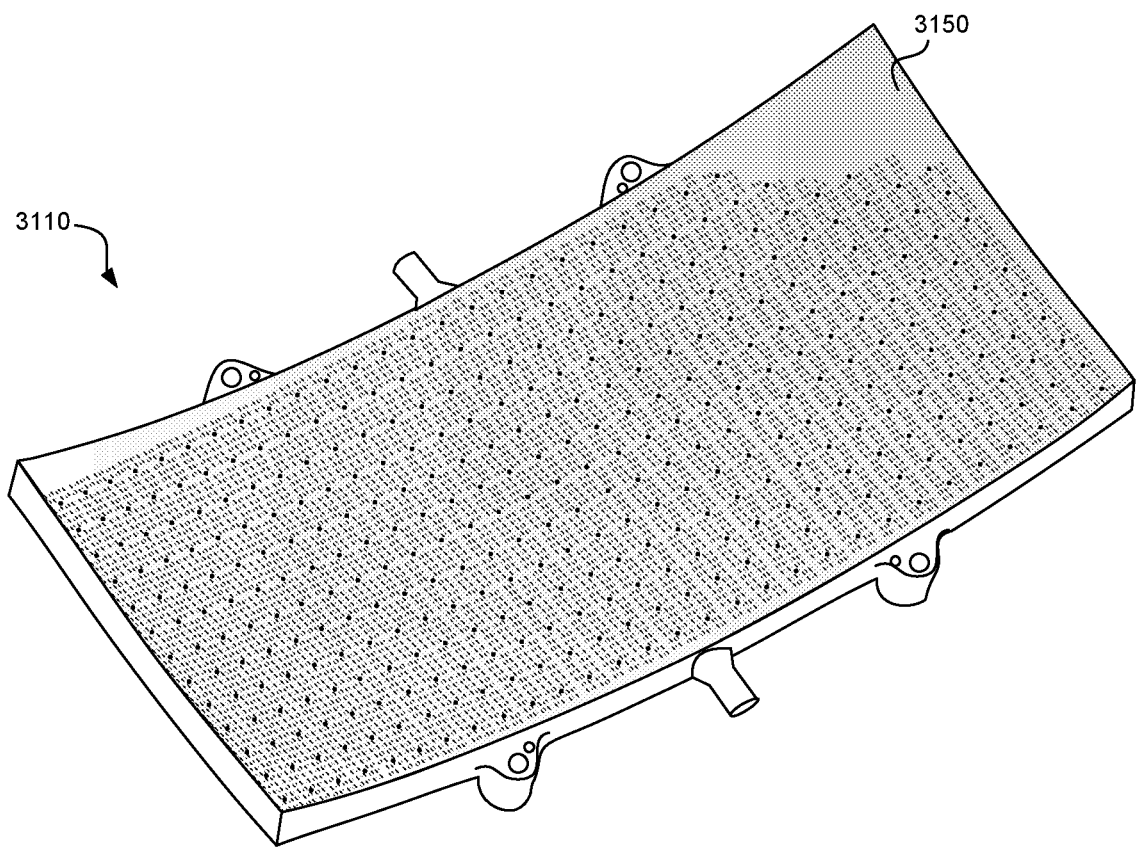
FIG. 31 shows a schematic of a slumping mold comprising vent ports.
Figure 32:
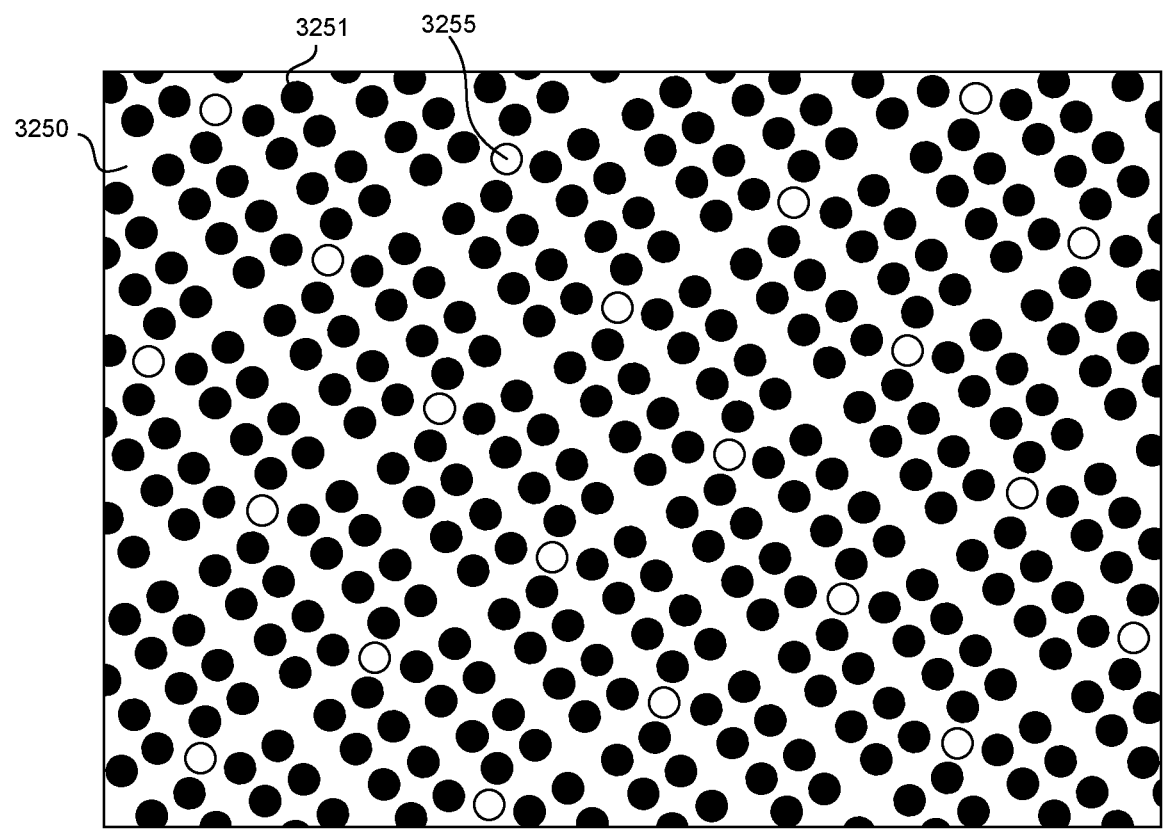
FIG. 32 shows a view of the surface of the slumping mold shown in FIG. 31.

FIG. 31 shows an exemplary slumping mold 3110 comprising a support surface 3150. FIG. 32 shows support surface 3250, which includes outlet ports 3251 and a plurality of vent ports 3255. The vent ports 3255 are distributed across the support surface 3250. In some embodiments, the vent ports provide an array of ports that allow gas to escape from the gas film. This can be of interest when supporting articles of significant size, which can lead to a "bubble effect." If only outlet ports supplying gas are present and no vent ports are present, gas can only escape out the sides. For larger articles, in the absence of vent ports, this limited option for gas escape may cause problems. For example, in some embodiments, gas flows from a gas passage to a metering ports, then from the metering ports to outlet ports. In some embodiments, gas may flow away from the gas film through vent ports.

Figure 33:
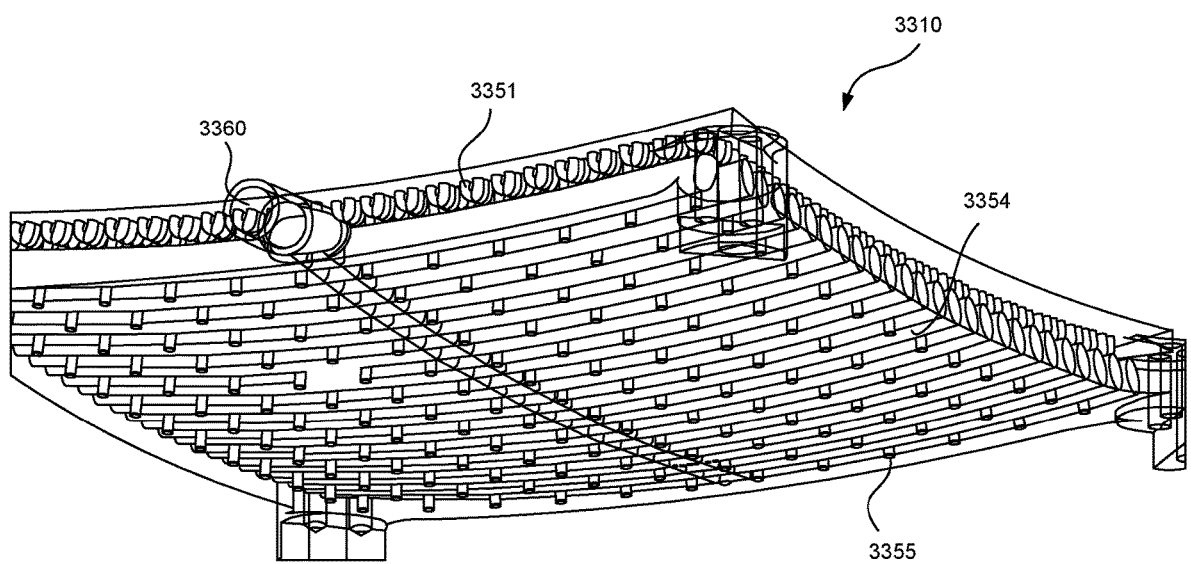
FIG. 33 shows a schematic of another slumping mold.
Figure 34:
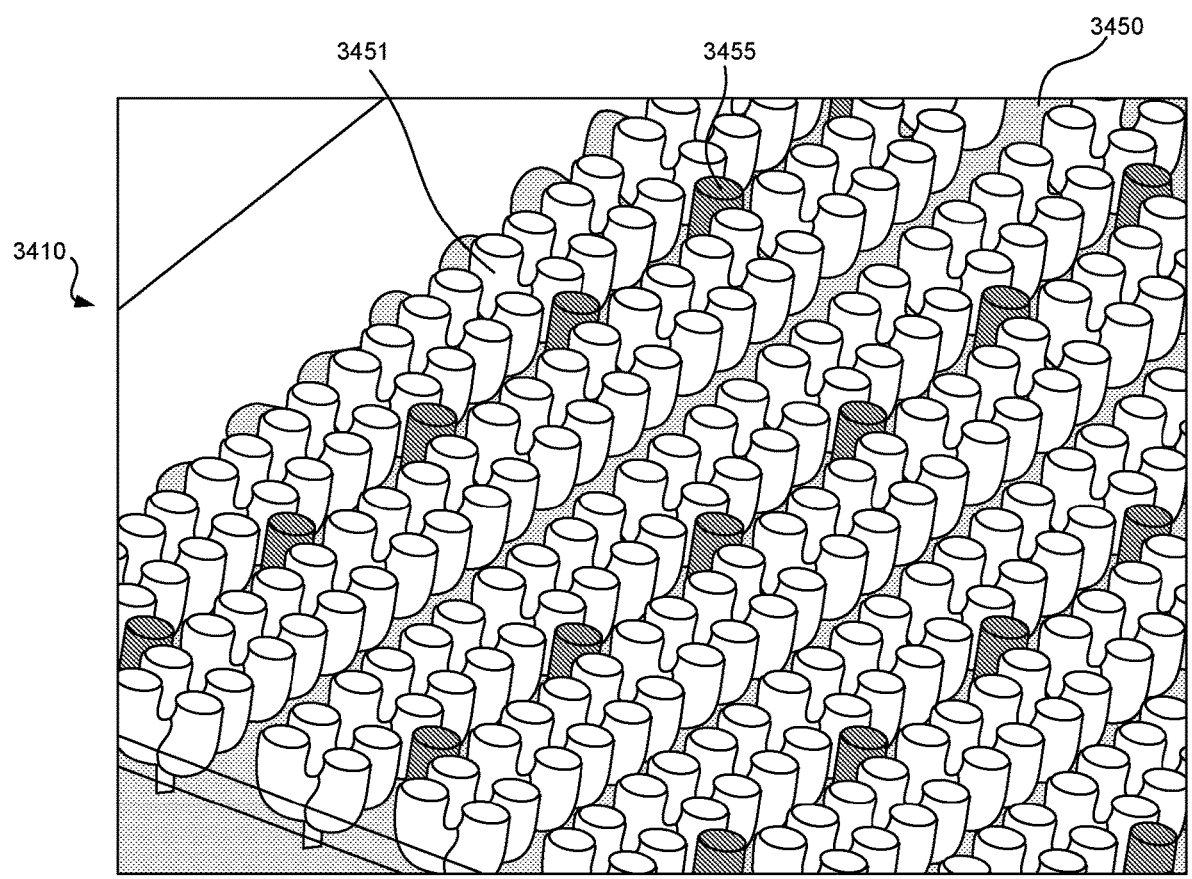
FIG. 34 shows a view of the surface of the slumping mold shown in FIG. 33.

The vent ports are shown in greater detail in FIGS. 33-34. In some embodiments, the outlet ports have a density of at least 8,000 outlet ports per square meter (m²). In some embodiments the outlet ports have a density of at least 10,000 outlet ports per m². In some embodiments, the vent ports have a density less than the density of the outlet ports 3251. In some embodiments, the vent ports are disposed in the support surface of the gas bearing device to allow gas to escape from the gas film between the support surface and the glass. In some embodiments, the vent ports allow gas to escape at the interior of the support surface and at the edges of the support surface. It is to be understood that the vent ports and outlet ports configuration shown in FIGS. 30-34 can be adapted to any of the gas bearing devices 1710, 1810, 1910, 2010 and 2110.

FIG. 33 shows another exemplary gas bearing device 3310, which may be a slumping mold. The gas bearing device 3310 may comprise a gas inlet 3360. In some embodiments, the gas bearing device 3310 may comprise outlet ports 3351. In some embodiments, the gas bearing device 3310 may comprise vent ports 3355. Gas passages 3354 provide a path for gas from gas inlet 3360 to outlet ports 3351.

FIG. 34 shows another view of a support surface 3450 of a gas bearing device 3410. Gas bearing device 3410 comprises a plurality of outlet ports 3451 and a plurality of vent ports 3455.

Figure 35:
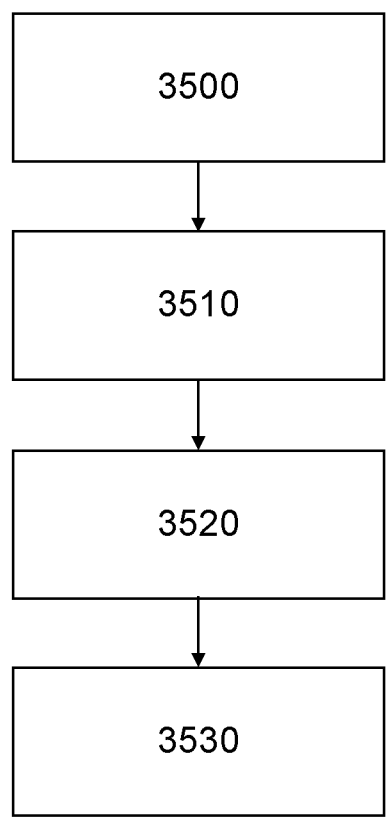
FIG. 35 shows a process flowchart for the method of supporting softened glass.

FIG. 35 shows a process flowchart for the method of supporting softened glass. As shown, the process starts with step 3500 of placing the glass in proximity to a gas bearing device having a support surface. In some embodiments, the gas bearing device may be one or more of the gas bearing devices as shown in FIGS. 17-34. After the placing the glass step, at step 3510, gas is ejected through the outlet ports of the gas bearing device to support the glass by a gas film without contact between the glass and the support surface.

In some embodiments, after the glass is fed in proximity with the gas bearing device, the continuous stream of glass is received by a driven conveyor. As used herein, a "driven conveyor" may be any mechanism configured to move a glass ribbon via physical contact with the glass ribbon. Examples of driven conveyors include a roller table where the rollers are driven, and a conveyor belt.

After step 3510, at step 3520, the temperature of the gas bearing device is optionally controlled by circulating a temperature-controlled thermal fluid through temperature control channels in the gas bearing.

After step 3520, at step 3530, the gas may be transmitted from a gas source to the gas bearing device prior to ejecting the gas through the outlet ports. In some embodiments, the gas is pre-heated before the gas reaches the gas bearing device.

Support Structure and Air Table

As described above, glass can be formed for a variety of applications, and such applications may require a variety of processing steps to form glass suitable for such an application. The support structure allows changes to the configuration of the glass forming device through the use of modular devices. The modular devices can be added or removed as needed based on the particular application.

Similar to the support structure, the air table also allows changes to the configuration through the use of air table modules. The air table is also retractable from an operational position to a retracted position, which can improve safety for people working on and around the air table. Because of the modular structure of the air table, the air table can incorporate any combination of modules, which can include gas bearings, driven conveyors, and more.

The ability to change the configuration of the support structure modular devices and the air table modules enables the production of smooth glass and the ability to efficiently control the thermal profile of the glass. The glass may undergo a continuous transition from a molten state to a rigid or elastic state as it moves across the air table or below the support structure. As it transitions, the physical characteristics of the glass and the thermal profile of the glass can be efficiently controlled by moving, adding, or removing modules to suit the specific process requirements.

Figure 36:
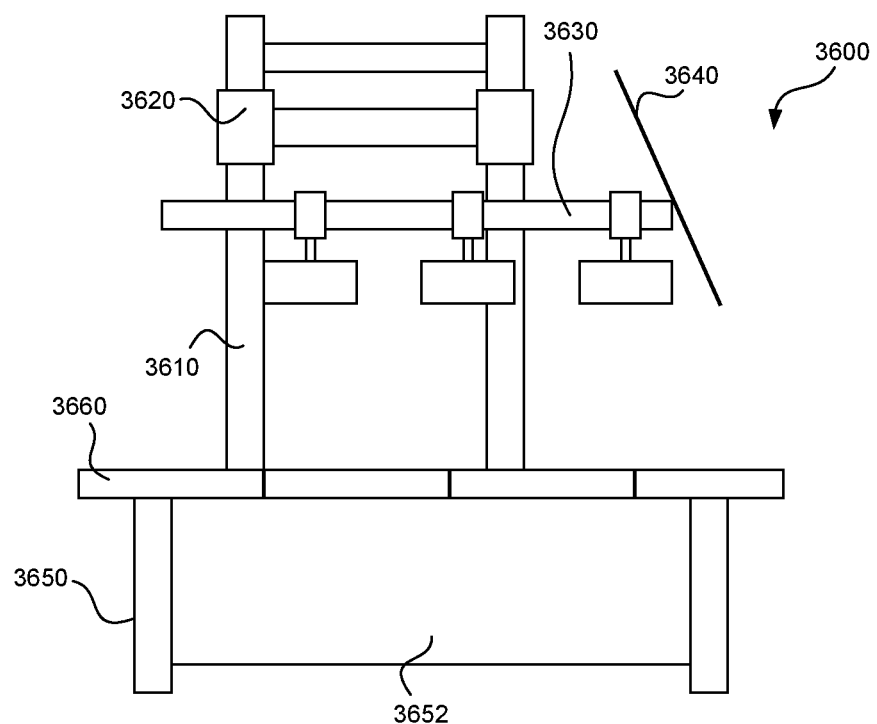
FIG. 36 shows an exemplary support structure and air table in an operational position.
Figure 37:
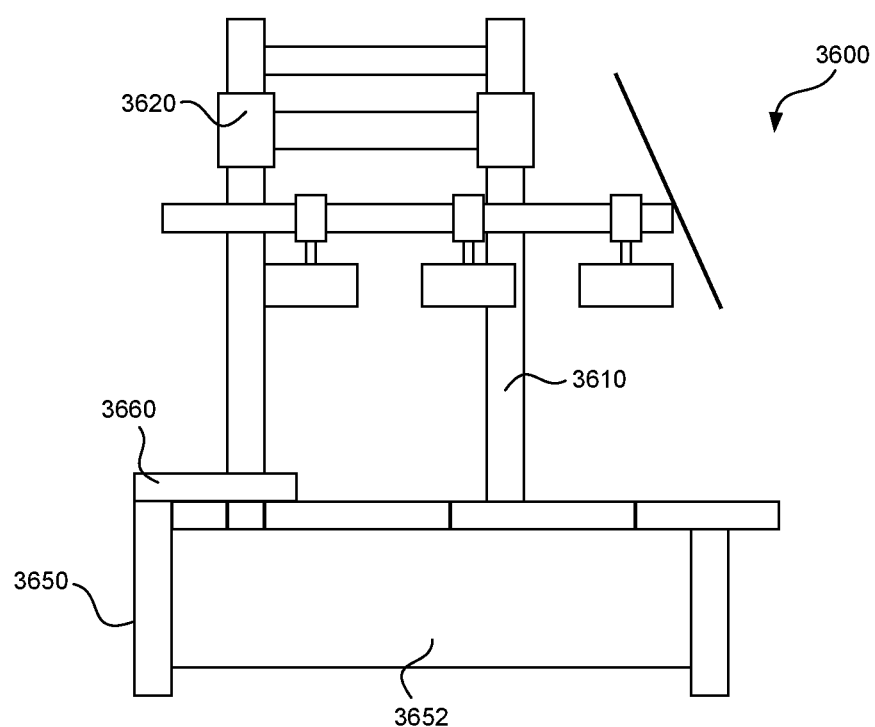
FIG. 37 shows the support structure and air table of FIG. 36 in a retracted position.

FIG. 36 shows exemplary support structure 3600 in an operational position. In some embodiments, support structure comprises an upright member 3610, an arm member 3620, and a plurality of modular devices 3630. In some embodiments, modular device 3630 includes a thermal radiation shield 3640, which may protect other structures and mechanisms from heating due from the molten glass stream. In some embodiments, support structure 3600 is placed in proximity to an air table 3650. In some embodiments, arm member 3620 is movable in a vertical directions. In some embodiments, arm member 3620 is movable between an upper position and a lower position using a powered lift. In some embodiments, air table 3650 may comprise air table chassis 3652. Air table 3650 may comprise a plurality of air table modules 3660. Air table modules 3660 may be disposed on the air table chassis 3652. In some embodiments, the air table modules 3660 are the same width as the modular devices 3630. In some embodiments, air table modules 3660 are each a different width than the modular devices 3630. In some embodiments the air table modules all have the same width. In some embodiments, the air table modules have different widths. FIG. 37 shows air table 3650 in a retracted position.

In some embodiments, a gas bearing is used to move or turn the glass prior to placing the glass in proximity to support structure 3600 and air table 3650. In some embodiments, the gas bearing is a metallic, 3D printed and water cooled gas bearing used to turn the glass from vertical to horizontal.

Figure 38:
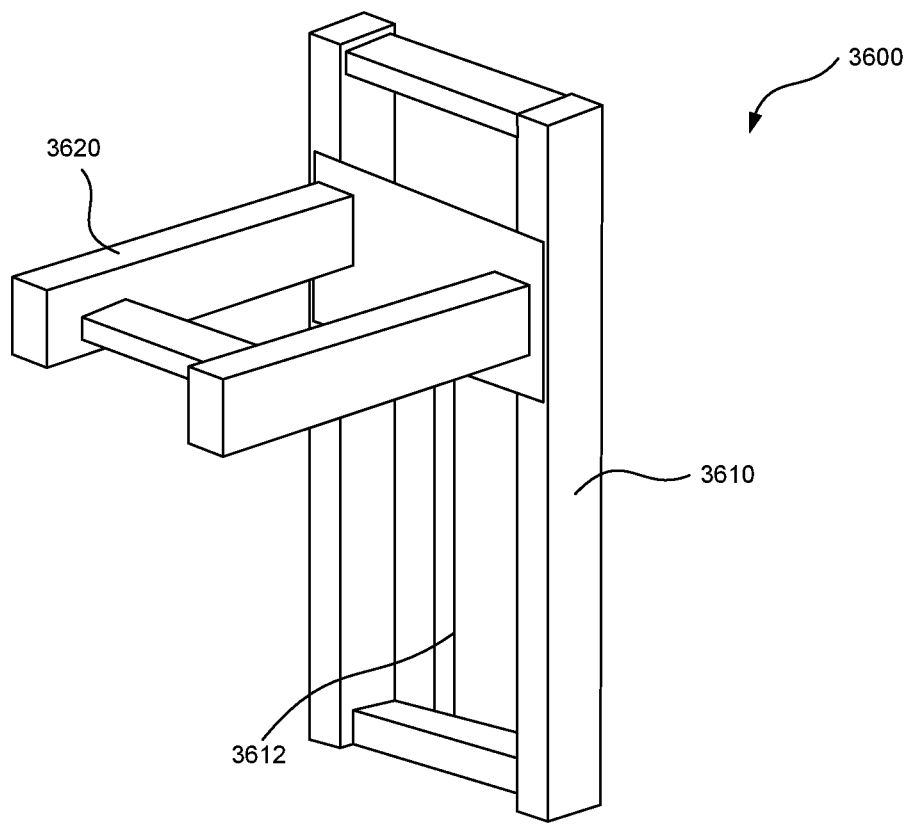
FIG. 38 shows a schematic of an exemplary support structure.

In some embodiments, at least one of the modular devices is a thermal management device. Anything that directly contacts the glass or comes into close proximity to the glass will have a thermal impact and can be a thermal management device. In some embodiments, the thermal management device includes a roller, a water cooled graphite gas bearing, or a water cooled driven roller. FIG. 38 shows another view of exemplary support structure 3600. Support structure 3600 may comprise a pneumatic lift 3612. The arm member 3620 may be raised and lowered by the pneumatic lift 3612. As shown in FIG. 38, arm member 3620 is substantially perpendicular to upright member 3610.

Figure 39:
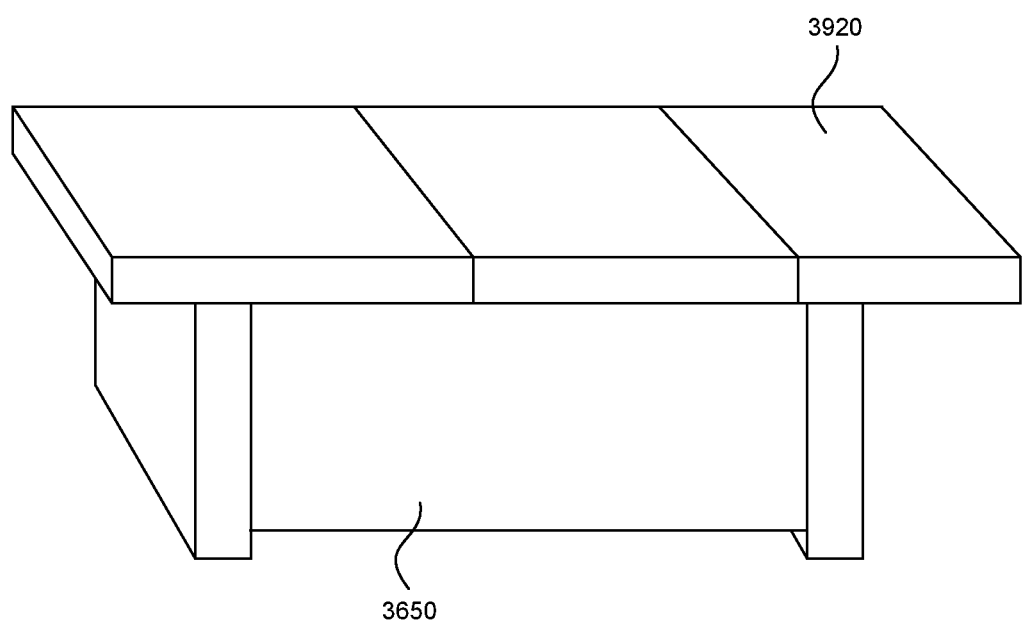
FIG. 39 shows a schematic of an air table in an operational position.

FIG. 39 shows another view of an exemplary air table 3650 in an operational position. In some embodiments, air table 3650 comprises air table modules 3920.

Figure 40:
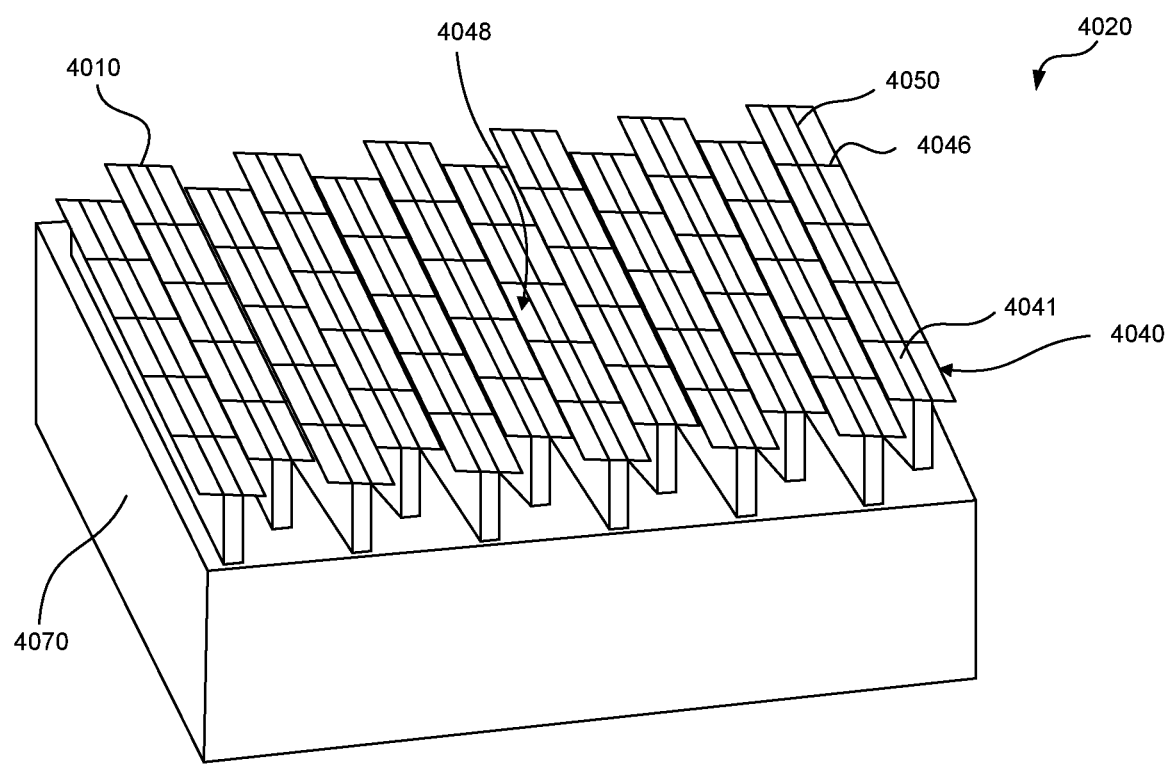
FIG. 40 shows an exemplary air table module.
Figure 41:
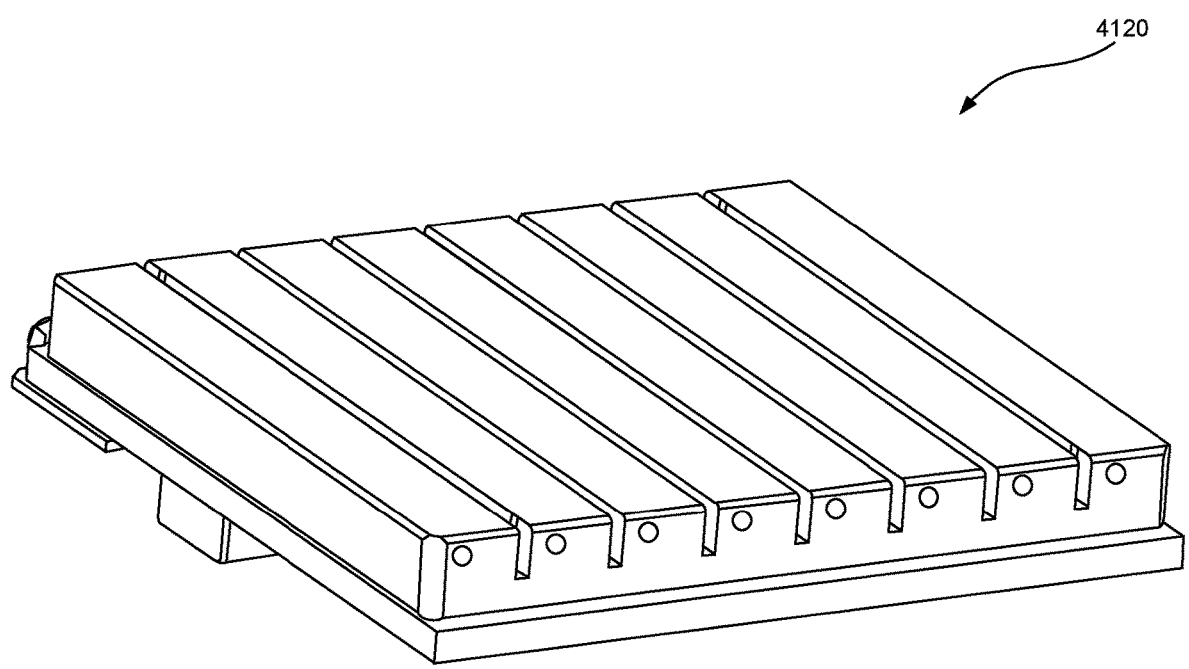
FIG. 41 shows an exemplary air table module.
Figure 42:
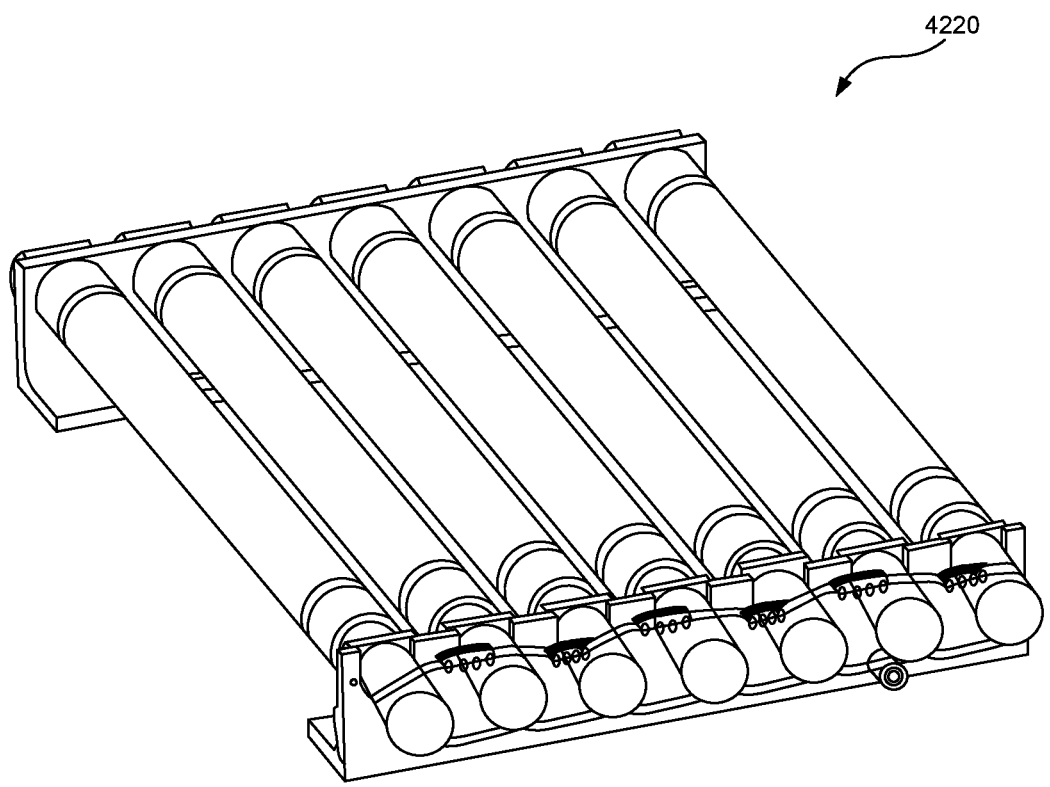
FIG. 42 shows an exemplary air table module.
Figure 43:
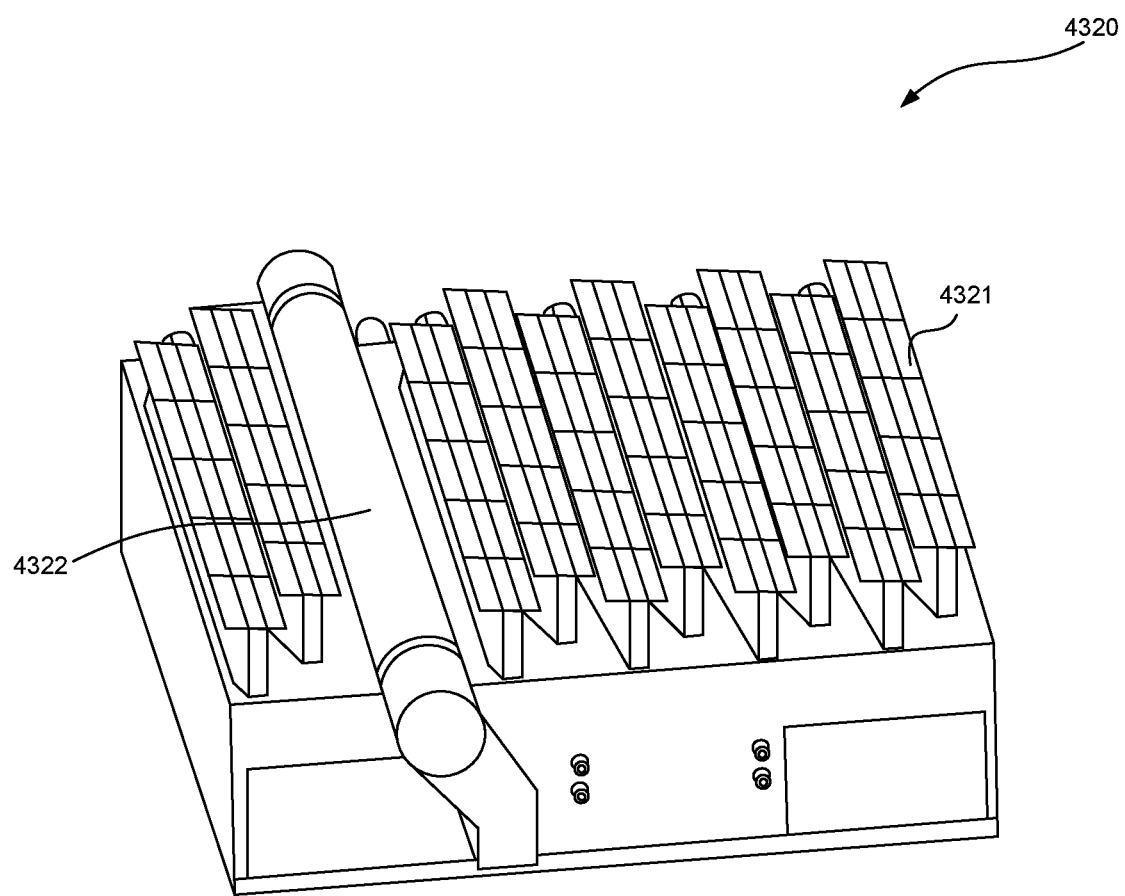
FIG. 43 shows an exemplary air table module.

FIG. 40 shows exemplary air table module 4020. In some embodiments, air table module 4020 is a module with alloy gas bearing inserts. In some embodiments, the alloy is an Inconel alloy. "Inconel" refers to a family of austenitic nickel-chromium-based superalloys. FIG. 41 shows exemplary air table module 4120. Air table module 4120 may comprise a graphite gas bearing module. FIG. 42 shows exemplary air table module 4220. Air table module 4220 may comprise a roller array module. FIG. 43 shows exemplary air table module 4320. Air table module 4320 may comprise an alloy gas bearing insert 4321 and a roll assembly 4322. In some embodiments, roll assembly 4322 is a powered flattening roll assembly.

In some embodiments, air table module 4020 comprises gas bearing assembly 4010. Gas bearing assembly 4010 comprises a plurality of gas bearings 4040. Gas bearings 4040 collectively form a gas bearing assembly 4010. The surfaces 4041 of gas bearings 4040 facing a glass sheet collectively form a major surface 4048. In some embodiments, each gas bearing 4040 comprises a plurality of outlet ports, pores, or a combination thereof, in fluid communication with a gas source. Gas bearings 4040 may comprise slots 4050. The structure of gas bearings 4040 is shown in more detail in FIGS. 5A-8. In some embodiments, gas bearing assembly 4010 comprises support frame 4070. In some embodiments, gas bearings 4040 are attached to support frame 4070. Support frame 4070 may comprise internal cooling channels that cool support frame 4070 to prevent warping. In some embodiments a second gas bearing assembly is disposed above gas bearing assembly 4010. In some embodiments, as described related to FIG. 53, the second gas bearing assembly disposed above gas bearing assembly 4010 may be used to flatten the glass.

During processing, a stream of viscous glass is supported by gas bearing assembly 4010. The viscosity, and thus the temperature, of the viscous glass is a process parameter that should be selected to obtain desired glass properties. Gas bearing assembly 4010 is in close proximity to the viscous glass, and should generally have a temperature at major surface 4048 that is close to that of the viscous glass. The temperature needed to achieve the desired viscosity depends on the specific glass, but is usually sufficiently high to cause some warping of gas bearing assembly 4010. This warping can cause an uneven gap size in embodiments having two gas bearing assemblies with major surfaces separated by a gap, and deviations from the desired shape of major surface 4048 in embodiments without such a gap.

The absolute displacement caused by warping is a function of temperature and part size—displacement becomes more pronounced and causes greater absolute displacement on larger parts. So, if gas bearing assembly 4010 is a single large gas bearing, or a few large gas bearings, warping might cause unacceptably large displacements of major surface 4048, particularly at the edges. But, by using a number of smaller gas bearings 4040 having smaller surfaces 4041 that collectively form major surface 4048, the displacement of each individual surface of gas bearings 4040 due to warping is significantly less than the displacement that would occur if major surface 4048 were the surface of a single physically contiguous gas bearing.

The configuration shown in FIG. 40 includes a plurality of smaller gas bearings 4040, which are attached to and supported by support frame 4070. The relatively small size of gas bearings 4040 reduces the effect of warp on individual gas bearings. In some embodiments, the support frame 4070 holds gas bearings 4040 in place. Support frame 4070 is large, and might be subject to significant warping if heated. But, because support frame 4070 is farther from the viscous glass than surfaces 4041 of gas bearings 4040, support frame 4070 is not subject to the same temperature constraints as gas bearings 4040—the temperature of support frame 4070 can be significantly different from that of the viscous glass. And, support frame 4070 need not have pores or gas ports, which results in a greater range of design possibilities for support frame 4070 relative to gas bearings 4040. In some embodiments, support frame 4070 may also comprise internal cooling passages that maintain the temperature of support frame 4070 at a suitable temperature for preventing or minimizing warping, even while the gas bearings 4040 are at a temperature suitable for processing molten glass. In some embodiments, such cooling passages may not be needed due to other factors such as radiative cooling and/or superior structural integrity of support frame 4070.

Figure 44:
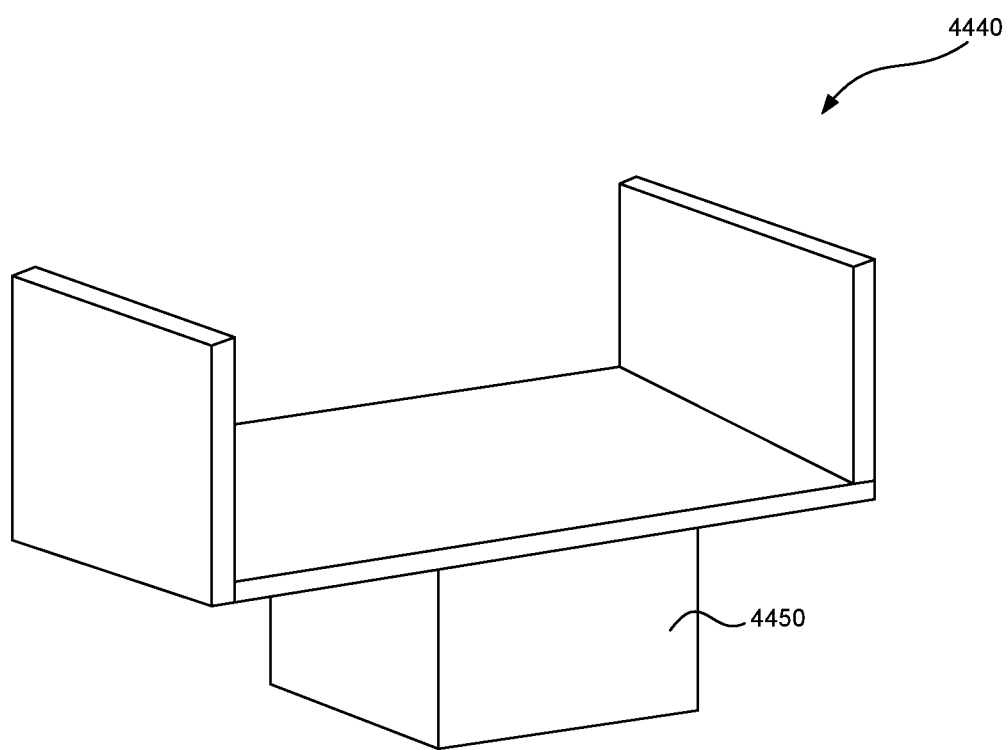
FIG. 44 shows an exemplary modular device.
Figure 45:
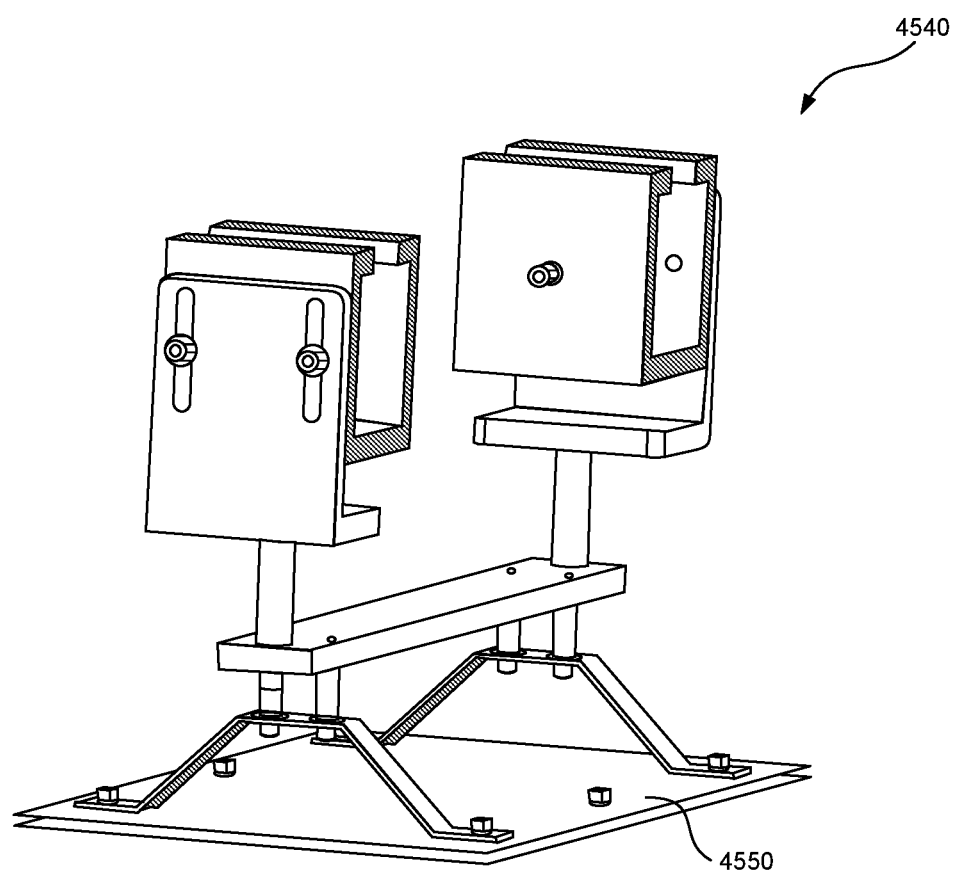
FIG. 45 shows an exemplary modular device.
Figure 46:
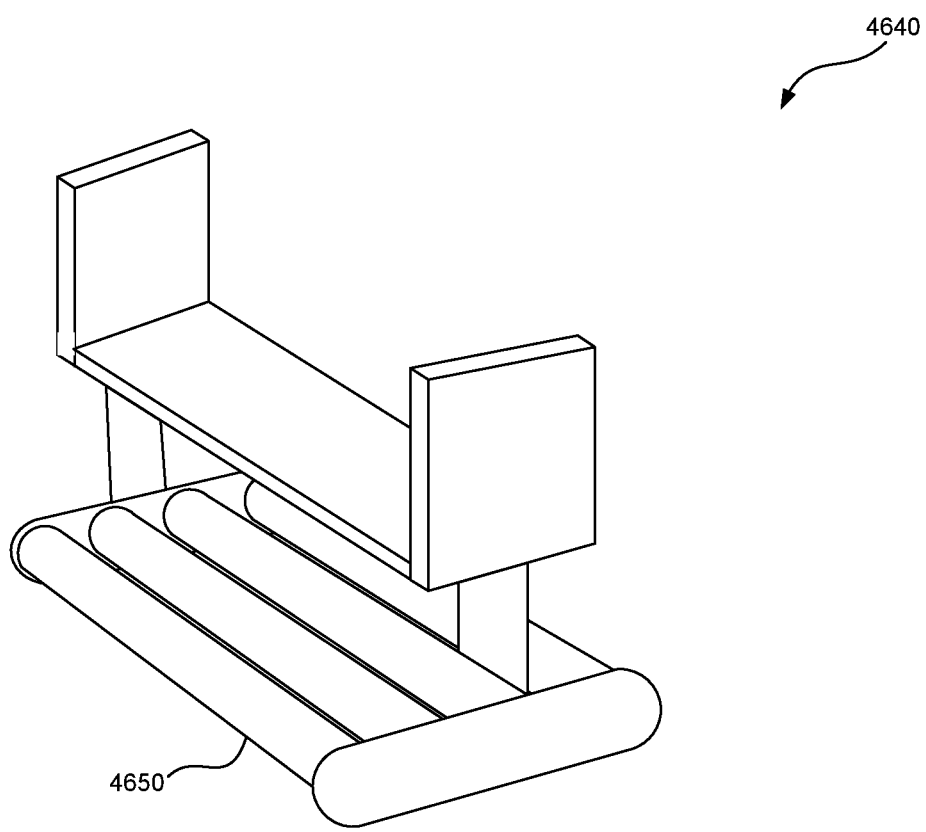
FIG. 46 shows an exemplary modular device.
Figure 47:
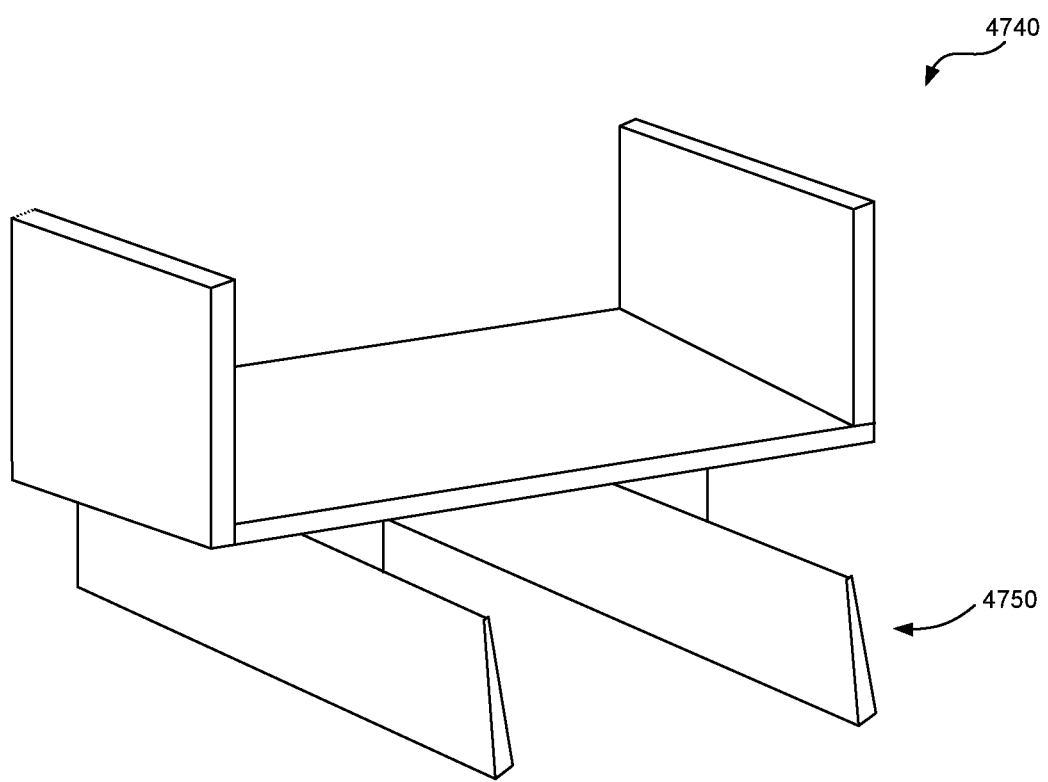
FIG. 47 shows an exemplary modular device.
Figure 48:
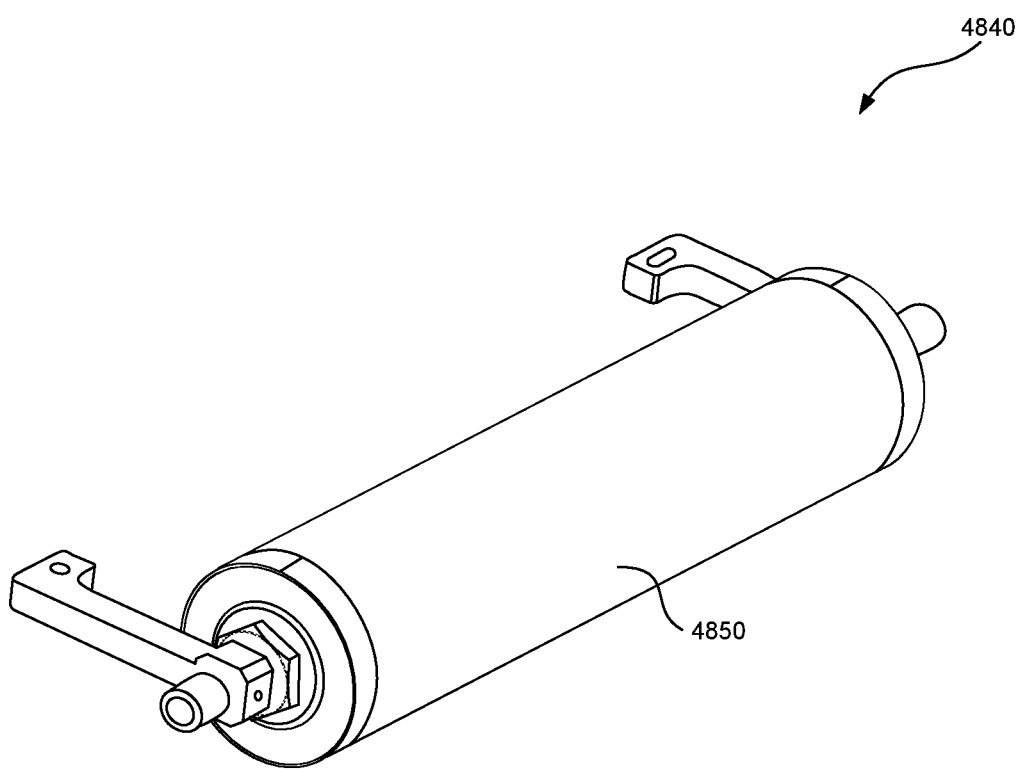
FIG. 48 shows an exemplary modular device.
Figure 49:
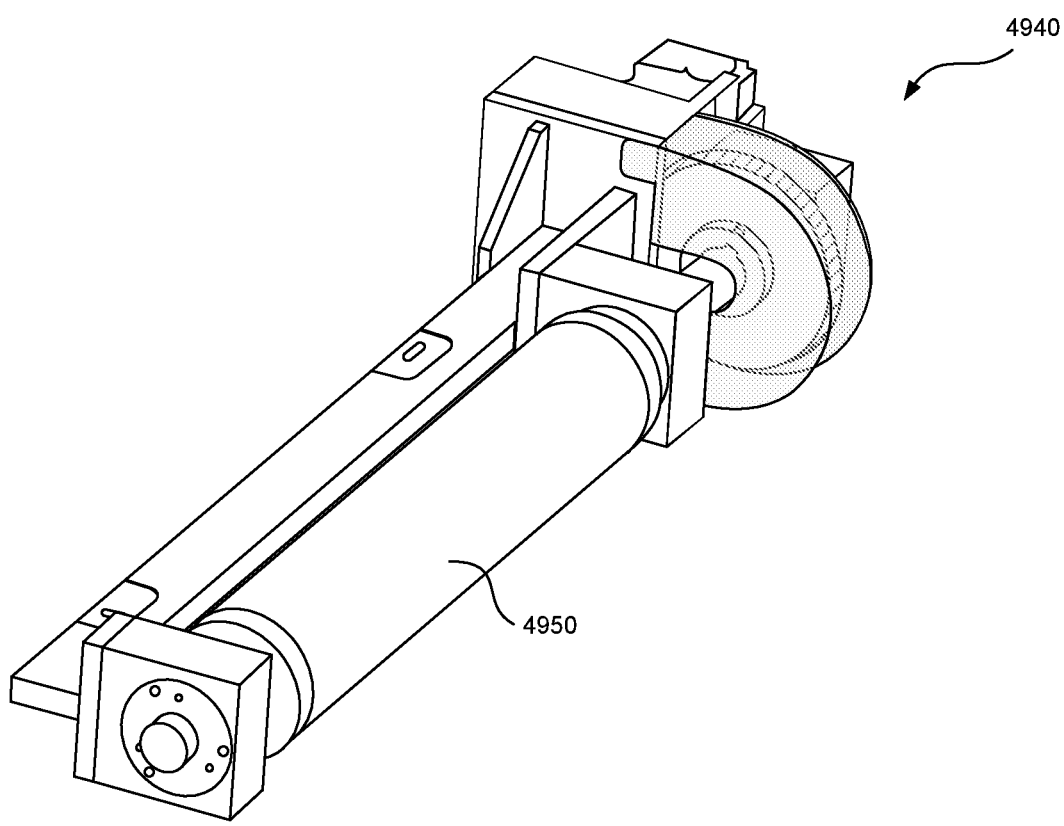
FIG. 49 shows an exemplary modular device.

In some embodiments, the plurality of modular devices may include any one or more of a heater, a reflective panel, a roll assembly, an air knife, a gas bearing, a roll positioning assembly, or a driven roller. FIG. 44 shows an exemplary modular device 4740. Modular device 4740 may comprise flat panel heater 4450. FIG. 45 shows an exemplary modular device 4540. Modular device 4540 may comprise passive reflector panel 4550. FIG. 46 shows an exemplary modular device 4640. Modular device 4640 may comprise flattening roll assembly 4650. FIG. 47 shows an exemplary modular device 4740. Modular device 4740 may comprise edge heater and air knife assembly 4750. FIG. 48 shows an exemplary modular device 4840. Modular device 4840 may comprise water cooled graphite gas bearing 4850. FIG. 49 shows an exemplary modular device 4940. Modular device 4940 may comprise water cooled driven roller 4950.

Figure 50:
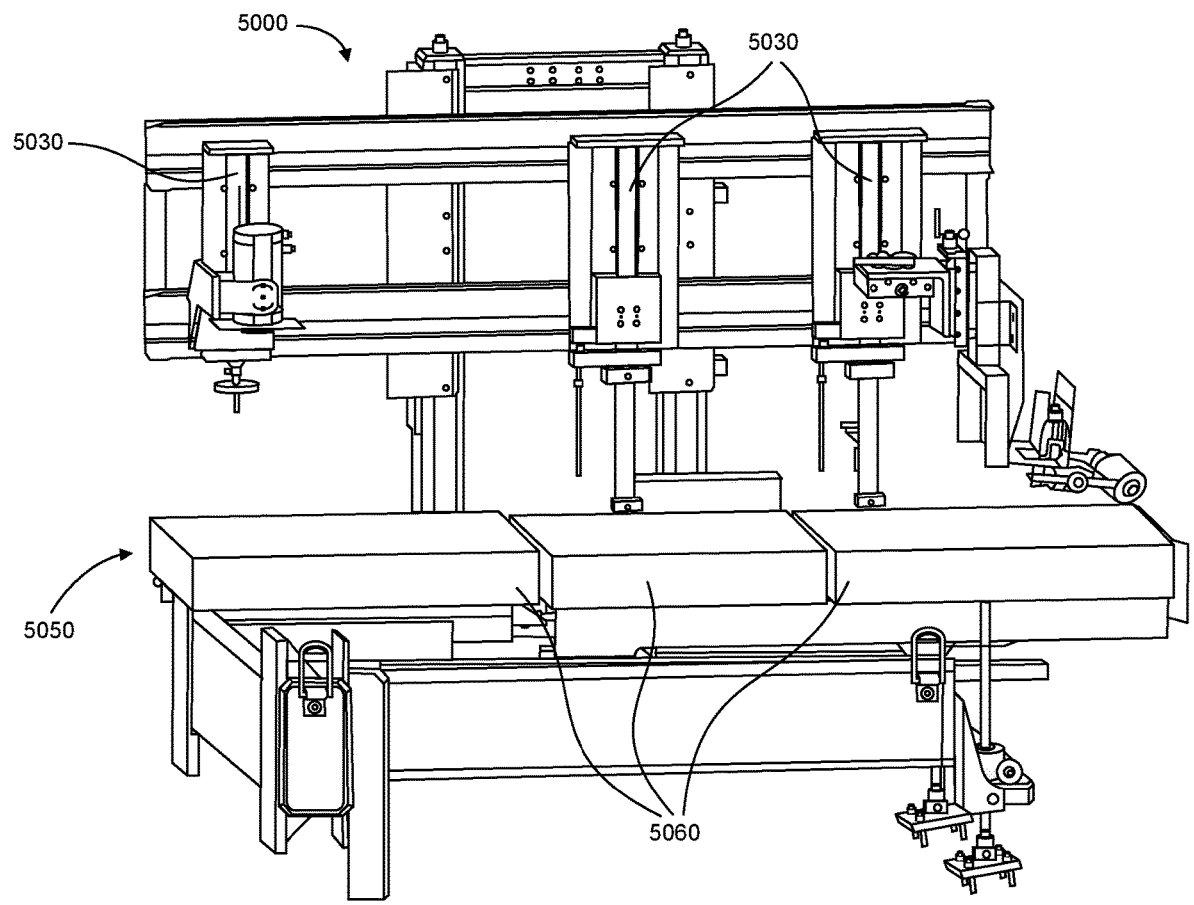
FIG. 50 shows an exemplary support structure and air table.

FIG. 50 shows exemplary support structure 5000 and exemplary air table 5050. Support structure 5000 may comprise a plurality of modular devices 5030. Air table 5050 may comprise a plurality of air table modules 5060. Each modular device 5030 may comprise any of the modular devices shown in FIGS. 44-49. Each air table module 5060 may comprise any of the modular devices shown in FIGS. 40-43. In some embodiments, air table module 5060 may comprise a gas bearing, such as, for example, the gas bearings shown in FIGS. 17-20B In some embodiments, each modular device 5030 is independently movable. In some embodiments, each modular device 5030 is movable along a horizontal axis and/or a vertical axis. In some embodiments, each modular device 5030 is removable from the support structure.

Figure 51:
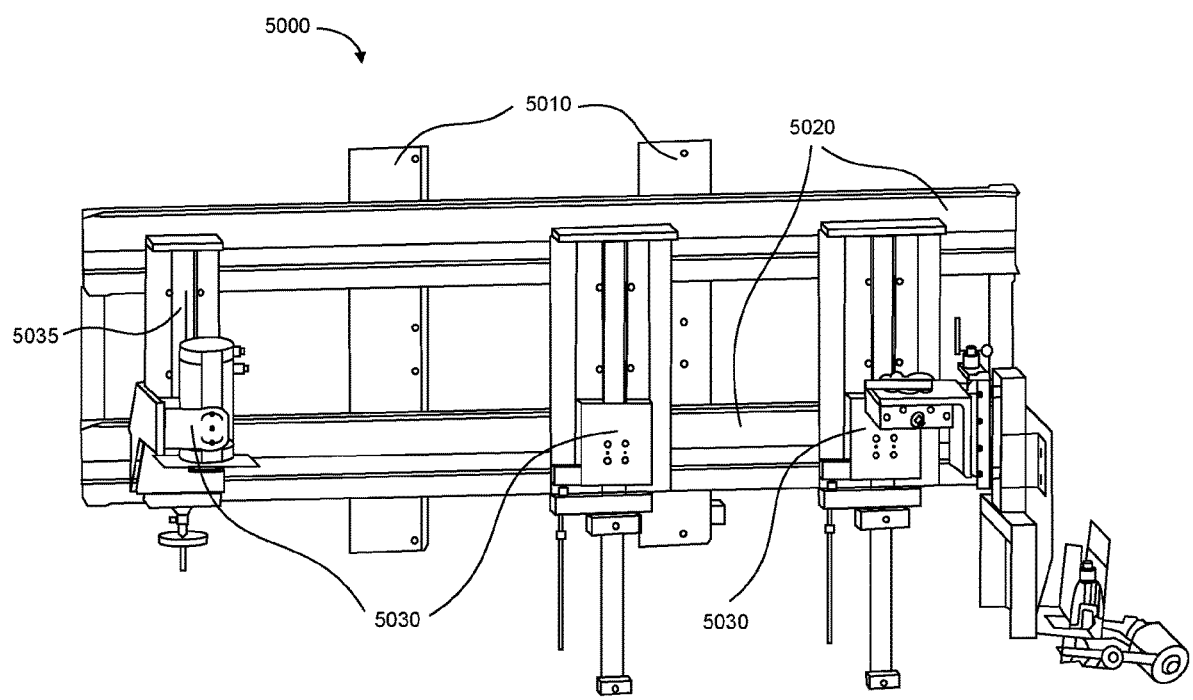
FIG. 51 shows an exemplary support structure and air table.

FIG. 51 shows another view of support structure 5000. In some embodiments, support structure 5000 comprises upright member 5010 and arm member 5020. In some embodiments, arm member 5020 comprises two substantially parallel arms that are substantially horizontal. In some embodiments, modular devices 5030 are movable in a horizontal direction along arm member 5020. In some embodiments modular devices 5030 are movable in a vertical direction along track 5035.

Glass Flattening

In some embodiments, a sheet of glass is flattened while the glass sheet is in the elastic or visco-elastic state so that the glass sheet is free from significant warp. One-sided gas bearings assemblies or gas bearings that do not pull a vacuum may provide effective non-contact support or transport of a glass sheet; however, the ability of those gas bearing assemblies to flatten a glass sheet is limited by the low weight of a glass sheet, such that the driving force toward flatness can be weak.

In some embodiments, a two-sided gas bearing assembly or a one-sided gas bearing assembly that also pulls a vacuum allows a visco-elastic or viscous glass sheet to achieve a high level of flatness. In some embodiments, the glass is flattened by applying a thermo mechanical treatment to the glass sheet in the viscous condition or in the visco-elastic regime for sufficient time to have irreversibly affected the shape of the glass ribbon considered.

Figure 52:
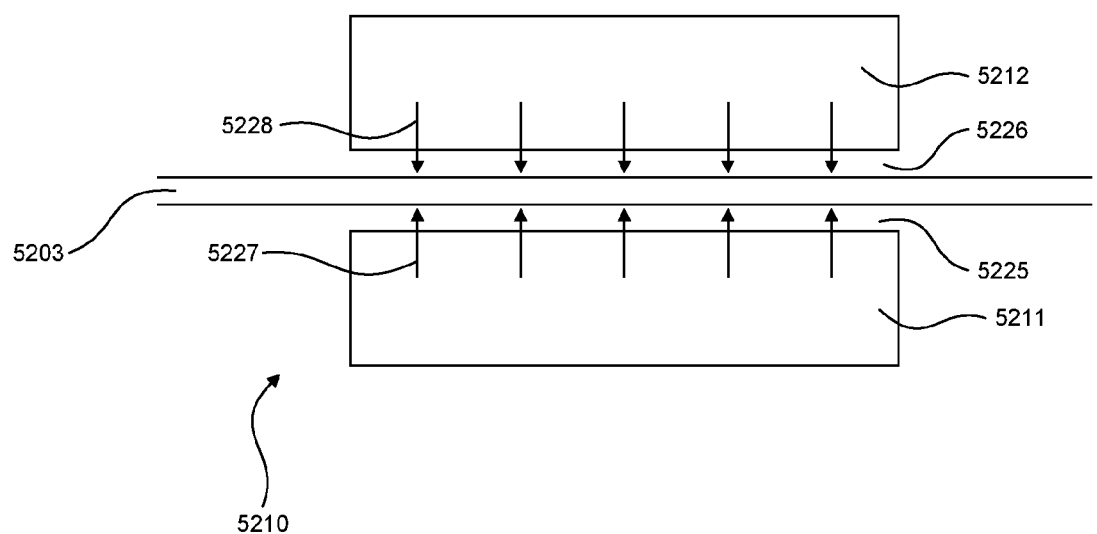
FIG. 52 shows an exemplary gas bearing device.
Figure 53:
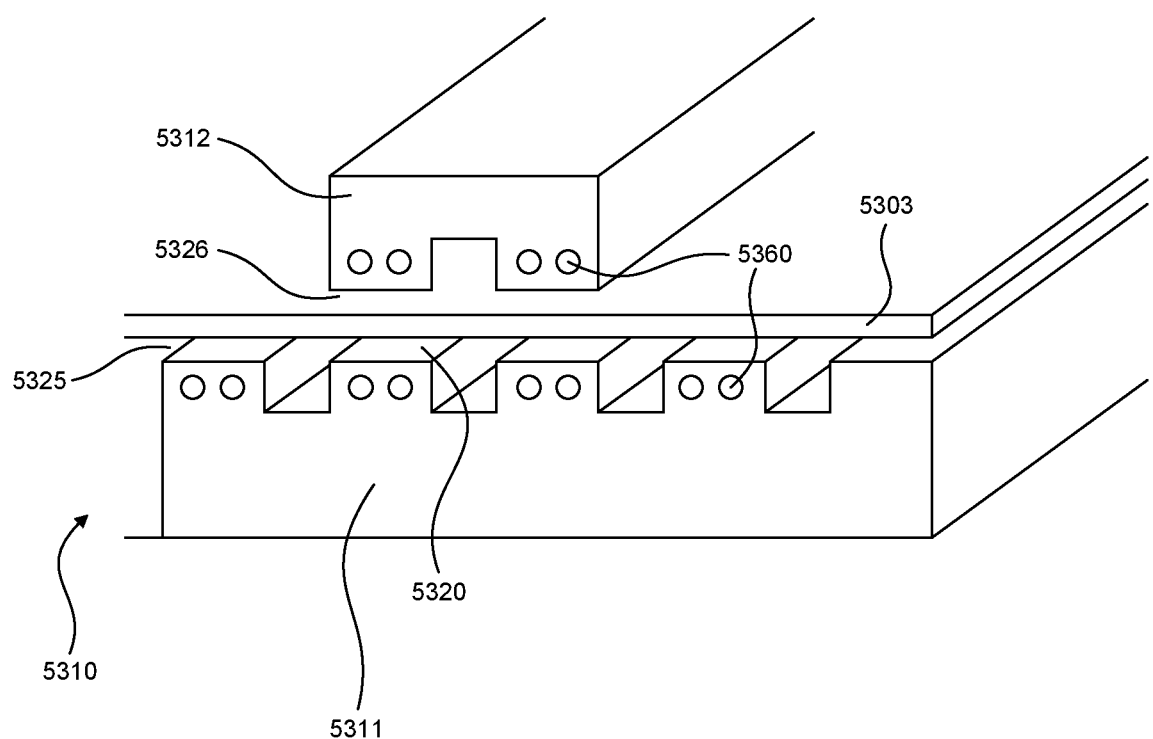
FIG. 53 shows an exemplary gas bearing device.

In some embodiments, the glass sheet is flattened using a two-sided gas bearing assembly, such as, for example, the gas bearing assemblies shown in FIGS. 52 and 53. The two-sided gas bearing assembly has an upper gas bearing and a lower gas bearing, and a sheet of glass flows through the gap between the disposed below a glass sheet. The gas bearing assembly applies pressure forces to the glass sheet from both the upper gas bearing and the lower gas bearing, and those pressure forces push the glass sheet towards a high level of flatness without any physical contact between the glass ribbon and the two-sided gas bearing.

In a two-sided gas bearing system, it is possible to subject a flowing glass sheet to pressures far beyond the pressure required to sustain its weight. With the applied pressure, the glass sheet will reach a pressure equilibrium between the upper and lower gas bearing assemblies, and warped shapes will be subjected to pressure forces driving towards perfect flatness.

Figure 54A:
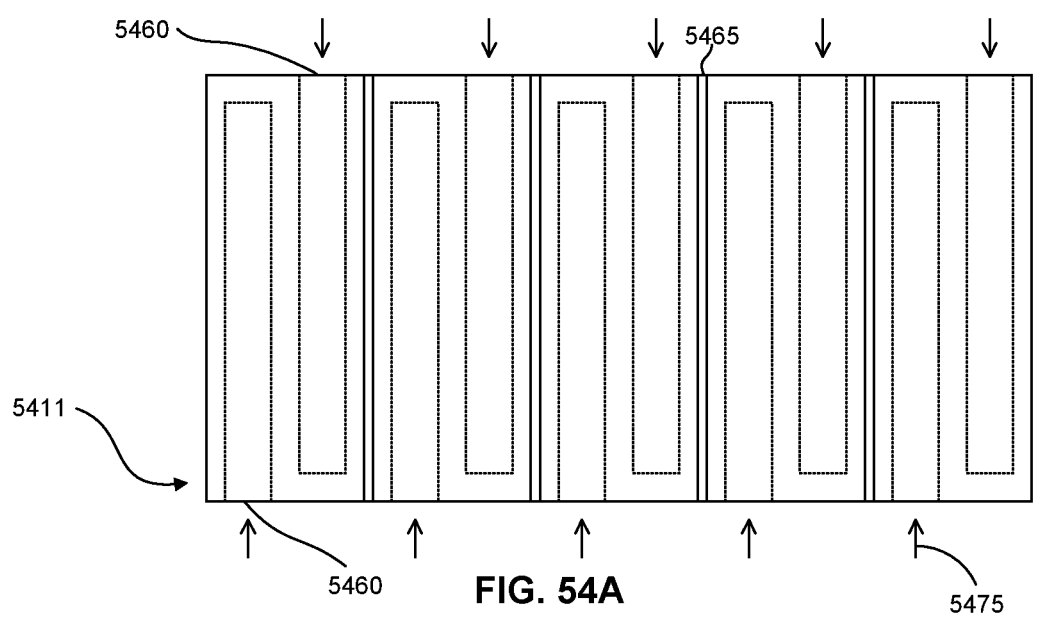
FIGS. 54A and 54B show an exemplary gas bearing device.
Figure 54B:
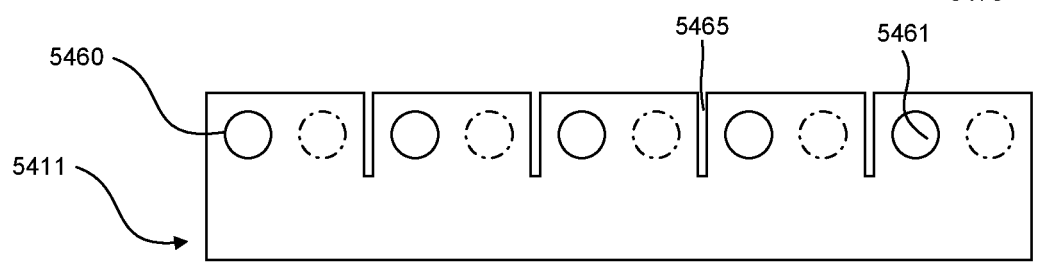

In some embodiments, the glass sheet is flattened using a one-sided gas bearing assembly, such as, for example, the gas bearing assembly shown in FIGS. 54A and 54B. The one-sided gas bearing assembly includes both gas feed passages and a driven exhaust system. The gas feed passages provide gas which applies a positive pressure to the glass sheet. The driven exhaust system, provides a vacuum effect by applying pressures below atmospheric pressure. Applying both positive pressure and pressure below atmospheric pressure leads the gas bearing system to a strongly self-adjusting gap system, with pressure forces driving toward perfect flatness.

In applications requiring a high degree of flatness, a warped glass sheet with an uneven surface may benefit from flattening. In some embodiments, when a warped glass sheet passes over or through the gas bearing assembly, the glass sheet will be subjected to pressure force which will strongly drive towards a constant gap. As the pressure forces are applied to the glass sheet, the gas film between the glass sheet and the surface of the gas bearing reaches equilibrium. At equilibrium, an equilibrium gap is formed between the glass sheet and the surface of the gas bearing assembly. The equilibrium gap is the distance between the glass sheet and the surface of the gas bearing. In some embodiments, the equilibrium gap is 25 µm, 50 µm, 100 µm, 250 µm, 500 µm, or 750 µm, or any range defined by any two of those endpoints. In some embodiments, the equilibrium gap is 50 µm to 500 µm. In some embodiments, the equilibrium gap is 75 µm to 250 µm.

In some embodiments, the two-sided or one-sided gas bearing assemblies provide uniform heat transfer to the glass across the width of the glass sheet.

The flattening capability of the two-sided and one-sided gas bearing assembly allows thin glass sheets to be manufactured with a high degree of flatness and very low warp. Glass sheets manufactured using the two-sided or one-sided gas bearing assemblies require minimal finishing or processing before reaching the high degree of flatness.

In some embodiments, the two-sided and one-sided gas bearing assemblies process continuous sheets or ribbons of glass. In some embodiments, the two-sided and one-sided gas bearing assemblies process discrete pieces or parts of a thin glass sheet. In some embodiments, the two-sided and one-sided gas bearing assemblies flatten glass in the viscous or visco-elastic state without contacting the glass.

As an example, if a glass sheet enters the gas bearing assembly with a gap between the glass sheet and the surface of the gas bearing that is larger than the equilibrium gap, the force applied to the glass sheet drives the glass sheet towards the equilibrium gap, thus flattening the glass sheet. If portions of the glass sheet are at the equilibrium gap and portions are not, the portions that are not will experience the driving force towards flatness.

The glass sheet is exposed to the gas bearing assembly for a time sufficient to ensure that the glass sheet has relaxed stresses so that the flattened shape of the glass sheet is permanent. Factors affecting the time include the thickness of the glass, the speed of the glass moving through the gas bearing assembly, the incoming glass temperature and viscosity, length of the gas bearing assembly, and thermal settings of the gas bearing assembly, such as temperature of the assembly, temperature of the gas, and the desired equilibrium gap.

Figure 55:
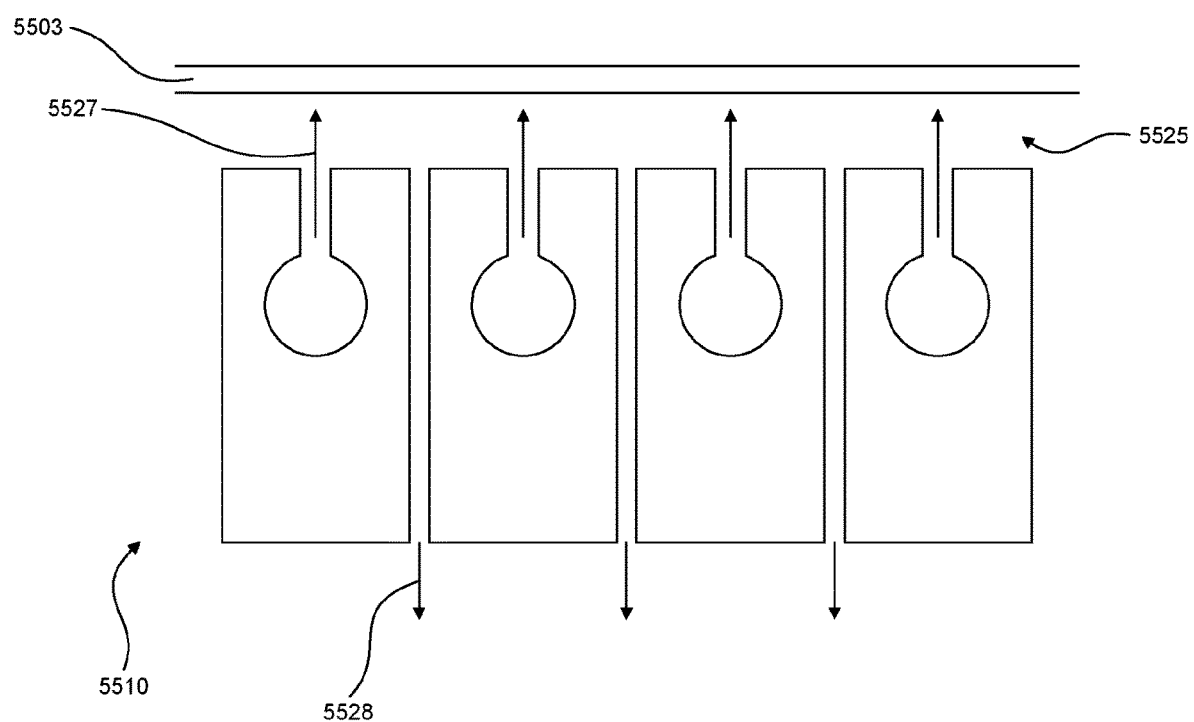
FIG. 55 shows an exemplary gas bearing device.
Figure 56:
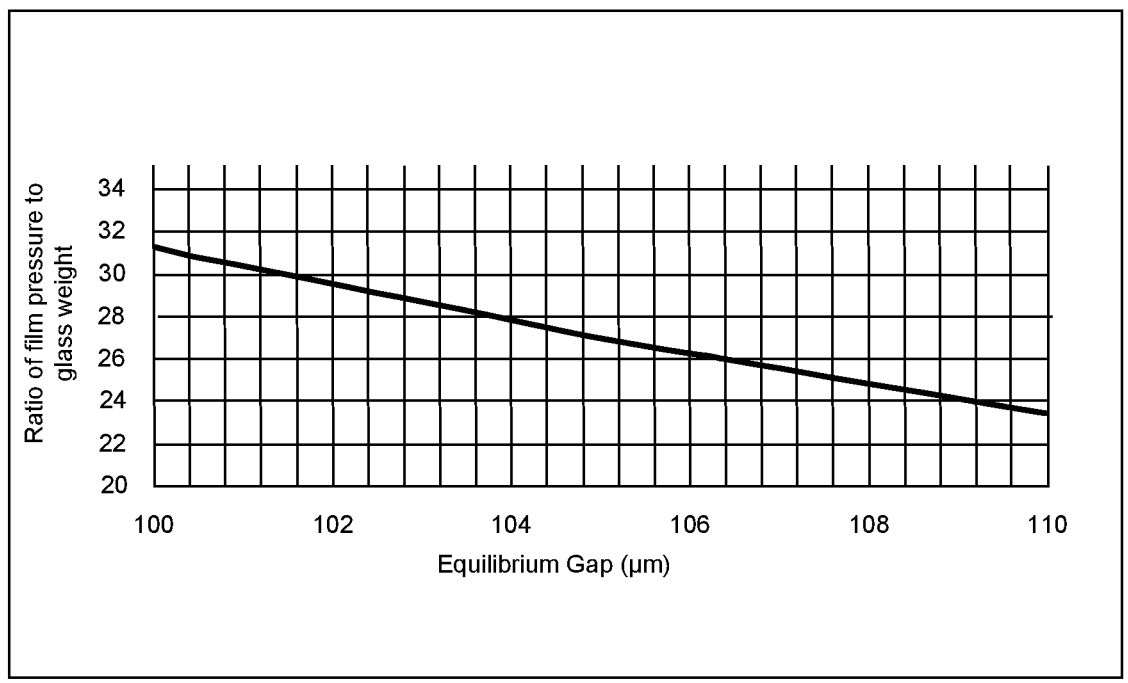
FIG. 56 shows the ratio of film pressure to glass weight.

In some embodiments, the two-sided gas bearing assembly has a symmetrical equilibrium gap. In some embodiments, the equilibrium gap is 90 to 120 µm. In some embodiments, the equilibrium gap is about 105 µm. As an example and as shown in FIG. 55, when the equilibrium gap is 105 µm the ratio of gas pressure to glass weight is about 27. Further, as shown in FIG. 56, if a glass sheet enters the gas bearing assembly with some portions having a gap of 100 µm and some portions having a gap of 110 µm, as shown in FIG. 56, the glass ribbon will experience a pressure of about 31 and 24 times its own weight, respectively. In that case, a shape deviation of 10 µm leads to a force toward equilibrium gap of 7 times the weight of the sheet.

In some embodiments, the two-sided gas bearing assembly can be set up to have a constant equilibrium gap. In some embodiments, the equilibrium gap is adjustable. In some embodiments, the upper gas bearing assembly is fixed and the lower gas bearing assembly is adjustable so that it applies a constant force to the system. In some embodiments, the lower gas bearing assembly is fixed and the upper gas bearing assembly is adjustable so that it applies a constant force to the system.

In some embodiments, the lower gas bearing assembly is fixed. In some embodiments, the upper gas bearing assembly is fixed. In some embodiments, the upper gas bearing assembly is movable relative to the lower gas bearing assembly. Such movement can be the result of changes in gas pressure that increase or decrease the equilibrium gap, or through mechanical operation.

In some embodiments the upper gas bearing assembly is the first gas bearing assembly and the lower gas bearing assembly is the second gas bearing assembly. In some embodiments, the lower gas bearing assembly is the first gas bearing assembly and the upper gas bearing assembly is the second gas bearing assembly.

In some embodiments, the one-sided gas bearing assembly can build the flattening force by applying a 100 Pa negative pressure to the exit of the one-sided gas bearing assembly, which allows the flattening force to build. As an example, a 75 µm warp leads to a gap reduction force of about 2 times the weight of the glass.

In some embodiments, the gas bearing assembly is made of porous materials, such as graphite. In some embodiments, the one-sided gas bearing assembly has a major surface with discretized gas passages disposed in the major surface. In some embodiments, the two-sided and one-sided gas bearing assemblies can also include a means for providing controlled supplies of gas, managing exits, and thermally controlling the systems. For example, the gas bearing system can provide cooling of the glass sheet in a controlled manner or provide active heating to avoid variations in temperature.

FIG. 52 shows exemplary gas bearing device 5210. In some embodiments, gas bearing device 5210 includes lower gas bearing 5211 and upper gas bearing 5212. In some embodiments, gas bearing device 5210 flattens glass sheet 5203 without contact. In some embodiments, glass sheet 5203 moves between lower gas bearing 5211 and upper gas bearing 5212. In some embodiments, glass sheet 5203 moves between lower gas bearing 5211 and upper gas bearing 5212 without contact between the gas bearings and glass sheet 5203. Lower gas bearing 5211 applies gas pressure to glass sheet 5203 in the direction indicated by arrows 5227. Upper gas bearing 5212 applies gas pressure to glass sheet 5203 in the direction indicated by arrows 5228.

In some embodiments where a gap between two air bearings is present, for example the gap between lower gas bearing 5211 and upper gas bearing 5212, the gap may be mechanically fixed by a support structure. And, in some embodiments, the gap may be variable and dependent upon air pressure. For example, upper gas bearing 5212 may be supported by gas film 5226, such that the size of gas film 5226 depends on gas pressure and the weight of upper gas bearing 5212. Upper gas bearing 5212 may be supported by gas film 5226 while being partially supported by something else, such as a hose providing air for gas film 5226, or a spring assembly.

FIG. 53 shows exemplary gas bearing assembly 5310. In some embodiments, gas bearing assembly 5310 includes lower gas bearing assembly 5311 and upper gas bearing assembly 5312. In some embodiments, upper gas bearing assembly 5312 and lower gas bearing assembly 5311 each have a major surface. In some embodiments, gas bearing assembly 5310 flattens glass sheet 5303 without contact. In some embodiments, glass sheet 5303 moves between lower gas bearing assembly 5311 and upper gas bearing assembly 5312. In some embodiments, glass sheet 5303 moves between the major surface of lower gas bearing assembly 5311 and the major surface of upper gas bearing assembly 5312 without contact between the gas bearing major surfaces and glass sheet 5303. In some embodiments, first gas film 5325 forms between lower gas bearing assembly 5311 and glass sheet 5303, and second gas film 5326 forms between upper gas bearing assembly 5312 and glass sheet 5303. In some embodiments, surface 5320 comprises a plurality of gas bearings, such as the plurality of gas bearings 140 in FIG. 5A. In some embodiments, gas bearings 5320 are made of porous graphite. In some embodiments, gas is fed to gas bearing assembly 5310 through a plurality of gas inlet holes 5360.

FIG. 54A shows a top view of exemplary gas bearing assembly 5411. FIG. 54B shows a front view of exemplary gas bearing assembly 5411. In some embodiments, gas bearing assembly 5411 is a lower gas bearing in a two-sided gas bearing device. In some embodiments, gas bearing assembly 5411 is an upper gas bearing in a two-sided gas bearing device. In some embodiments, gas bearing assembly 5411 is a one-sided gas bearing device. Gas bearing assembly 5411 has a plurality of inlet passages 5460. In some embodiments, gas bearing assembly 5411 has a plurality of vent channels 5465. In some embodiments, gas is fed in the direction indicated by arrows 5475 to gas bearing assembly 5411 through a plurality of inlet passages 5460.

FIG. 55 shows exemplary gas bearing assembly 5510. In some embodiments, gas bearing assembly 5510 flattens glass sheet 5503 without contact. In some embodiments, gas bearing assembly 5510 forms gas film 5525. In some embodiments, gas bearing assembly 5510 applies positive gas pressure on the glass sheet 5503 in the direction indicated by arrows 5527 and pulls a vacuum on the glass sheet 5503 in the direction indicated by arrows 5528. In some embodiments, gas bearing assembly 5510 flattens glass sheet 5503 by creating a pressure equilibrium in gas film 5525.

FIG. 56 shows an example of flattening driving force of a two-sided gas bearing assembly. FIG. 56 shows the ratio of film pressure to glass weight on the y-axis and size of the equilibrium gap in µm on the x-axis. As an example, glass with a 1 mm thickness was flattened. Gas was fed through the gas bearing at a flow of 0.01 m$^3$/sec per square meter of glass. The upper gas bearing assembly applied a load of 650 Pa, and the symmetric equilibrium gap of 105 µm. In some embodiments, the upper gas bearing assembly applies a load using only its own weight. In some embodiments, the upper gas bearing assembly applies a load using a mechanical system.

Gas Bearing Cooling

In some embodiments, any of the gas bearing devices or assemblies described above may include cooling passages that may help maintain temperature uniformity throughout the gas bearing device. The gas bearing device may comprise cooling passages configured to carry a cooling fluid therethrough. For example, the cooling passages may be embedded within the walls of the gas bearing device. In some embodiments, the cooling passages may be in contact with a surface of the respective wall. Cooling of the gas bearing device may be particularly beneficial in preventing distortion of the gas bearing due to its proximity to the heat from glass substrates being conveyed, flattened, or processed at high temperature and/or the heating effect of thermal management devices, when such thermal management devices are heating elements.

In some embodiments, the cooling fluid may comprise water, and may further comprise additives, for example additives selected to prevent corrosion of components of the gas bearing device or to enhance thermal conduction and heat removal using fluids such as ethylene glycol, diethylene glycol, propylene glycol and mixtures thereof, although in further embodiments water may not be present in the cooling fluid. For example, the cooling fluid may be entirely ethylene glycol, diethylene glycol, propylene glycol and mixtures thereof, or other fluids capable of cooling the gas bearing device. In some embodiments, the cooling fluid may be a gas, for example air, although in further embodiments, the pressurized gas may be predominately other gases, or mixtures of gases, including without limitation nitrogen, helium and/or argon, or mixtures thereof. The gas bearing device may comprise metallic components, comprising a cobalt-chrome alloy or a nickel alloy such as Inconel 718 or Inconel 625. In some embodiments, the gas bearing device may comprise a ceramic material, such as alumina or zirconia, or in still other embodiments, graphite. The material comprising the gas bearing device may be selected, for example, on the basis of the thermal conductivity of the material, and may include a mix of different materials.

While various embodiments have been described herein, they have been presented by way of example only, and not limitation. It should be apparent that adaptations and modifications are intended to be within the meaning and range of equivalents of the disclosed embodiments, based on the teaching and guidance presented herein. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about."

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes embodiments comprising two or more such components, unless the context clearly indicates otherwise.

As used herein, complementary features are features that are mirror images of each other and capable of engaging with each other. For example, a convex surface and a concave surface may be complementary if suitably sized to fit one surface against the other surface with near total contact over at least one of the surfaces (e.g., a ball and socket joint). A surface comprising an acute angle may be complimentary with another surface comprising a obtuse angle equal to 180 degrees minus the acute angle (e.g., a board with two opposing parallel major surfaces cut at an angle relative to the parallel surfaces will result in complementary cut surfaces). One skilled in the art will sufficiently comprehend the meaning of complementary from the foregoing guidance.

It will be apparent to those skilled in the art that various modifications and variations can be made to embodiment of the present disclosure without departing from the spirit and scope of the disclosure. Thus it is intended that the present disclosure cover such modifications and variations provided they come within the scope of the appended claims and their equivalents.

The terms "glass substrate", "glass ribbon", and "glass sheet" as used herein may be used interchangeably. For example, a gas bearing that is used to support a glass substrate may also be used to support a glass ribbon or a glass sheet.

The terms "exhaust ports", "discrete ports", and "outlet ports" as used herein may be used interchangeably. For example, an outlet port may also be an exhaust port or a discrete port.

The terms "viscous glass" or "molten glass" as used herein may mean glass having a viscosity in the range of 50 to $10^{13}$ poises. "Molten glass" has a viscosity sufficiently low that it can flow as a liquid through the glass processing equipment described herein, and similar equipment. "Viscous glass" has a viscosity sufficiently low that it may be readily permanently deformed. Viscous glass may also be referred to herein as "softened" glass.

The term "or," as used herein, is inclusive; more specifically, the phrase "A or B" means "A, B, or both A and B."  Exclusive "or" is designated herein by terms such as "either A or B" and "one of A or B," for example. The indefinite articles "a" and "an" and the definite article "the" to describe an element or component means that one or at least one of these elements or components is present, unless otherwise stated in specific instances.

As used herein, the term "supported by" a gas film means that the supported item is at least partially supported by a gas film. For example, a glass ribbon is "supported by" a gas film if it passes over a contactless gas bearing where a gas film applies a force to support the glass ribbon, even if the glass ribbon is subsequently fed onto a roller that contacts the glass ribbon. And, a gas bearing may be "supported by" a gas film Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

As used herein the term "glass" is meant to include any material made at least partially of glass, including glass and glass-ceramics.

The term "wherein" is used as an open-ended transitional phrase, to introduce a recitation of a series of characteristics of the structure.

As used herein, the term "around" when used to describe movement of glass in relation to a gas bearing is meant to include "around," "through," "above," "below," or "near."

As used herein, "comprising" is an open-ended transitional phrase. A list of elements following the transitional phrase "comprising" is a non-exclusive list, such that elements in addition to those specifically recited in the list may also be present.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An apparatus for supporting a substrate moving in a conveyance direction, comprising:
   a. a pressure box enclosing a chamber in fluid communication with a source of pressurized gas;
   b. a gas bearing positioned on the pressure box, the gas bearing including:
      i. a plenum in fluid communication with the chamber and extending in a length direction of the gas bearing,
      ii. an intermediate passage in fluid communication with the plenum through an impedance orifice sized to restrict a flow of gas between the plenum and the intermediate passage, and
      iii. a slot in fluid communication with the intermediate passage and extending along the length direction of the gas bearing, the slot opening at a major surface of the gas bearing and configured to exhaust a gas along a length of the slot, and the major surface is substantially planar such that an opening of the slot is co-planar with the major surface; wherein the gas bearing comprises a plurality of edges defining the major surface of the gas bearing, the plurality of edges including a first pair of opposing parallel edges arranged at an angle α relative to the conveyance direction, wherein α is in a range from about 20 degrees to about 60 degrees, the plurality of edges including a second pair of opposing parallel edges connecting the first pair of opposing parallel edges, the second pair of opposing parallel edges orthogonal to the conveyance direction.

2. The apparatus according to claim 1, wherein the apparatus comprises a plurality of gas bearings positioned on the pressure box, the plurality of gas bearings arranged in a plurality of rows extending orthogonal to the conveyance direction.

3. The apparatus according to claim 1, wherein the pressure box comprises cooling passages in fluid communication with a source of cooling fluid.

4. The apparatus according to claim 1, wherein a distance between an exit aperture of the impedance orifice and a major surface opening of the slot is equal to or greater than about 5 millimeters.

5. The apparatus according to claim 1, wherein the impedance orifice extends along a longitudinal axis that intersects the major surface.

6. The apparatus according to claim 5, wherein a second slot is in fluid communication with the intermediate passage and extends along the length direction of the gas bearing, the second slot opening at the major surface of the gas bearing and configured to exhaust a gas along a length of the second slot, the major surface positioned between the slot and the second slot with the slot on one side of the longitudinal axis and the second slot on an opposite side of the longitudinal axis.

7. The apparatus according to claim 1, wherein the impedance orifice extends along a longitudinal axis that is parallel to the major surface.

8. A method for supporting a glass substrate, comprising:
   a. conveying a glass substrate over a support apparatus in a conveyance direction, the support apparatus comprising a pressure box enclosing a chamber in fluid communication with a source of pressurized gas, the pressure box further including a plurality of gas bearings positioned on the pressure box, the plurality of gas bearings arranged in a plurality of rows extending orthogonal to the conveyance direction, each gas bearing of the plurality of gas bearings comprising:
      i. a plenum extending in a length direction of the gas bearing,
      ii. an intermediate passage in fluid communication with the plenum through an impedance orifice sized to restrict a flow of gas between the plenum and the intermediate passage,
      iii. a slot in fluid communication with the intermediate passage and extending along the length of the gas bearing, the slot opening at a major surface of the gas bearing;
   b. exhausting gas from each slot along a length of the slot, thereby supporting the glass substrate in a position spaced apart from the major surface of each gas bearing of the plurality of gas bearings; and
   c. wherein the major surface of each gas bearing of the plurality of gas bearings is defined by a plurality of edges comprising at least a first pair of parallel edges arranged at an angle α relative to the conveyance direction, where α is in a range from equal to or greater than 20 degrees to equal to or less than 60 degrees, wherein a second pair of parallel edges connect the first pair of parallel edges, and the second pair of parallel edges are orthogonal to the conveyance direction.

9. The method according to claim 8, further comprising heating the glass substrate to a temperature greater than an anneal temperature of the glass substrate as the glass substrate is conveyed over the support apparatus.

10. The method according to claim 8, wherein a width of the glass substrate is at least 1 meter, and a maximum variation of a major surface of the glass substrate does not exceed 100 micrometers relative to a reference plane parallel with the major surface after conveying the glass substrate over the support apparatus.

11. The method according to claim 8, wherein the glass substrate is a glass ribbon, the method further comprising drawing the glass ribbon from a forming body prior to supporting the glass ribbon with the support apparatus.

12. The method according to claim 11, further comprising re-directing the glass ribbon from a first direction to a second direction different than the first direction prior to supporting the glass substrate with the support apparatus.

13. The method according to claim 8, wherein a gas pressure exhausted from gas bearings positioned adjacent edge portions of the glass substrate is greater than a gas pressure exhausted from gas bearings positioned beneath a central portion of the glass substrate.

* * * * *

UNITED STATES PATENT AND TRADEMARK OFFICE
CERTIFICATE OF CORRECTION

| | |
|---|---|
| PATENT NO. | : 11,420,895 B2 |
| APPLICATION NO. | : 16/332670 |
| DATED | : August 23, 2022 |
| INVENTOR(S) | : Olivier Fournel et al. |

It is certified that error appears in the above-identified patent and that said Letters Patent is hereby corrected as shown below:

On the Title Page

On the page 2, in Column 2, Item (56) under "Other Publications", Line 7, delete "Aurthority;" and insert -- Authority; --.

Signed and Sealed this
Eighth Day of November, 2022

Katherine Kelly Vidal
*Director of the United States Patent and Trademark Office*